US012694070B2

(12) United States Patent
Tran et al.

(10) Patent No.: US 12,694,070 B2
(45) Date of Patent: Jul. 28, 2026

(54) VERIFICATION METHOD AND SYSTEM IN ARTIFICIAL NEURAL NETWORK ARRAY

(71) Applicant: Silicon Storage Technology, Inc., San Jose, CA (US)

(72) Inventors: Hieu Van Tran, San Jose, CA (US); Stephen Trinh, San Jose, CA (US); Stanley Hong, San Jose, CA (US); Thuan Vu, San Jose, CA (US); Duc Nguyen, Ho Chi Minh (VN); Hien Pham, Ho Chi Minh (VN)

(73) Assignee: Silicon Storage Technology, Inc., San Jose, CA (US)

( * ) Notice: Subject to any disclaimer, the term of this patent is extended or adjusted under 35 U.S.C. 154(b) by 710 days.

(21) Appl. No.: 18/080,545

(22) Filed: Dec. 13, 2022

(65) Prior Publication Data

US 2024/0104164 A1 Mar. 28, 2024

Related U.S. Application Data

(60) Provisional application No. 63/409,142, filed on Sep. 22, 2022.

(51) Int. Cl.
*G06F 17/16* (2006.01)
*G06N 3/063* (2023.01)

(52) U.S. Cl.
CPC .............. *G06F 17/16* (2013.01); *G06N 3/063* (2013.01)

(58) Field of Classification Search
CPC ...... G06F 17/16; G06N 3/063; G06N 3/0442; G06N 3/0464; G06N 3/048; G06N 3/065; G11C 11/54
See application file for complete search history.

(56) References Cited

U.S. PATENT DOCUMENTS 5,029,130 A 7/1991 Yeh
6,747,310 B2 6/2004 Fan et al.
(Continued)

FOREIGN PATENT DOCUMENTS

CN 113785311 12/2021
TW 202044123 12/2020
(Continued)

OTHER PUBLICATIONS

Xinjie Guo et al ("Mixed Signal Neurocomputing Based on Floating-gate Memories", Mar. 2017) (Year: 2017).*
(Continued)

*Primary Examiner* — Matthew J Ellis
(74) *Attorney, Agent, or Firm* — Vedder Price P.C.

(57) ABSTRACT

Numerous examples are disclosed of verification circuitry and associated methods in an artificial neural network. In one example, a system comprises a vector-by-matrix multiplication array comprising a plurality of non-volatile memory cells arranged in rows and columns, the non-volatile memory cells respectively capable of storing one of N possible levels corresponding to one of N possible currents, and a plurality of output blocks to receive current from respective columns of the vector-by-matrix multiplication array and generate voltages during a verify operation of the vector-by-matrix multiplication and generate digital outputs during a read operation of the vector-by-matrix multiplication.

16 Claims, 50 Drawing Sheets

(56) References Cited

U.S. PATENT DOCUMENTS

| | | | |
|---|---|---|---|
| 10,748,630 | B2 | 8/2020 | Tran et al. |
| 2016/0027504 | A1* | 1/2016 | Lee ........................ G11C 16/14 |
| | | | 365/185.03 |
| 2017/0337466 | A1 | 11/2017 | Bayat et al. |
| 2018/0173438 | A1* | 6/2018 | Li ........................ G06F 3/0611 |
| 2020/0013462 | A1 | 1/2020 | Le Gallo-Bourdeau et al. |
| 2020/0349421 | A1* | 11/2020 | Tran ................... G11C 16/0483 |
| 2021/0020228 | A1* | 1/2021 | Bayat ........................ G11C 8/08 |
| 2021/0089875 | A1 | 3/2021 | Tran et al. |
| 2021/0125045 | A1 | 4/2021 | Jang |
| 2022/0309328 | A1* | 9/2022 | Saxena .............. G11C 16/0466 |
| 2023/0169358 | A1* | 6/2023 | Zayats ................... G06N 20/00 |
| | | | 706/55 |

FOREIGN PATENT DOCUMENTS

| | | |
|---|---|---|
| WO | 2022/182378 | 9/2022 |
| WO | 2022182378 A1 | 9/2022 |

OTHER PUBLICATIONS

S. A. Aamir et al., "An Accelerated LIF Neuronal Network Array for a Large-Scale Mixed-Signal Neuromorphic Architecture," in IEEE Transactions on Circuits and Systems I: Regular Papers, vol. 65, No. 12, pp. 4299-4312, Dec. 2018, doi: 10.1109/TCSI.2018.2840718 (Year: 2018).*

Taiwanese Office Action mailed on May 16, 2024 corresponding to the related Taiwanese Patent Application No. 112131058. (Google English Translations and original copy of the Taiwanese Office are attached.).

PCT Search Report and Written Opinion mailed on Jul. 17, 2023 corresponding to the related PCT Patent Application No. US2022/053084.

Machine Translation of Office Action from Korea Patent Office, dated Aug. 20, 2025, filed under Korean Application No. 10-2025-7006207, 7 pages.

Office Action from European Patent Office, dated Jan. 2, 2026, filed under European Union Application No. 22854210.6, 9 pages.

* cited by examiner

Memory Cell
310

FIGURE 4 (PRIOR ART)

Memory Cell
410

FIGURE 14 (PRIOR ART)

LSTM 1400

Cell 1401

Cell 1402

Cell 1403

Cell 1404

LSTM Cell
1600

Programming Method 3500

3501 — Start

3502 — All cells programmed to '0' state.

3503 — All cells erased to weakly erased level.

3504 — Hard programming method performed on unselected cells to add electrons to floating gates.

3505 — Coarse programming operation performed on selected cells.

3506 — Precision programming operation performed on selected cells.

Programming Method 3510

3501 — Start

3512 — All cells erased to '1' state.

3513 — All cells programmed to weakly programmed level (soft program).

3504 — Hard programming method performed on unselected cells to add electrons to floating gates.

3505 — Coarse programming operation performed on selected cells.

3506 — Precision programming operation performed on selected cells.

FIGURE 36

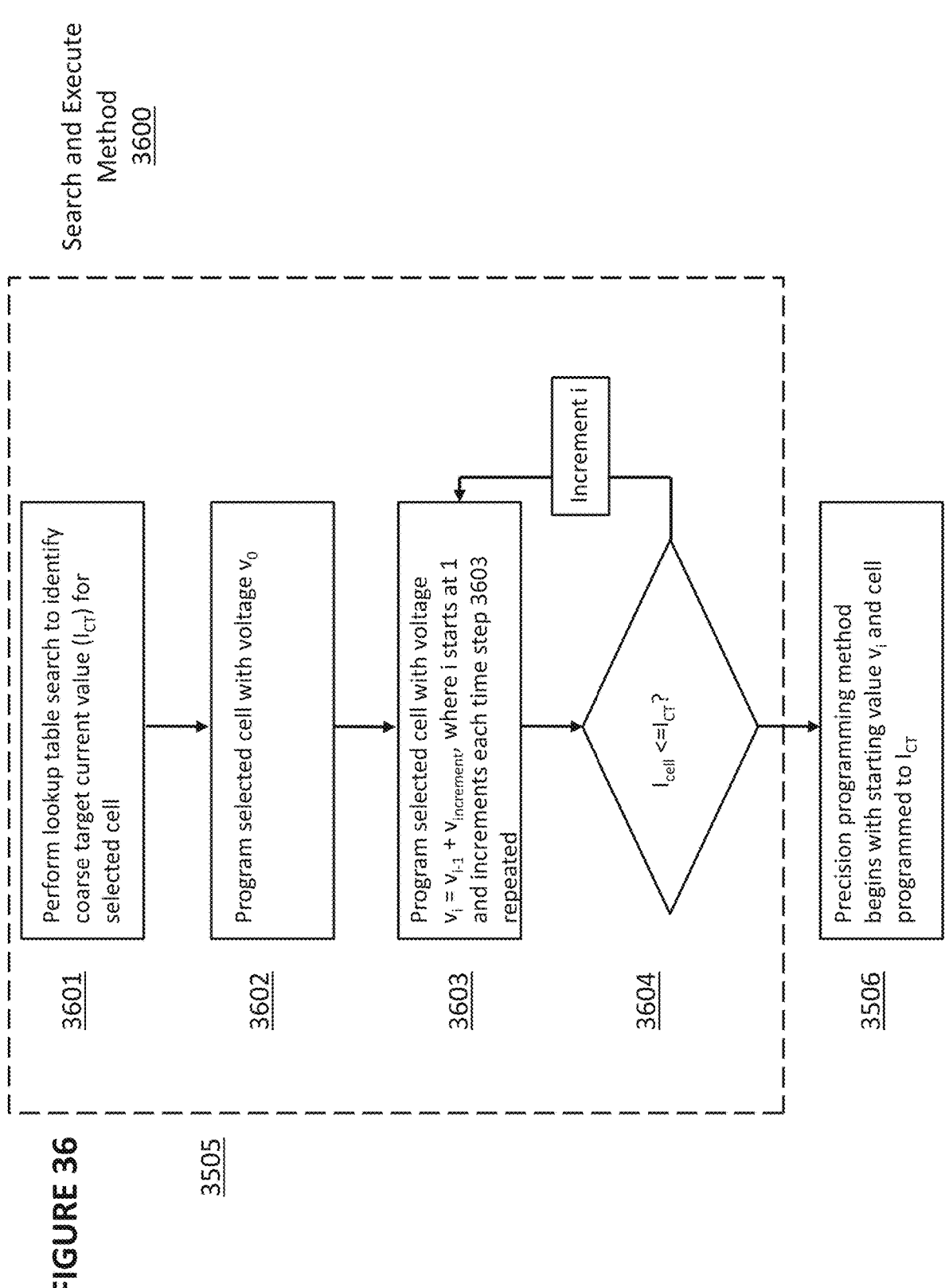

Search and Execute Method 3600

3601 Perform lookup table search to identify coarse target current value ($I_{CT}$) for selected cell 3602 Program selected cell with voltage $v_0$ 3603 Program selected cell with voltage $v_i = v_{i-1} + v_{increment}$ where i starts at 1 and increments each time step 3603 repeated Increment i 3604 $I_{cell} <= I_{CT}$?

3506 Precision programming method begins with starting value $v_i$ and cell programmed to $I_{CT}$

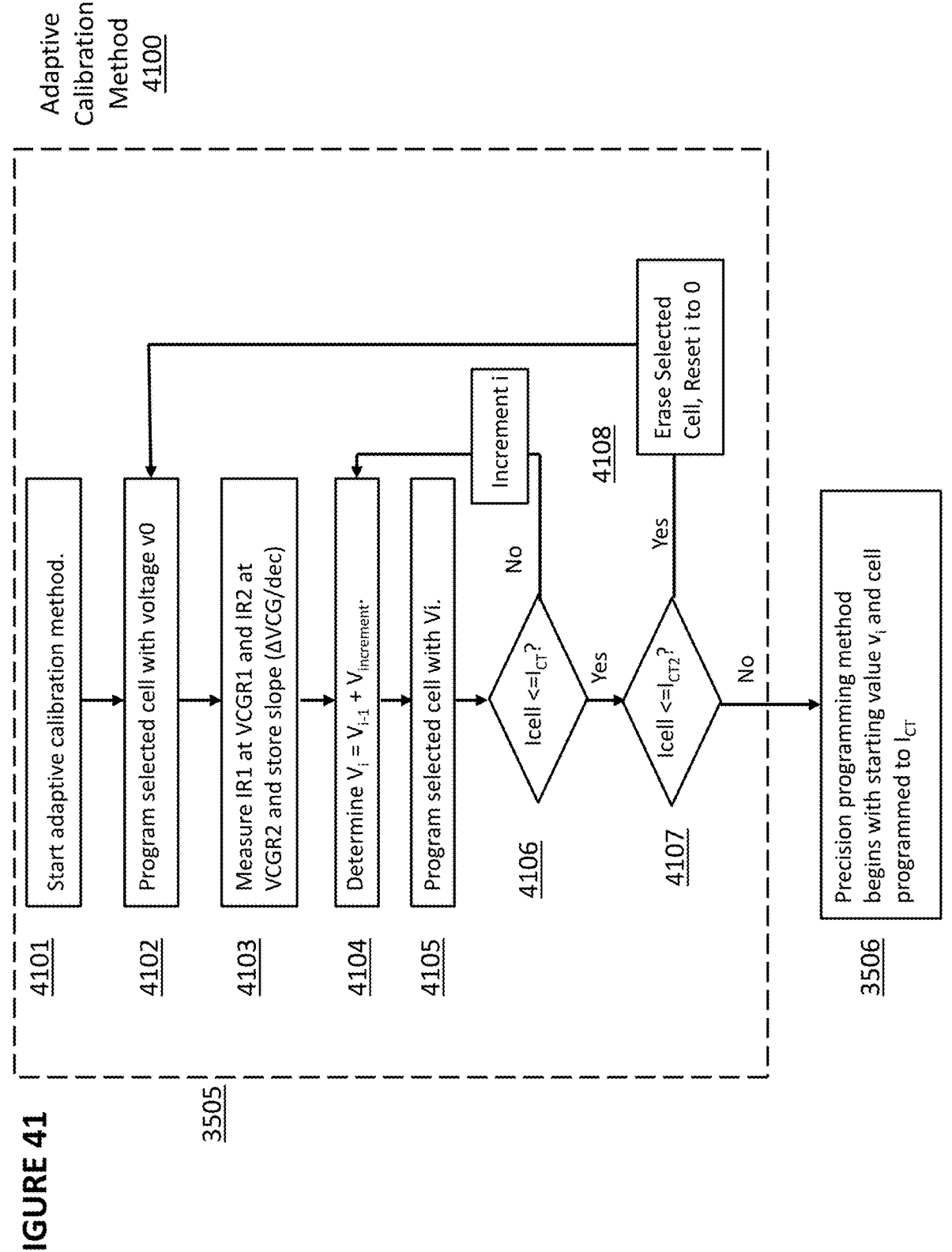

Adaptive Calibration Method 4100

4101 Start adaptive calibration method.

4102 Program selected cell with voltage v0

4103 Measure IR1 at VCGR1 and IR2 at VCGR2 and store slope (ΔVCG/dec)

4104 Determine $V_i = V_{i-1} + V_{increment}$.

4105 Program selected cell with Vi.

4106 Icell <=$I_{CT}$? No / Yes

Increment i

4107 Icell <=$I_{CT2}$? Yes / No

4108 Erase Selected Cell, Reset i to 0

3505

3506 Precision programming method begins with starting value $v_i$ and cell programmed to $I_{CT}$

FIGURE 42

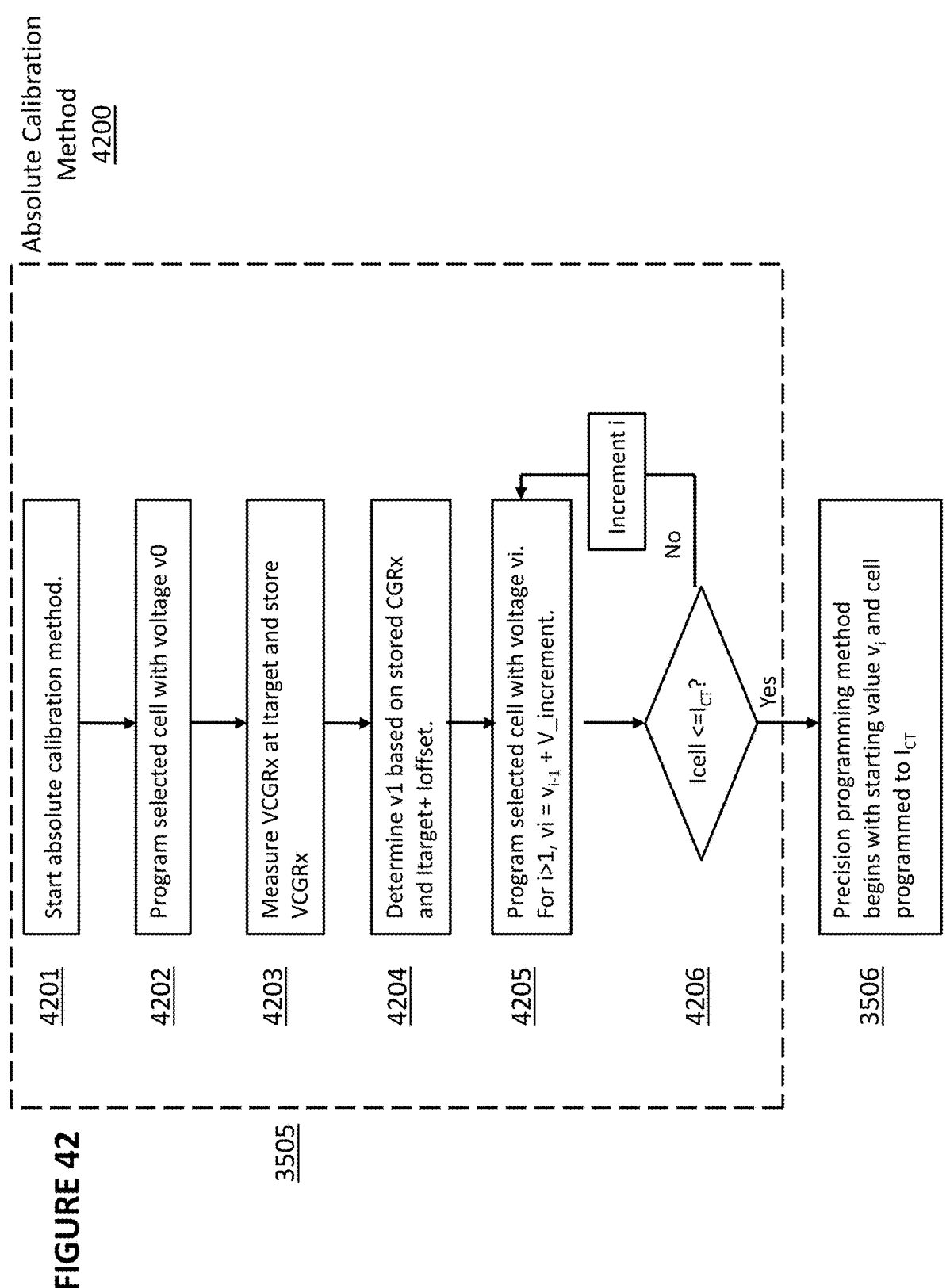

Absolute Calibration Method 4200

4201 Start absolute calibration method.

4202 Program selected cell with voltage v0

4203 Measure VCGRx at Itarget and store VCGRx

4204 Determine v1 based on stored CGRx and Itarget+ Ioffset.

4205 Program selected cell with voltage vi. For i>1, vi = $v_{i-1}$ + V_increment.

4206 Icell <=$I_{CT}$?

Increment i

No

Yes

3505

3506 Precision programming method begins with starting value $v_i$ and cell programmed to $I_{CT}$

FIGURE 44A

ITV+ADC+Verify Circuit
4488

ITV
4401

SAR ADC
4402

Verify Circuit
4403

Physical Array
4700

Reference Array
4304

VMM Array
3401

Physical Array
4600

VMM Array
3401

Reference Array
4304

Physical Array
4801

VMM Array
3401

Physical Array
4802

Reference Array
4304

FIGURE 49

Reference Array
4304

| Reference Sub-Array 4901-0 |
| Reference Sub-Array 4901-1 |
| ... |
| Reference Sub-Array 4901-(n-1) |
| Reference Sub-Array 4901-n |

FIGURE 50

Reference Array
4304

| | |
|---|---|
| Reference Sub-Array 5001-0 | Reference Sub-Array 5002-0 |
| Reference Sub-Array 5001-1 | Reference Sub-Array 5002-1 |
| ... | ... |
| Reference Sub-Array 5001-(n-1) | Reference Sub-Array 5002-(n-1) |
| Reference Sub-Array 5001-n | Reference Sub-Array 5002-n |

VERIFICATION METHOD AND SYSTEM IN ARTIFICIAL NEURAL NETWORK ARRAY

PRIORITY CLAIM

This application claims priority to U.S. Provisional Patent Application No. 63/409,142, titled "Verification Method and System in Artificial Neural Network Array" and filed on Sep. 22, 2022, which is incorporated by reference herein.

FIELD OF THE INVENTION

Numerous examples are disclosed of verification circuitry and associated methods in an artificial neural network.

BACKGROUND OF THE INVENTION

Artificial neural networks mimic biological neural networks (the central nervous systems of animals, in particular the brain) and are used to estimate or approximate functions that can depend on a large number of inputs and are generally unknown. Artificial neural networks generally include layers of interconnected "neurons" which exchange messages between each other.

FIG. 1 illustrates an artificial neural network, where the circles represent the inputs or layers of neurons. The connections (called synapses) are represented by arrows and have numeric weights that can be tuned based on experience. This makes neural networks adaptive to inputs and capable of learning. Typically, neural networks include a layer of multiple inputs. There are typically one or more intermediate layers of neurons, and an output layer of neurons that provide the output of the neural network. The neurons at each level individually or collectively make a decision based on the received data from the synapses.

One of the major challenges in the development of artificial neural networks for high-performance information processing is a lack of adequate hardware technology. Indeed, practical neural networks rely on a very large number of synapses, enabling high connectivity between neurons, i.e., a very high computational parallelism. In principle, such complexity can be achieved with digital supercomputers or specialized graphics processing unit clusters. However, in addition to high cost, these approaches also suffer from mediocre energy efficiency as compared to biological networks, which consume much less energy primarily because they perform low-precision analog computation. CMOS analog circuits have been used for artificial neural networks, but most CMOS-implemented synapses have been too bulky given the high number of neurons and synapses.

Applicant previously disclosed an artificial (analog) neural network that utilizes one or more non-volatile memory arrays as the synapses in U.S. Patent Application Publication 2017/0337466A1, which is incorporated by reference. The non-volatile memory arrays operate as an analog neural memory and comprise non-volatile memory cells arranged in rows and columns. The neural network includes a first plurality of synapses configured to receive a first plurality of inputs and to generate therefrom a first plurality of outputs, and a first plurality of neurons configured to receive the first plurality of outputs. The first plurality of synapses includes a plurality of memory cells, wherein each of the memory cells includes spaced apart source and drain regions formed in a semiconductor substrate with a channel region extending there between, a floating gate disposed over and insulated from a first portion of the channel region and a non-floating gate disposed over and insulated from a second portion of the channel region. Each of the plurality of memory cells store a weight value corresponding to a number of electrons on the floating gate. The plurality of memory cells multiply the first plurality of inputs by the stored weight values to generate the first plurality of outputs.

Non-Volatile Memory Cells

Non-volatile memories are well known. For example, U.S. Pat. No. 5,029,130 ("the '130 patent"), which is incorporated herein by reference, discloses an array of split gate non-volatile memory cells, which are a type of flash memory cells. Such a memory cell 210 is shown in FIG. 2. Each memory cell 210 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 210 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 210 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 210 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 210 for performing read, erase, and program operations:

TABLE NO 1

| Operation of Flash Memory Cell 210 of FIG. 2 | | | |
|---|---|---|---|
| | WL | BL | SL |
| Read | 2-3 V | 0.6-2 V | 0 V |
| Erase | ~11-13 V | 0 V | 0 V |
| Program | 1-2 V | 10.5-3 μA | 9-10 V |

Other split gate memory cell configurations, which are other types of flash memory cells, are known. For example, FIG. 3 depicts a four-gate memory cell 310 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 310 for performing read, erase, and program operations:

TABLE NO 2

| Operation of Flash Memory Cell 310 of FIG. 3 | | | | |
|---|---|---|---|---|
| | WL/SG | BL | CG | EG | SL |
| Read | 1.0-2 V | 0.6-2 V | 0-2.6 V | 0-2.6 V | 0 V |
| Erase | −0.5 V/0 V | 0 V | 0 V/−8 V | 8-12 V | 0 V |
| Program | 1 V | 0.1-1 μA | 8-11 V | 4.5-9 V | 4.5-5 V |

FIG. 4 depicts a three-gate memory cell 410, which is another type of flash memory cell. Memory cell 410 is identical to the memory cell 310 of FIG. 3 except that memory cell 410 does not have a separate control gate. The erase operation (whereby erasing occurs through use of the erase gate) and read operation are similar to that of the FIG. 3 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 410 for performing read, erase, and program operations:

TABLE NO 3

| Operation of Flash Memory Cell 410 of FIG. 4 | | | |
|---|---|---|---|
| | WL/SG | BL | EG | SL |
| Read | 0.7-2.2 V | 0.6-2 V | 0-2.6 V | 0 V |
| Erase | −0.5 V/0 V | 0 V | 11.5 V | 0 V |
| Program | 1 V | 0.2-3 μA | 4.5 V | 7-9 V |

FIG. 5 depicts stacked gate memory cell 510, which is another type of flash memory cell. Memory cell 510 is similar to memory cell 210 of FIG. 2, except that floating gate 20 extends over the entire channel region 18, and control gate 22 (which here will be coupled to a word line) extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 510 and substrate 12 for performing read, erase, and program operations:

TABLE NO 4

| Operation of Flash Memory Cell 510 of FIG. 5 | | | |
|---|---|---|---|
| | CG | BL | SL | Substrate |
| Read | 2-5 V | 0.6-2 V | 0 V | 0 V |
| Erase | −8 to −10 V/0 V | FLT | FLT | 8-10 V/15-20 V |
| Program | 8-12 V | 3-5 V | 0 V | 0 V |

The methods and means described herein may apply to other non-volatile memory technologies such as FINFET split gate flash or stack gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferroelectric ram), CT (charge trap) memory, CN (carbon-tube) memory, OTP (bi-level or multi-level one time programmable), and CeRAM (correlated electron ram), without limitation.

In order to utilize the memory arrays comprising one of the types of non-volatile memory cells described above in an artificial neural network, two modifications are made. First, the lines are configured so that each memory cell can be individually programmed, erased, and read without adversely affecting the memory state of other memory cells in the array, as further explained below. Second, continuous (analog) programming of the memory cells is provided.

Specifically, the memory state (i.e., charge on the floating gate) of each memory cell in the array can be continuously changed from a fully erased state to a fully programmed state, and vice-versa, independently and with minimal disturbance of other memory cells. This means the cell storage is effectively analog or at the very least can store one of many discrete values (such as 16 or 64 different values), which allows for very precise and individual tuning of all the memory cells in the memory array, and which makes the memory array ideal for storing and making fine tuning adjustments to the synapsis weights of the neural network.

Neural Networks Employing Non-Volatile Memory Cell Arrays

FIG. 6 conceptually illustrates a non-limiting example of a neural network utilizing a non-volatile memory array of the present examples. This example uses the non-volatile memory array neural network for a facial recognition application, but any other appropriate application could be implemented using a non-volatile memory array based neural network.

S0 is the input layer, which for this example is a 32×32 pixel RGB image with 5 bit precision (i.e. three 32×32 pixel arrays, one for each color R, G and B, each pixel being 5 bit precision). The synapses CB1 going from input layer S0 to layer C1 apply different sets of weights in some instances and shared weights in other instances and scan the input image with 3×3 pixel overlapping filters (kernel), shifting the filter by 1 pixel (or more than 1 pixel as dictated by the model). Specifically, values for 9 pixels in a 3×3 portion of the image (i.e., referred to as a filter or kernel) are provided to the synapses CB1, where these 9 input values are multiplied by the appropriate weights and, after summing the outputs of that multiplication, a single output value is determined and provided by a first synapse of CB1 for generating a pixel of one of the feature maps of layer C1.

The 3×3 filter is then shifted one pixel to the right within input layer S0 (i.e., adding the column of three pixels on the right, and dropping the column of three pixels on the left), whereby the 9 pixel values in this newly positioned filter are provided to the synapses CB1, where they are multiplied by the same weights and a second single output value is determined by the associated synapse. This process is continued until the 3×3 filter scans across the entire 32×32 pixel image of input layer S0, for all three colors and for all bits (precision values). The process is then repeated using different sets of weights to generate a different feature map of layer C1, until all the features maps of layer C1 have been calculated.

In layer C1, in the present example, there are 16 feature maps, with 30×30 pixels each. Each pixel is a new feature pixel extracted from multiplying the inputs and kernel, and therefore each feature map is a two dimensional array, and thus in this example layer C1 constitutes 16 layers of two dimensional arrays (keeping in mind that the layers and arrays referenced herein are logical relationships, not necessarily physical relationships—i.e., the arrays are not necessarily oriented in physical two dimensional arrays). Each of the 16 feature maps in layer C1 is generated by one of sixteen different sets of synapse weights applied to the filter scans. The C1 feature maps could all be directed to different aspects of the same image feature, such as boundary identification. For example, the first map (generated using a first weight set, shared for all scans used to generate this first map) could identify circular edges, the second map (generated using a second weight set different from the first weight set) could identify rectangular edges, or the aspect ratio of certain features, and so on.

An activation function P1 (pooling) is applied before going from layer C1 to layer S1, which pools values from consecutive, non-overlapping 2×2 regions in each feature map. The purpose of the pooling function P1 is to average out the nearby location (or a max function can also be used), to reduce the dependence of the edge location for example and to reduce the data size before going to the next stage. At layer S1, there are 16 15×15 feature maps (i.e., sixteen different arrays of 15×15 pixels each). The synapses CB2 going from layer S1 to layer C2 scan maps in layer S1 with 4×4 filters, with a filter shift of 1 pixel. At layer C2, there are 22 12×12 feature maps. An activation function P2 (pooling) is applied before going from layer C2 to layer S2, which pools values from consecutive non-overlapping 2×2 regions in each feature map. At layer S2, there are 22 6×6 feature maps. An activation function (pooling) is applied at the synapses CB3 going from layer S2 to layer C3, where every neuron in layer C3 connects to every map in layer S2 via a respective synapse of CB3. At layer C3, there are 64 neurons. The synapses CB4 going from layer C3 to the output layer S3 fully connects C3 to S3, i.e. every neuron in layer C3 is connected to every neuron in layer S3. The output at S3 includes 10 neurons, where the highest output neuron determines the class. This output could, for example, be indicative of an identification or classification of the contents of the original image.

Each layer of synapses is implemented using an array, or a portion of an array, of non-volatile memory cells.

FIG. 7 is a block diagram of an array that can be used for that purpose. Vector-by-matrix multiplication (VMM) array 32 includes non-volatile memory cells and is utilized as the synapses (such as CB1, CB2, CB3, and CB4 in FIG. 6) between one layer and the next layer. Specifically, VMM array 32 includes an array of non-volatile memory cells 33, erase gate and word line gate decoder 34, control gate decoder 35, bit line decoder 36 and source line decoder 37, which decode the respective inputs for the non-volatile memory cell array 33. Input to VMM array 32 can be from the erase gate and wordline gate decoder 34 or from the control gate decoder 35. Source line decoder 37 in this example also decodes the output of the non-volatile memory cell array 33. Alternatively, bit line decoder 36 can decode the output of the non-volatile memory cell array 33.

Non-volatile memory cell array 33 serves two purposes. First, it stores the weights that will be used by the VMM array 32. Second, the non-volatile memory cell array 33 effectively multiplies the inputs by the weights stored in the non-volatile memory cell array 33 and adds them up per output line (source line or bit line) to produce the output, which will be the input to the next layer or input to the final layer. By performing the multiplication and addition function, the non-volatile memory cell array 33 negates the need for separate multiplication and addition logic circuits and is also power efficient due to its in-situ memory computation.

The output of non-volatile memory cell array 33 is supplied to a differential summer (such as a summing op-amp or a summing current mirror) 38, which sums up the outputs of the non-volatile memory cell array 33 to create a single value for that convolution. The differential summer 38 is arranged to perform summation of positive weight and negative weight.

The summed-up output values of differential summer 38 are then supplied to an activation function block 39, which rectifies the output. The activation function block 39 may provide sigmoid, tanh, or ReLU functions. The rectified output values of activation function block 39 become an element of a feature map as the next layer (e.g. C1 in FIG. 6), and are then applied to the next synapse to produce the next feature map layer or final layer. Therefore, in this example, non-volatile memory cell array 33 constitutes a plurality of synapses (which receive their inputs from the prior layer of neurons or from an input layer such as an image database), and summing op-amp 38 and activation function block 39 constitute a plurality of neurons.

The input to VMM array 32 in FIG. 7 (WLx, EGx, CGx, and optionally BLx and SLx) can be analog level, binary level, or digital bits (in which case a DAC is provided to convert digital bits to appropriate input analog level) and the output can be analog level, binary level, or digital bits (in which case an output ADC is provided to convert output analog level into digital bits).

FIG. 8 is a block diagram depicting the usage of numerous layers of VMM arrays 32, here labeled as VMM arrays 32a, 32b, 32c, 32d, and 32e. As shown in FIG. 8, the input, denoted Inputx, is converted from digital to analog by a digital-to-analog converter 31 and provided to input VMM array 32a. The converted analog inputs could be voltage or current. The input D/A conversion for the first layer could be done by using a function or a LUT (look up table) that maps the inputs Inputx to appropriate analog levels for the matrix multiplier of input VMM array 32a. The input conversion could also be done by an analog to analog (A/A) converter to convert an external analog input to a mapped analog input to the input VMM array 32a.

The output generated by input VMM array 32a is provided as an input to the next VMM array (hidden level 1) 32b, which in turn generates an output that is provided as an input to the next VMM array (hidden level 2) 32c, and so on. The various layers of VMM array 32 function as different layers of synapses and neurons of a convolutional neural network (CNN). Each VMM array 32a, 32b, 32c, 32d, and 32e can be a stand-alone, physical non-volatile memory array, or multiple VMM arrays could utilize different portions of the same physical non-volatile memory array, or multiple VMM arrays could utilize overlapping portions of the same physical non-volatile memory array. The example shown in FIG. 8 contains five layers (32a,32b,32c,32d,32e): one input layer (32a), two hidden layers (32b,32c), and two fully connected layers (32d,32e). One of ordinary skill in the art will appreciate that this is merely an example and that a system instead could comprise more than two hidden layers and more than two fully connected layers.

Vector-by-Matrix Multiplication (VMM) Arrays

FIG. 9 depicts neuron VMM array 900, which is particularly suited for memory cells 310 as shown in FIG. 3 and is utilized as the synapses and parts of neurons between an input layer and the next layer. VMM array 900 comprises memory array 901 of non-volatile memory cells and reference array 902 (at the top of the array) of non-volatile reference memory cells. Alternatively, another reference array can be placed at the bottom.

In VMM array 900, control gate lines, such as control gate line 903, run in a vertical direction (hence reference array 902 in the row direction is orthogonal to control gate line 903), and erase gate lines, such as erase gate line 904, run in a horizontal direction. Here, the inputs to VMM array 900 are provided on the control gate lines (CG0, CG1, CG2, CG3), and the output of VMM array 900 emerges on the source lines (SL0, SL1). In one example, only even rows are used, and in another example, only odd rows are used. The current placed on each source line (SL0, SL1, respectively) performs a summing function of all the currents from the memory cells connected to that particular source line.

As described herein for neural networks, the non-volatile memory cells of VMM array 900, i.e., the memory cells 310 of VMM array 900, may be configured to operate in a sub-threshold region.

The non-volatile reference memory cells and the non-volatile memory cells described herein are biased in weak inversion (sub threshold region):

$$Ids=Io*e^{(Vg-Vth)/nVt}=w*Io*e^{(Vg)/nVt},$$

where $w=e^{(-Vth)/nVt}$ where Ids is the drain to source current; Vg is gate voltage on the memory cell; Vth is threshold voltage of the memory cell; Vt is thermal voltage=k*T/q with k being the Boltzmann constant, T the temperature in Kelvin, and q the electronic charge; n is a slope factor=1+(Cdep/Cox) with Cdep=capacitance of the depletion layer, and Cox capacitance of the gate oxide layer; Io is the memory cell current at gate voltage equal to threshold voltage, Io is proportional to $(Wt/L)*u*Cox*(n-1)*Vt^2$ where u is carrier mobility and Wt and L are width and length, respectively, of the memory cell.

For an I-to-V log converter using a memory cell (such as a reference memory cell or a peripheral memory cell) or a transistor to convert input current into an input voltage:

$$Vg=n*Vt*\log[Ids/wp*Io]$$

where, wp is w of a reference or peripheral memory cell.

For a memory array used as a vector matrix multiplier VMM array with the current input, the output current is:

$$Iout=wa*Io*e^{(Vg)/nVt}, \text{namely}$$

$$Iout=(wa/wp)*Iin=W*Iin$$

$$W=e^{(Vthp-Vtha)/nVt}$$

Here, wa=w of each memory cell in the memory array.

Vthp is effective threshold voltage of the peripheral memory cell and Vtha is effective threshold voltage of the main (data) memory cell. Note that the threshold voltage of a transistor is a function of substrate body bias voltage and the substrate body bias voltage, denoted Vsb, can be modulated to compensate for various conditions, on such temperature. The threshold voltage Vth can be expressed as:

$$Vth=Vth0+gamma(SQRT|Vsb-2*\varphi F|-SQRT|2*\varphi F|)$$

where Vth0 is threshold voltage with zero substrate bias, $\varphi F$ is a surface potential, and gamma is a body effect parameter.

A wordline or control gate can be used as the input for the memory cell for the input voltage.

Alternatively, the flash memory cells of VMM arrays described herein can be configured to operate in the linear region:

$$Ids=beta*(Vgs-Vth)*Vds;beta=u*Cox*Wt/L$$

$$W=\alpha(Vgs-Vth)$$

meaning weight W in the linear region is proportional to (Vgs–Vth)

A wordline or control gate or bitline or sourceline can be used as the input for the memory cell operated in the linear region. The bitline or sourceline can be used as the output for the memory cell.

For an I-to-V linear converter, a memory cell (such as a reference memory cell or a peripheral memory cell) or a transistor operating in the linear region can be used to linearly convert an input/output current into an input/output voltage.

Alternatively, the memory cells of VMM arrays described herein can be configured to operate in the saturation region:

$$Ids=\tfrac{1}{2}*beta*(Vgs-Vth)^2;beta=u*Cox*Wt/L$$

$$W\alpha(Vgs-Vth)^2, \text{ meaning weight } W \text{ is proportional to } (Vgs-Vth)^2$$

A wordline, control gate, or erase gate can be used as the input for the memory cell operated in the saturation region. The bitline or sourceline can be used as the output for the output neuron.

Alternatively, the memory cells of VMM arrays described herein can be used in all regions or a combination thereof (sub threshold, linear, or saturation) for each layer or multi layers of a neural network.

Other examples for VMM array 32 of FIG. 7 are described in U.S. Pat. No. 10,748,630, which is incorporated by reference herein. As described in that application. a sourceline or a bitline can be used as the neuron output (current summation output).

FIG. 10 depicts neuron VMM array 1000, which is particularly suited for memory cells 210 as shown in FIG. 2 and is utilized as the synapses between an input layer and the next layer. VMM array 1000 comprises a memory array 1003 of non-volatile memory cells, reference array 1001 of first non-volatile reference memory cells, and reference array 1002 of second non-volatile reference memory cells. Reference arrays 1001 and 1002, arranged in the column direction of the array, serve to convert current inputs flowing into terminals BLR0, BLR1, BLR2, and BLR3 into voltage inputs WL0, WL1, WL2, and WL3. In effect, the first and second non-volatile reference memory cells are diode-connected through multiplexors 1014 (only partially depicted) with current inputs flowing into them. The reference cells are tuned (e.g., programmed) to target reference levels. The target reference levels are provided by a reference mini-array matrix (not shown).

Memory array 1003 serves two purposes. First, it stores the weights that will be used by the VMM array 1000 on respective memory cells thereof. Second, memory array 1003 effectively multiplies the inputs (i.e. current inputs provided in terminals BLR0, BLR1, BLR2, and BLR3, which reference arrays 1001 and 1002 convert into the input voltages to supply to wordlines WL0, WL1, WL2, and WL3) by the weights stored in the memory array 1003 and then adds all the results (memory cell currents) to produce the output on the respective bit lines (BL0-BLN), which will be the input to the next layer or input to the final layer. By performing the multiplication and addition function, memory array 1003 negates the need for separate multiplication and addition logic circuits and is also power efficient. Here, the voltage inputs are provided on the word lines WL0, WL1, WL2, and WL3, and the output emerges on the respective bit lines BL0-BLN during a read (inference) operation. The current placed on each of the bit lines BL0-BLN performs a summing function of the currents from all non-volatile memory cells connected to that particular bitline.

Table No. 5 depicts operating voltages and currents for VMM array 1000. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 5

| | | | Operation of VMM Array 1000 of FIG. 10: | | | |
|---|---|---|---|---|---|---|
| | WL | WL -unsel | BL | BL -unsel | SL | SL -unsel |
| Read | 1-3.5 V | −0.5 V/0 V | 0.6-2 V (Ineuron) | 0.6 V-2 V/0 V | 0 V | 0 V |
| Erase | ~5-13 V | 0 V | 0 V | 0 V | 0 V | 0 V |
| Program | 1-2 V | −0.5 V/0 V | 0.1-3 uA | Vinh ~2.5 V | 4-10 V | 0-1 V/FLT |

FIG. 11 depicts neuron VMM array 1100, which is particularly suited for memory cells 210 as shown in FIG. 2 and is utilized as the synapses and parts of neurons between an input layer and the next layer. VMM array 1100 comprises a memory array 1103 of non-volatile memory cells, reference array 1101 of first non-volatile reference memory cells, and reference array 1102 of second non-volatile reference memory cells. Reference arrays 1101 and 1102 run in row direction of the VMM array 1100. VMM array is similar to VMM 1000 except that in VMM array 1100, the word lines run in the vertical direction. Here, the inputs are provided on the word lines (WLA0, WLB0, WLA1, WLB2, WLA2, WLB2, WLA3, WLB3), and the output emerges on the source line (SL0, SL1) during a read operation. The current placed on each source line performs a summing function of all the currents from the memory cells connected to that particular source line.

Table No. 6 depicts operating voltages and currents for VMM array 1100. The columns in the table indicate the voltages placed on word lines for selected cells, word lines for unselected cells, bit lines for selected cells, bit lines for unselected cells, source lines for selected cells, and source lines for unselected cells. The rows indicate the operations of read, erase, and program.

TABLE NO. 6

| | | | Operation of VMM Array 1100 of FIG. 11 | | | |
|---|---|---|---|---|---|---|
| | WL | WL -unsel | BL | BL -unsel | SL | SL -unsel |
| Read | 1-3.5 V | −0.5 V/0 V | 0.6-2 V | 0.6 V-2 V/0 V | ~0.3-1 V (Ineuron) | 0 V |
| Erase | ~5-13 V | 0 V | 0 V | 0 V | 0 V | SL-inhibit (~4-8 V) |
| Program | 1-2 V | −0.5 V/0 V | 0.1-3 uA | Vinh ~2.5 V | 4-10 V | 0-1 V/FLT |

FIG. 12 depicts neuron VMM array 1200, which is particularly suited for memory cells 310 as shown in FIG. 3 and is utilized as the synapses and parts of neurons between an input layer and the next layer. VMM array 1200 comprises a memory array 1203 of non-volatile memory cells, reference array 1201 of first non-volatile reference memory cells, and reference array 1202 of second non-volatile reference memory cells. Reference arrays 1201 and 1202 serve to convert current inputs flowing into terminals BLR0, BLR1, BLR2, and BLR3 into voltage inputs CG0, CG1, CG2, and CG3. In effect, the first and second non-volatile reference memory cells are diode-connected through multiplexors 1212 (only partially shown) with current inputs flowing into them through BLR0, BLR1, BLR2, and BLR3. Multiplexors 1212 each include a respective multiplexor 1205 and a cascoding transistor 1204 to ensure a constant voltage on the bitline (such as BLR0) of each of the first and second non-volatile reference memory cells during a read operation. The reference cells are tuned to target reference levels.

Memory array 1203 serves two purposes. First, it stores the weights that will be used by the VMM array 1200. Second, memory array 1203 effectively multiplies the inputs (current inputs provided to terminals BLR0, BLR1, BLR2, and BLR3, for which reference arrays 1201 and 1202 convert these current inputs into the input voltages to supply to the control gates (CG0, CG1, CG2, and CG3) by the weights stored in the memory array and then add all the results (cell currents) to produce the output, which appears on BL0-BLN, and will be the input to the next layer or input to the final layer. By performing the multiplication and addition function, the memory array negates the need for separate multiplication and addition logic circuits and is also power efficient. Here, the inputs are provided on the control gate lines (CG0, CG1, CG2, and CG3), and the output emerges on the bit lines (BL0-BLN) during a read operation. The current placed on each bitline performs a summing function of all the currents from the memory cells connected to that particular bitline.

VMM array 1200 implements uni-directional tuning for non-volatile memory cells in memory array 1203. That is, each non-volatile memory cell is erased and then partially programmed until the desired charge on the floating gate is reached. If too much charge is placed on the floating gate (such that the wrong value is stored in the cell), the cell is erased and the sequence of partial programming operations starts over. As shown, two rows sharing the same erase gate (such as EG0 or EG1) are erased together (which is known as a page erase), and thereafter, each cell is partially programmed until the desired charge on the floating gate is reached.

Table No. 7 depicts operating voltages and currents for VMM array 1200. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

TABLE NO. 7

| Operation of VMM Array 1200 of FIG. 12 | | | | | | | | | | | |
|---|---|---|---|---|---|---|---|---|---|---|---|
| | WL | WL - unsel | BL | BL - unsel | CG | CG - unsel same sector | CG - unsel | EG | EG - unsel | SL | SL - unsel |
| Read | 1.0-2 V | −0.5 V/ 0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 0-2.6 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 13 depicts neuron VMM array 1300, which is particularly suited for memory cells 310 as shown in FIG. 3, and is utilized as the synapses and parts of neurons between an input layer and the next layer. VMM array 1300 comprises a memory array 1303 of non-volatile memory cells, reference array 1301 or first non-volatile reference memory cells, and reference array 1302 of second non-volatile reference memory cells. EG lines EGR0, EG0, EG1 and EGR1 are run vertically while CG lines CG0, CG1, CG2 and CG3 and SL lines WL0, WL1, WL2 and WL3 are run horizontally. VMM array 1300 is similar to VMM array 1400, except that VMM array 1300 implements bi-directional tuning, where each individual cell can be completely erased, partially programmed, and partially erased as needed to reach the desired amount of charge on the floating gate due to the use of separate EG lines. As shown, reference arrays 1301 and 1302 convert input current in the terminal BLR0, BLR1, BLR2, and BLR3 into control gate voltages CG0, CG1, CG2, and CG3 (through the action of diode-connected reference cells through multiplexors 1314) to be applied to the memory cells in the row direction. The current output (neuron) is in the bit lines BL0-BLN, where each bit line sums all currents from the non-volatile memory cells connected to that particular bitline.

Table No. 8 depicts operating voltages and currents for VMM array 1300. The columns in the table indicate the voltages placed on word lines for selected cells, word lines for unselected cells, bit lines for selected cells, bit lines for unselected cells, control gates for selected cells, control gates for unselected cells in the same sector as the selected cells, control gates for unselected cells in a different sector than the selected cells, erase gates for selected cells, erase gates for unselected cells, source lines for selected cells, and source lines for unselected cells. The rows indicate the operations of read, erase, and program.

and is utilized as the synapses and parts of neurons between an input layer and the next layer. In this example, the inputs $INPUT_0, \ldots, INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 25 depicts neuron VMM array 2500, which is particularly suited for memory cells 310 as shown in FIG. 3, and is utilized as the synapses and parts of neurons between an input layer and the next layer. In this example, the inputs $INPUT_0, \ldots INPUT_M$ are received on word lines $WL_0, \ldots, WL_M$, respectively, and the outputs $OUTPUT_0, \ldots OUTPUT_N$ are generated on bit lines $BL_0, \ldots, BL_N$.

FIG. 26 depicts neuron VMM array 2600, which is particularly suited for memory cells 410 as shown in FIG. 4, and is utilized as the synapses and parts of neurons between an input layer and the next layer. In this example, the inputs $INPUT_0, \ldots, INPUT_n$ are received on vertical control gate lines $CG_0, \ldots, CG_N$, respectively, and the outputs $OUTPUT_1$ and $OUTPUT_2$ are generated on source lines $SL_0$ and $SL_1$.

FIG. 27 depicts neuron VMM array 2700, which is particularly suited for memory cells 410 as shown in FIG. 4 and is utilized as the synapses and parts of neurons between an input layer and the next layer. In this example, the inputs $INPUT_0, \ldots INPUT_N$ are received on the gates of bit line control gates 2701-1, 2701-2, ..., 2701-(N–1), and 2701-N, respectively, which are coupled to bit lines $BL_0, \ldots, BL_N$, respectively. Example outputs $OUTPUT_1$ and $OUTPUT_2$ are generated on source lines $SL_0$ and $SL_1$.

FIG. 28 depicts neuron VMM array 2800, which is particularly suited for memory cells 310 as shown in FIG. 3, memory cells 510 as shown in FIG. 5, and memory cells 710 as shown in FIG. 7, and is utilized as the synapses and parts

TABLE NO. 8

Operation of VMM Array 1300 of FIG. 13

| | WL | WL - unsel | BL | BL - unsel | CG | CG - unsel same sector | CG - unsel | EG | EG - unsel | SL | SL - unsel |
|---|---|---|---|---|---|---|---|---|---|---|---|
| Read | 1.0-2 V | −0.5 V/0 V | 0.6-2 V (Ineuron) | 0 V | 0-2.6 V | 0-2.6 V | 0-2.6 V | 0-2.6 V | 0-2.6 V | 0 V | 0 V |
| Erase | 0 V | 0 V | 0 V | 0 V | 0 V | 4-9 V | 0-2.6 V | 5-12 V | 0-2.6 V | 0 V | 0 V |
| Program | 0.7-1 V | −0.5 V/0 V | 0.1-1 uA | Vinh (1-2 V) | 4-11 V | 0-2.6 V | 0-2.6 V | 4.5-5 V | 0-2.6 V | 4.5-5 V | 0-1 V |

FIG. 22 depicts neuron VMM array 2200, which is particularly suited for memory cells 210 as shown in FIG. 2 and is utilized as the synapses and parts of neurons between an input layer and the next layer. In VMM array 2200, the inputs $INPUT_0 \ldots, INPUT_N$ are received on bit lines $BL_0, \ldots BL_N$, respectively, and the outputs $OUTPUT_1$, $OUTPUT_2$, $OUTPUT_3$, and $OUTPUT_4$ are generated on source lines $SL_0$, $SL_1$, $SL_2$, and $SL_3$, respectively.

FIG. 23 depicts neuron VMM array 2300, which is particularly suited for memory cells 210 as shown in FIG. 2 and is utilized as the synapses and parts of neurons between an input layer and the next layer. In this example, the inputs $INPUT_0$, $INPUT_1$, $INPUT_2$, and $INPUT_3$ are received on source lines $SL_0$, $SL_1$, $SL_2$, and $SL_3$, respectively, and the outputs $OUTPUT_0, \ldots OUTPUT_N$ are generated on bit lines $BL_0, \ldots, BL_N$.

FIG. 24 depicts neuron VMM array 2400, which is particularly suited for memory cells 210 as shown in FIG. 2, of neurons between an input layer and the next layer. In this example, the inputs $INPUT_0, \ldots, INPUT_M$ are received on word lines $WL_0, \ldots, WL_M$, and the outputs $OUTPUT_0, \ldots, OUTPUT_N$ are generated on bit lines $BL_0, \ldots, BL_N$, respectively.

FIG. 29 depicts neuron VMM array 2900, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots, OUTPUT_N$ are generated on vertical source lines $SL_0, \ldots, SL_N$, respectively, where each source line SL' is coupled to the source lines of all memory cells in column i.

FIG. 30 depicts neuron VMM array 3000, which is particularly suited for memory cells 310 as shown in FIG. 3, memory cells 510 as shown in FIG. 5, and memory cells 710 as shown in FIG. 7, and is utilized as the synapses and parts of neurons between an input layer and the next layer. In this example, the inputs $INPUT_0, \ldots, INPUT_M$ are received on control gate lines $CG_0, \ldots, CG_M$. Outputs $OUTPUT_0, \ldots OUTPUT_N$ are generated on vertical bit lines $BL_0, \ldots, BL_N$, respectively, where each bit line $BL_i$ is coupled to the bit lines of all memory cells in column i.

Long Short-Term Memory

The prior art includes a concept known as long short-term memory (LSTM). LSTM units often are used in neural networks. LSTM allows a neural network to remember information over predetermined arbitrary time intervals and to use that information in subsequent operations. A conventional LSTM unit comprises a cell, an input gate, an output gate, and a forget gate. The three gates regulate the flow of information into and out of the cell and the time interval that the information is remembered in the LSTM. VMMs are particularly useful in LSTM units.

FIG. 14 depicts an example LSTM 1400. LSTM 1400 in this example comprises cells 1401, 1402, 1403, and 1404. Cell 1401 receives input vector $x_0$ and generates output vector $h_0$ and cell state vector $c_0$. Cell 1402 receives input vector $x_1$, the output vector (hidden state) $h_0$ from cell 1401, and cell state $c_0$ from cell 1401 and generates output vector $h_1$ and cell state vector $c_1$. Cell 1403 receives input vector $x_2$, the output vector (hidden state) $h_1$ from cell 1402, and cell state $c_1$ from cell 1402 and generates output vector $h_2$ and cell state vector $c_2$. Cell 1404 receives input vector $x_3$, the output vector (hidden state) $h_2$ from cell 1403, and cell state $c_2$ from cell 1403 and generates output vector $h_3$. Additional cells can be used, and an LSTM with four cells is merely an example.

FIG. 15 depicts an example implementation of an LSTM cell 1500, which can be used for cells 1401, 1402, 1403, and 1404 in FIG. 14, LSTM cell 1500 receives input vector x(t), cell state vector c(t–1) from a preceding cell, and output vector h(t–1) from a preceding cell, and generates cell state vector c(t) and output vector h(t).

LSTM cell 1500 comprises sigmoid function devices 1501, 1502, and 1503, each of which applies a number between 0 and 1 to control how much of each component in the input vector is allowed through to the output vector. LSTM cell 1500 also comprises tanh devices 1504 and 1505 to apply a hyperbolic tangent function to an input vector, multiplier devices 1506, 1507, and 1508 to multiply two vectors together, and addition device 1509 to add two vectors together. Output vector h(t) can be provided to the next LSTM cell in the system, or it can be accessed for other purposes.

FIG. 16 depicts an LSTM cell 1600, which is an example of an implementation of LSTM cell 1500. For the reader's convenience, the same numbering from LSTM cell 1500 is used in LSTM cell 1600. Sigmoid function devices 1501, 1502, and 1503 and tanh device 1504 each comprise multiple VMM arrays 1601 and activation function blocks 1602, Thus, it can be seen that VMM arrays are particular useful in LSTM cells used in certain neural network systems. The multiplier devices 1506, 1507, and 1508 and the addition device 1509 are implemented in a digital manner or in an analog manner. The activation function blocks 1602 can be implemented in a digital manner or in an analog manner.

An alternative to LSTM cell 1600 (and another example of an implementation of LSTM cell 1500) is shown in FIG. 17. In FIG. 17, sigmoid function devices 1501, 1502, and 1503 and tanh device 1504 share the same physical hardware (VMM arrays 1701 and activation function block 1702) in a time-multiplexed fashion. LSTM cell 1700 also comprises multiplier device 1703 to multiply two vectors together, addition device 1708 to add two vectors together, tanh device 1505 (which comprises activation function block 1702), register 1707 to store the value i(t) when i(t) is output from sigmoid function block 1702, register 1704 to store the value f(t)*c(t–1) when that value is output from multiplier device 1703 through multiplexor 1710, register 1705 to store the value i(t) u(t) when that value is output from multiplier device 1703 through multiplexor 1710, and register 1706 to store the value o(t)*c~(t) when that value is output from multiplier device 1703 through multiplexor 1710, and multiplexor 1709.

Whereas LSTM cell 1600 contains multiple sets of VMM arrays 1601 and respective activation function blocks 1602, LSTM cell 1700 contains only one set of VMM arrays 1701 and activation function block 1702, which are used to represent multiple layers in the example of LSTM cell 1700. LSTM cell 1700 will require less space than LSTM 1600, as LSTM cell 1700 will require ¼ as much space for VMMs and activation function blocks compared to LSTM cell 1600.

It can be further appreciated that LSTM units will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

Gated Recurrent Units

An analog VMM implementation can be utilized for a GRU (gated recurrent unit) system. GRUs are a gating mechanism in recurrent neural networks. GRUs are similar to LSTMs, except that GRU cells generally contain fewer components than an LSTM cell.

FIG. 18 depicts an example GRU 1800. GRU 1800 in this example comprises cells 1801, 1802, 1803, and 1804. Cell 1801 receives input vector $x_0$ and generates output vector $h_0$. Cell 1802 receives input vector $x_1$, the output vector $h_0$ from cell 1801 and generates output vector $h_1$. Cell 1803 receives input vector $x_2$ and the output vector (hidden state) $h_1$ from cell 1802 and generates output vector $h_2$. Cell 1804 receives input vector $x_3$ and the output vector (hidden state) $h_2$ from cell 1803 and generates output vector $h_3$. Additional cells can be used, and an GRU with four cells is merely an example.

FIG. 19 depicts an example implementation of a GRU cell 1900, which can be used for cells 1801, 1802, 1803, and 1804 of FIG. 18. GRU cell 1900 receives input vector x(t) and output vector h(t–1) from a preceding GRU cell and generates output vector h(t), GRU cell 1900 comprises sigmoid function devices 1901 and 1902, each of which applies a number between 0 and 1 to components from output vector h(t–1) and input vector x(t). GRU cell 1900 also comprises a tanh device 1903 to apply a hyperbolic tangent function to an input vector, a plurality of multiplier devices 1904, 1905, and 1906 to multiply two vectors together, an addition device 1907 to add two vectors together, and a complementary device 1908 to subtract an input from 1 to generate an output.

FIG. 20 depicts a GRU cell 2000, which is an example of an implementation of GRU cell 1900. For the reader's convenience, the same numbering from GRU cell 1900 is used in GRU cell 2000. As can be seen in FIG. 20, sigmoid function devices 1901 and 1902, and tanh device 1903 each comprise multiple VMM arrays 2001 and activation function blocks 2002. Thus, it can be seen that VMM arrays are of particular use in GRU cells used in certain neural network systems. The multiplier devices 1904, 1905, 1906, the addition device 1907, and the complementary device 1908 are implemented in a digital manner or in an analog manner. The activation function blocks 2002 can be implemented in a digital manner or in an analog manner.

An alternative to GRU cell 2000 (and another example of an implementation of GRU cell 1900) is shown in FIG. 21. In FIG. 21, GRU cell 2100 utilizes VMM arrays 2101 and activation function block 2102, which when configured as a sigmoid function applies a number between 0 and 1 to control how much of each component in the input vector is allowed through to the output vector. In FIG. 21, sigmoid function devices 1901 and 1902 and tanh device 1903 share the same physical hardware (VIM arrays 2101 and activation function block 2102) in a time-multiplexed fashion. GRU cell 2100 also comprises multiplier device 2103 to multiply two vectors together, addition device 2105 to add two vectors together, complementary device 2109 to subtract an input from 1 to generate an output, multiplexor 2104, register 2106 to hold the value h(t−1)*r(t) when that value is output from multiplier device 2103 through multiplexor 2104, register 2107 to hold the value h(t−1)*z(t) when that value is output from multiplier device 2103 through multiplexor 2104, and register 2108 to hold the value hˆ(t)*(1−z(t)) when that value is output from multiplier device 2103 through multiplexor 2104.

Whereas GRU cell 2000 contains multiple sets of VMM arrays 2001 and activation function blocks 2002, GRU cell 2100 contains only one set of VMM arrays 2101 and activation function block 2102, which are used to represent multiple layers in the example of GRU cell 2100. GRU cell 2100 will require less space than GRU cell 2000, as GRU cell 2100 will require ⅓ as much space for VMMs and activation function blocks compared to GRU cell 2000.

It can be further appreciated that GRU systems will typically comprise multiple VMM arrays, each of which requires functionality provided by certain circuit blocks outside of the VMM arrays, such as a summer and activation function block and high voltage generation blocks. Providing separate circuit blocks for each VMM array would require a significant amount of space within the semiconductor device and would be somewhat inefficient. The examples described below therefore reduce the circuitry required outside of the VMM arrays themselves.

The input to the VMM arrays can be an analog level, a binary level, a pulse, a time modulated pulse, or digital bits (in this case a DAC is needed to convert digital bits to appropriate input analog level) and the output can be an analog level, a binary level, a timing pulse, pulses, or digital bits (in this case an output ADC is needed to convert output analog level into digital bits).

In general, for each memory cell in a VMM array, each weight W can be implemented by a single memory cell or by a differential cell or by two blend memory cells (average of 2 cells). In the differential cell case, two memory cells are needed to implement a weight W as a differential weight (W=W+−W−). In the two blend memory cells, two memory cells are needed to implement a weight W as an average of two cells.

FIG. 31 depicts VMM system 3100. In some examples, the weights, W, stored in a VMM array are stored as differential pairs, W+ (positive weight) and W− (negative weight), where W=(W+)−(W−). In VMM system 3100, half of the bit lines are designated as W+ lines, that is, bit lines connecting to memory cells that will store positive weights W+, and the other half of the bit lines are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3101 and 3102. The output of a W+ line and the output of a W− line are combined together to give effectively W=W+−W− for each pair of (W+, W−) cells for all pairs of (W+, W−) lines. While the above has been described in relation to W− lines interspersed among the W+ lines in an alternating fashion, in other examples W+ lines and W− lines can be arbitrarily located anywhere in the array.

FIG. 32 depicts another example. In VMM system 3210, positive weights W+ are implemented in first array 3211 and negative weights W− are implemented in a second array 3212, second array 3212 separate from the first array, and the resulting weights are appropriately combined together by summation circuits 3213.

FIG. 33 depicts VMM system 3300. the weights, W, stored in a VMM array are stored as differential pairs, W+(positive weight) and W− (negative weight), where W=(W+)−(W−). VMM system 3300 comprises array 3301 and array 3302. Half of the bit lines in each of array 3301 and 3302 are designated as W+ lines, that is, bit lines connecting to memory cells that will store positive weights W+, and the other half of the bit lines in each of array 3301 and 3302 are designated as W− lines, that is, bit lines connecting to memory cells implementing negative weights W−. The W− lines are interspersed among the W+ lines in an alternating fashion. The subtraction operation is performed by a summation circuit that receives current from a W+ line and a W− line, such as summation circuits 3303, 3304, 3305, and 3306. The output of a W+ line and the output of a W− line from each array 3301, 3302 are respectively combined together to give effectively W=W+−W− for each pair of (W+, W−) cells for all pairs of (W+, W−) lines. In addition, the W values from each array 3301 and 3302 can be further combined through summation circuits 3307 and 3308, such that each W value is the result of a W value from array 3301 minus a W value from array 3302, meaning that the end result from summation circuits 3307 and 3308 is a differential value of two differential values.

Each non-volatile memory cells used in the analog neural memory system is to be erased and programmed to hold a very specific and precise amount of charge, i.e., the number of electrons, in the floating gate. For example, each floating gate should hold one of N different values, where N is the number of different weights that can be indicated by each cell. Examples of N include 16, 32, 64, 128, and 256.

It is important to be able to accurately verify the programming operation after it is performed.

SUMMARY OF THE INVENTION

Numerous examples are disclosed of verification circuitry and associated methods in an artificial neural network.

19

20

Figure 1:
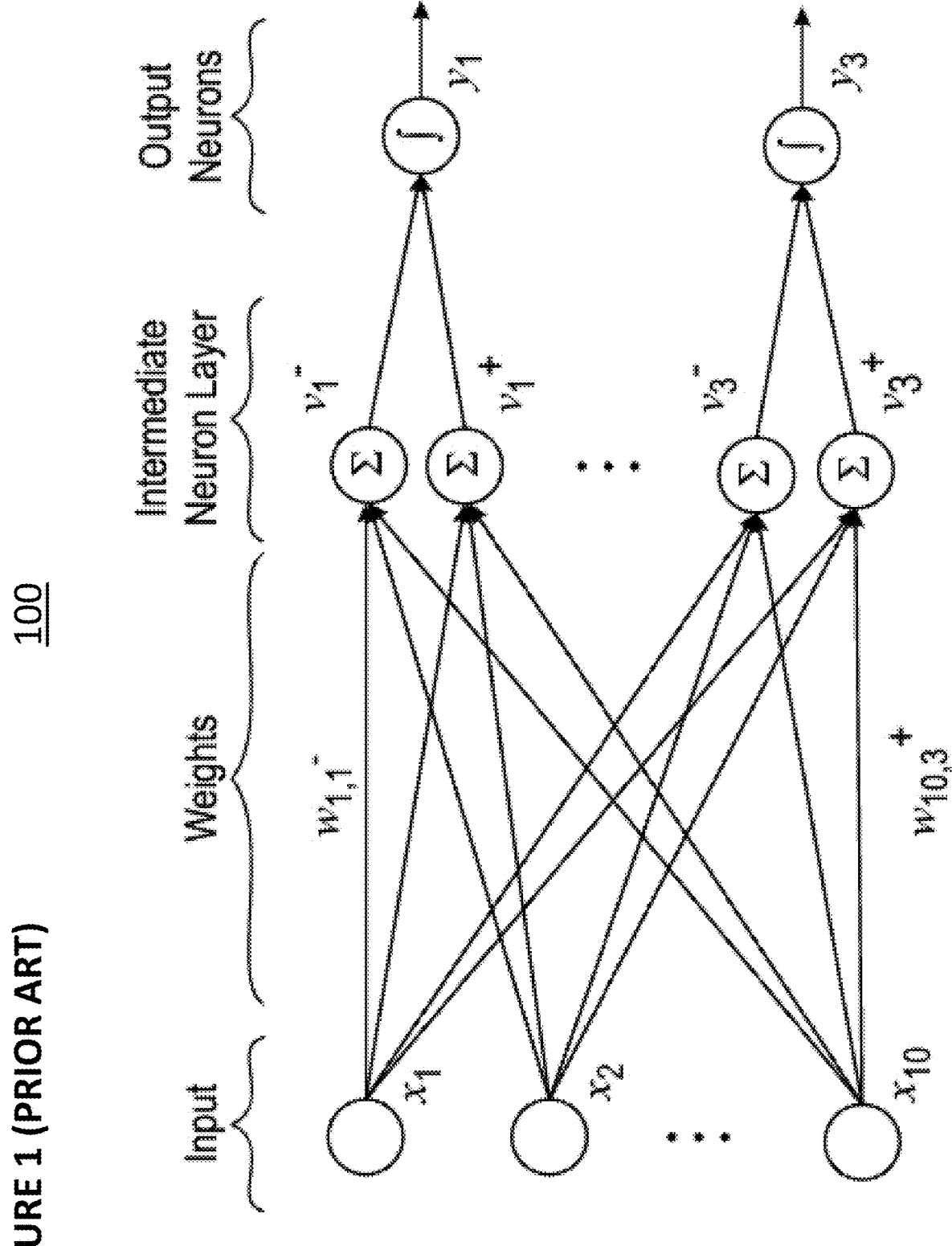
FIG. 1 is a diagram that illustrates an artificial neural network.
Figure 2:
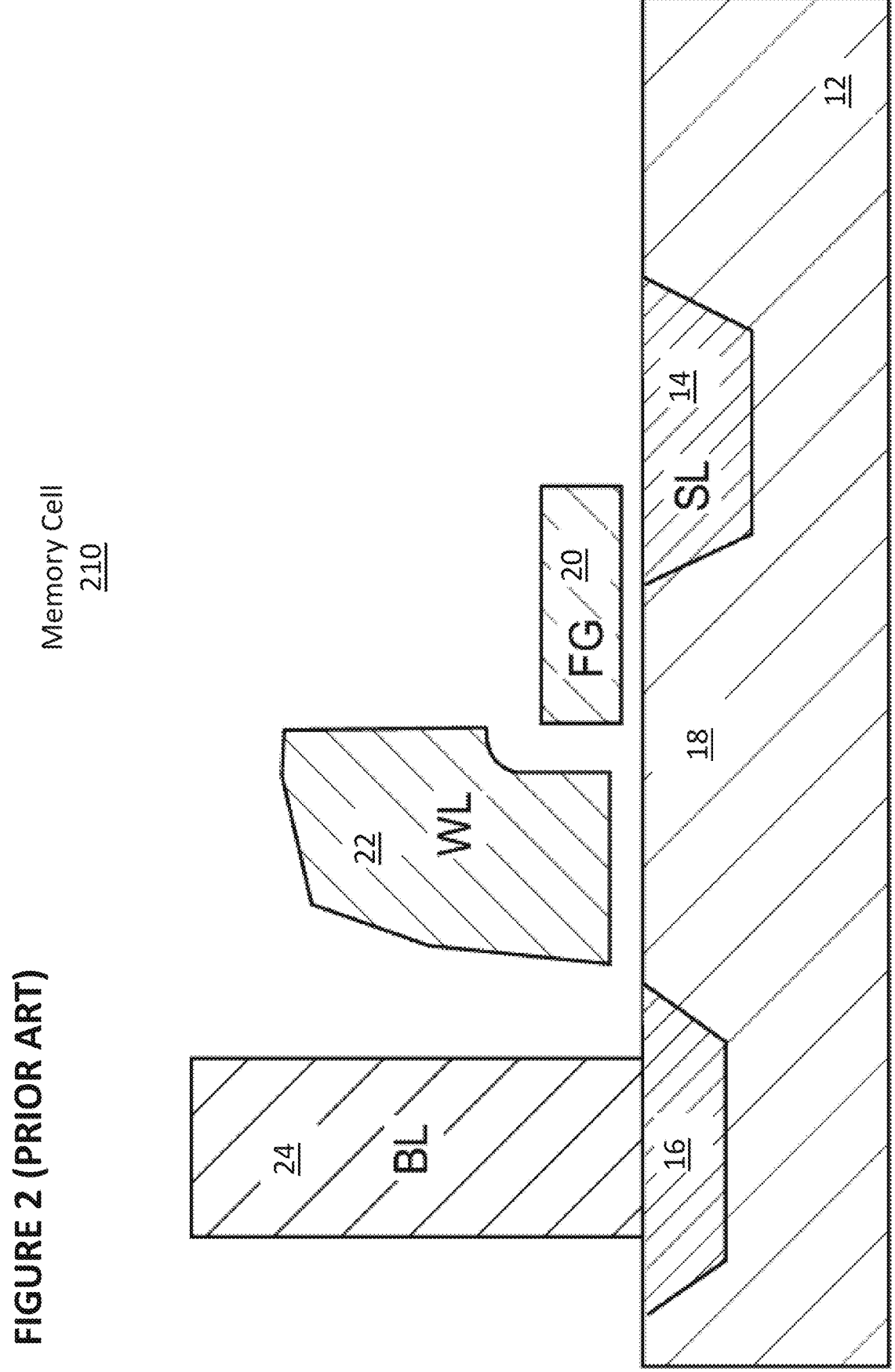
FIG. 2 depicts a prior art split gate flash memory cell.
Figure 3:
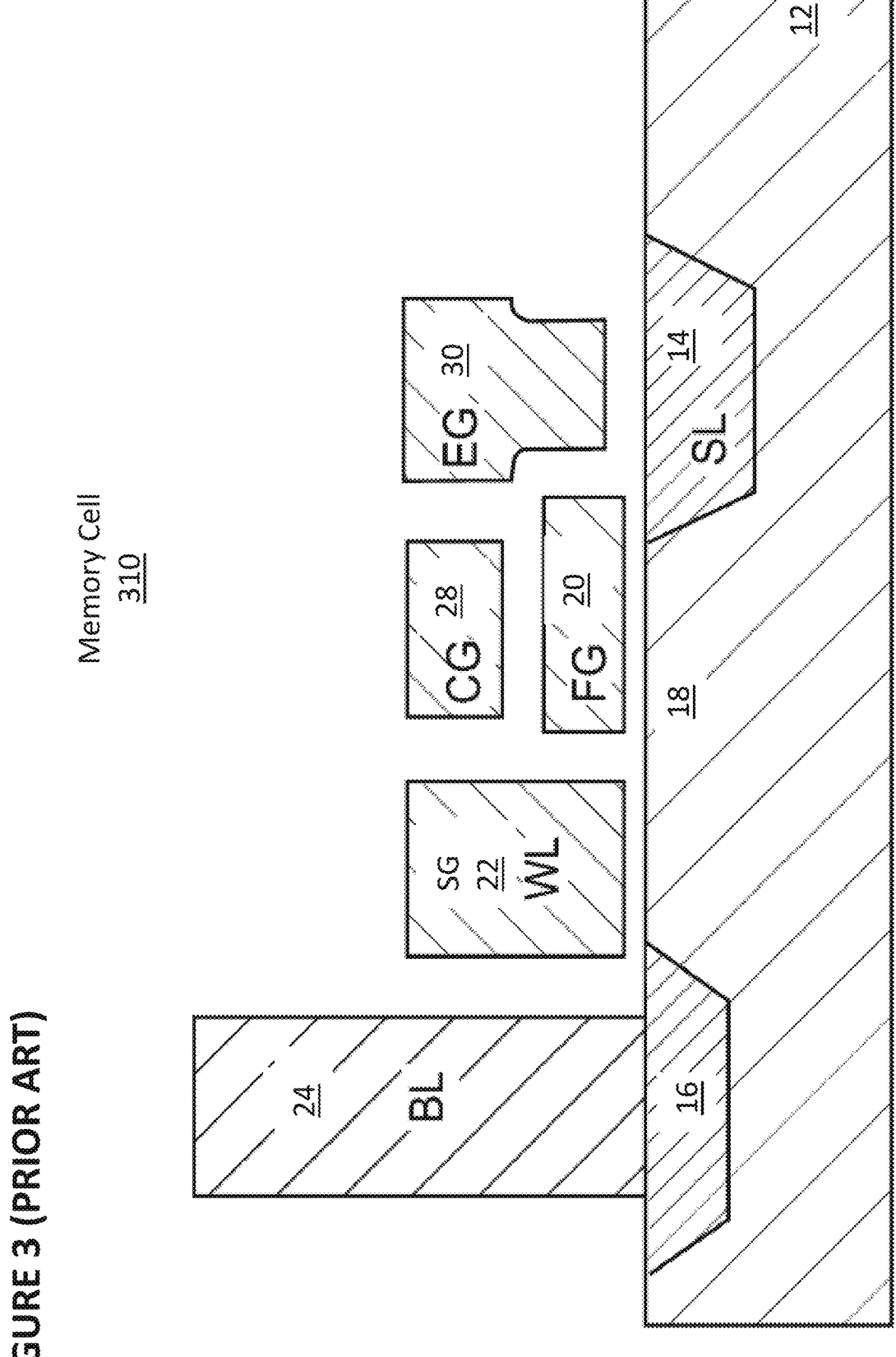

FIG. 3 depicts another prior art split gate flash memory cell.

Figure 4:
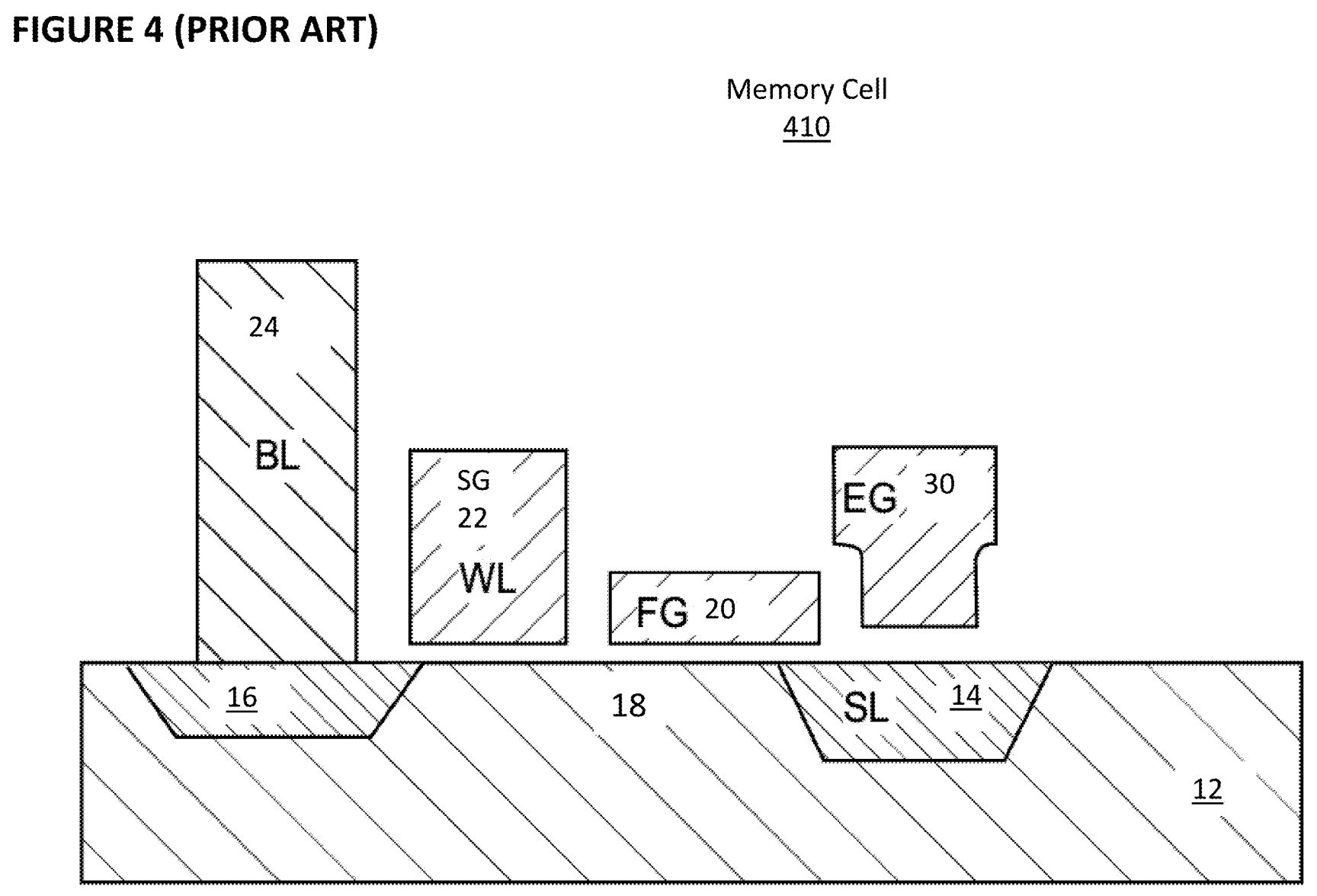

FIG. 4 depicts another prior art split gate flash memory cell.

Figure 5:
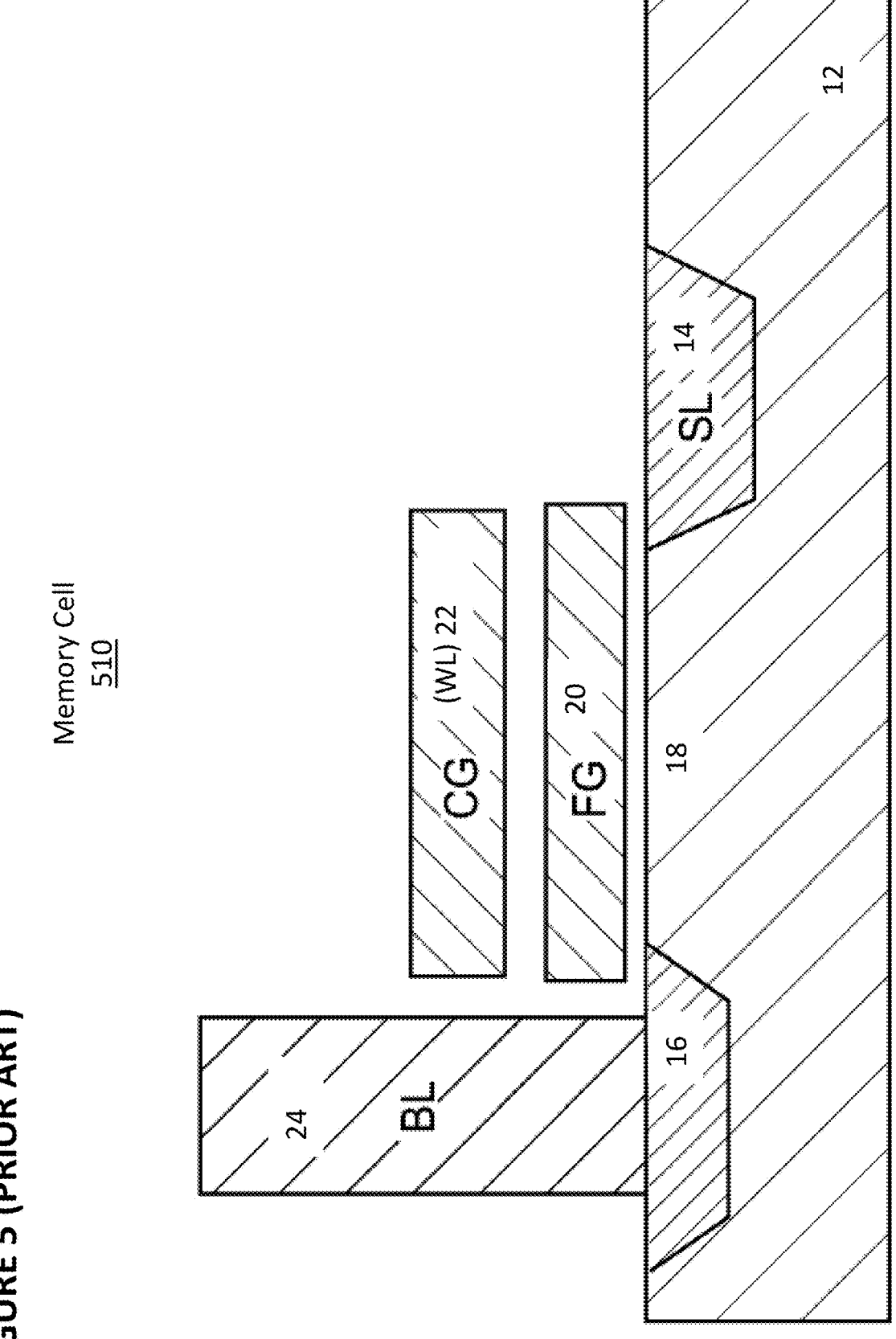

FIG. 5 depicts another prior art split gate flash memory cell.

Figure 6:
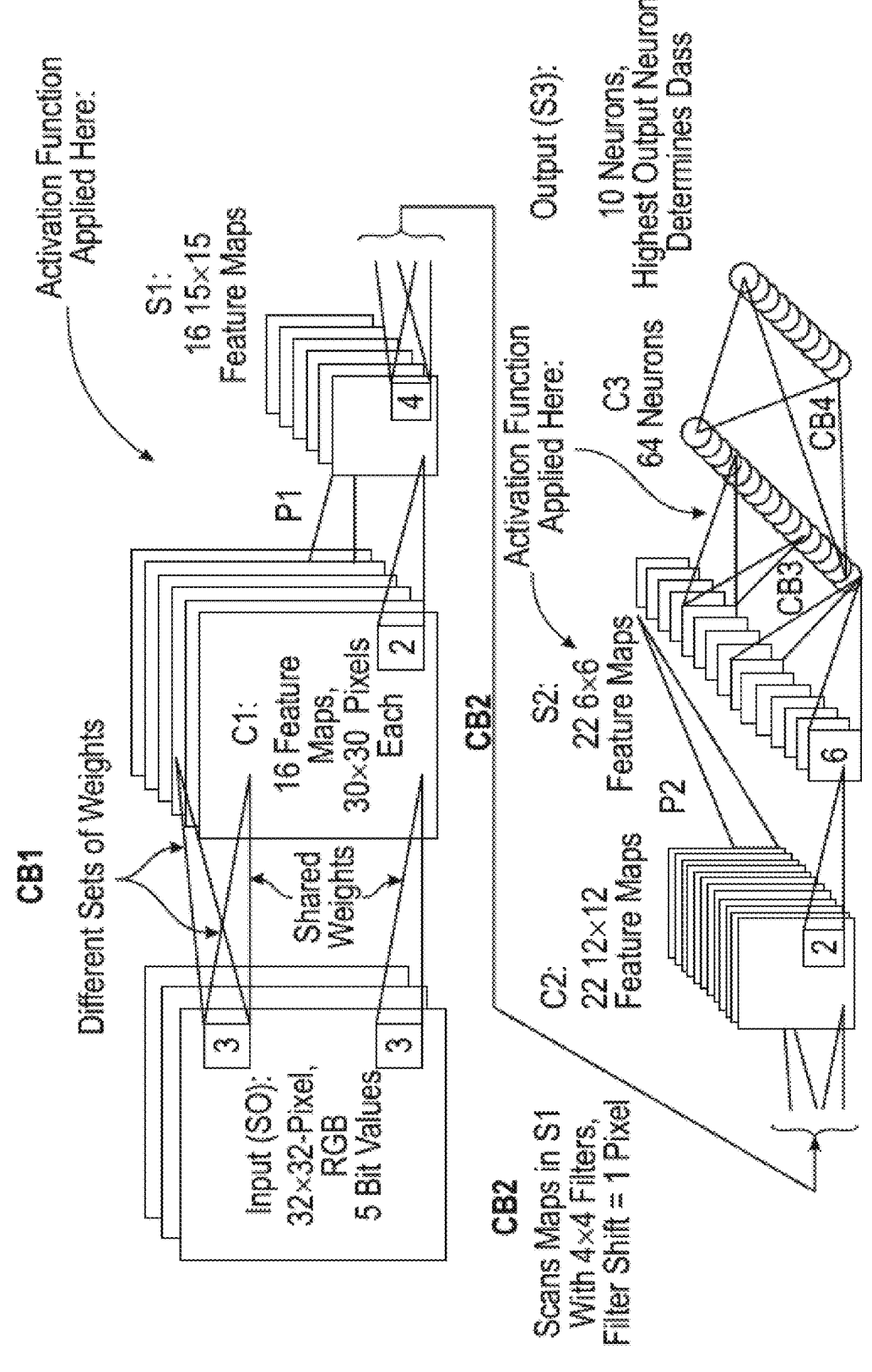

FIG. 6 is a diagram illustrating the different levels of an exemplary artificial neural network utilizing one or more non-volatile memory arrays.

Figure 7:
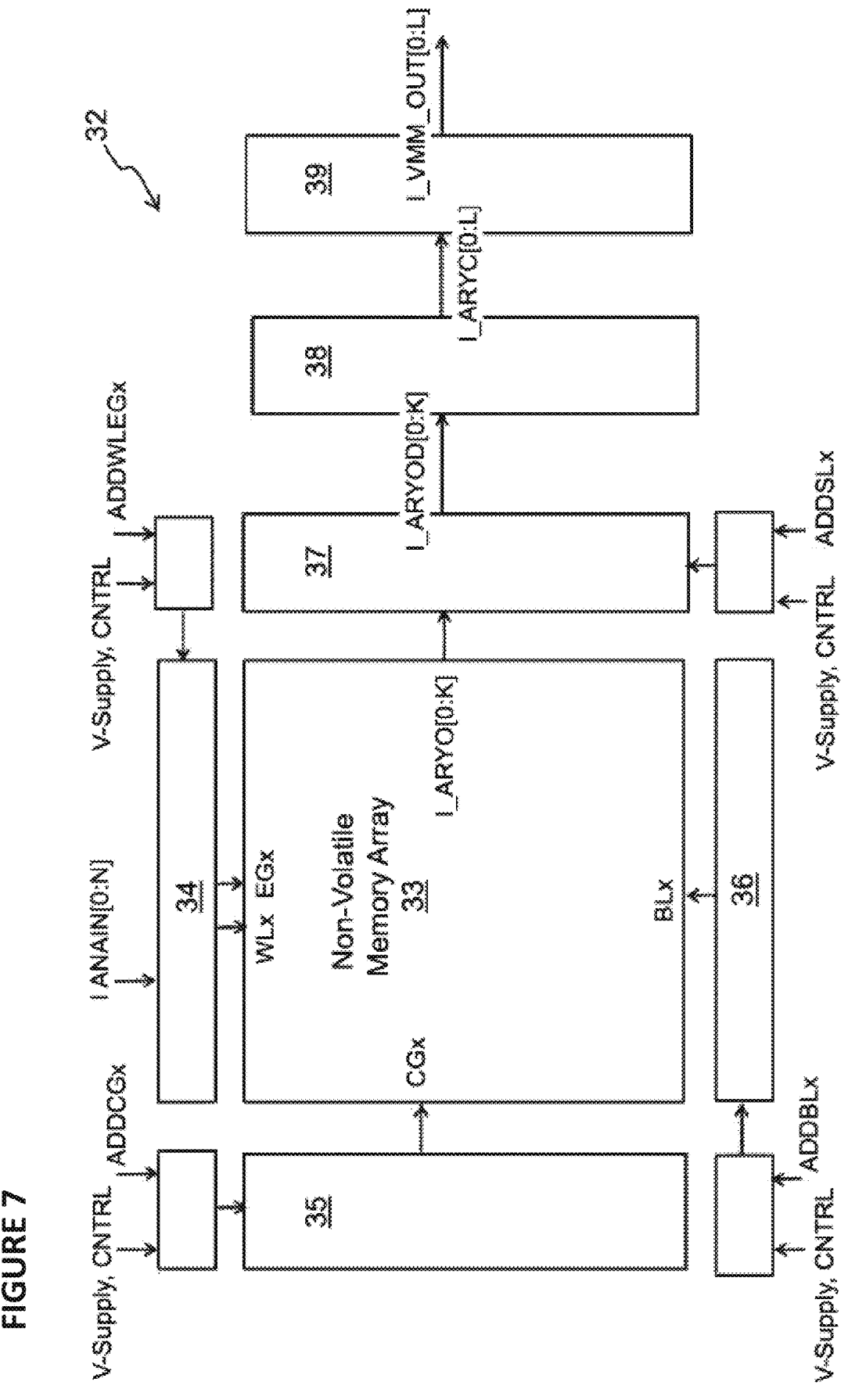

FIG. 7 is a block diagram illustrating a VMM system.

Figure 8:
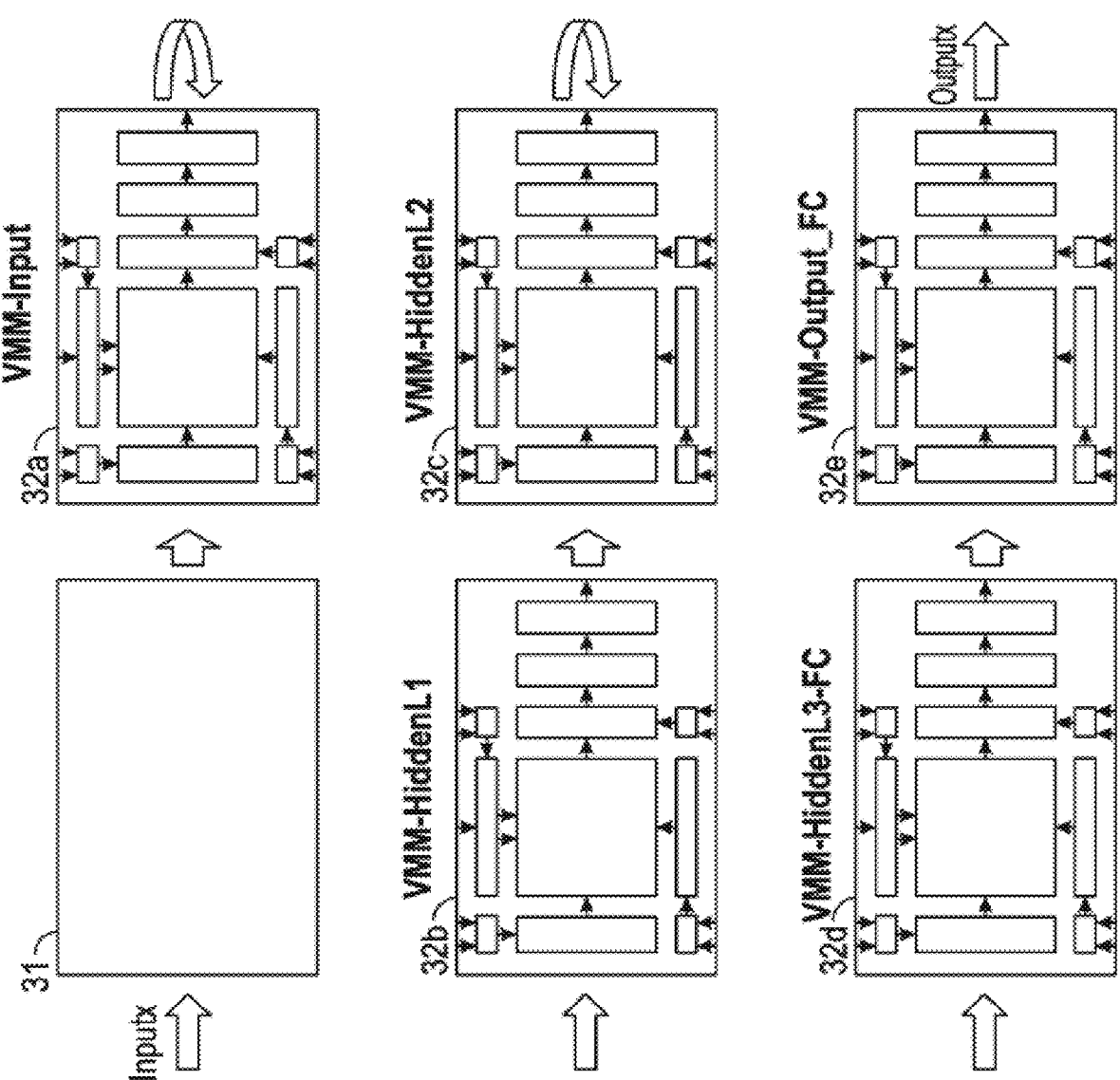

FIG. 8 is a block diagram illustrates an example artificial neural network utilizing one or more VMM systems.

Figure 9:
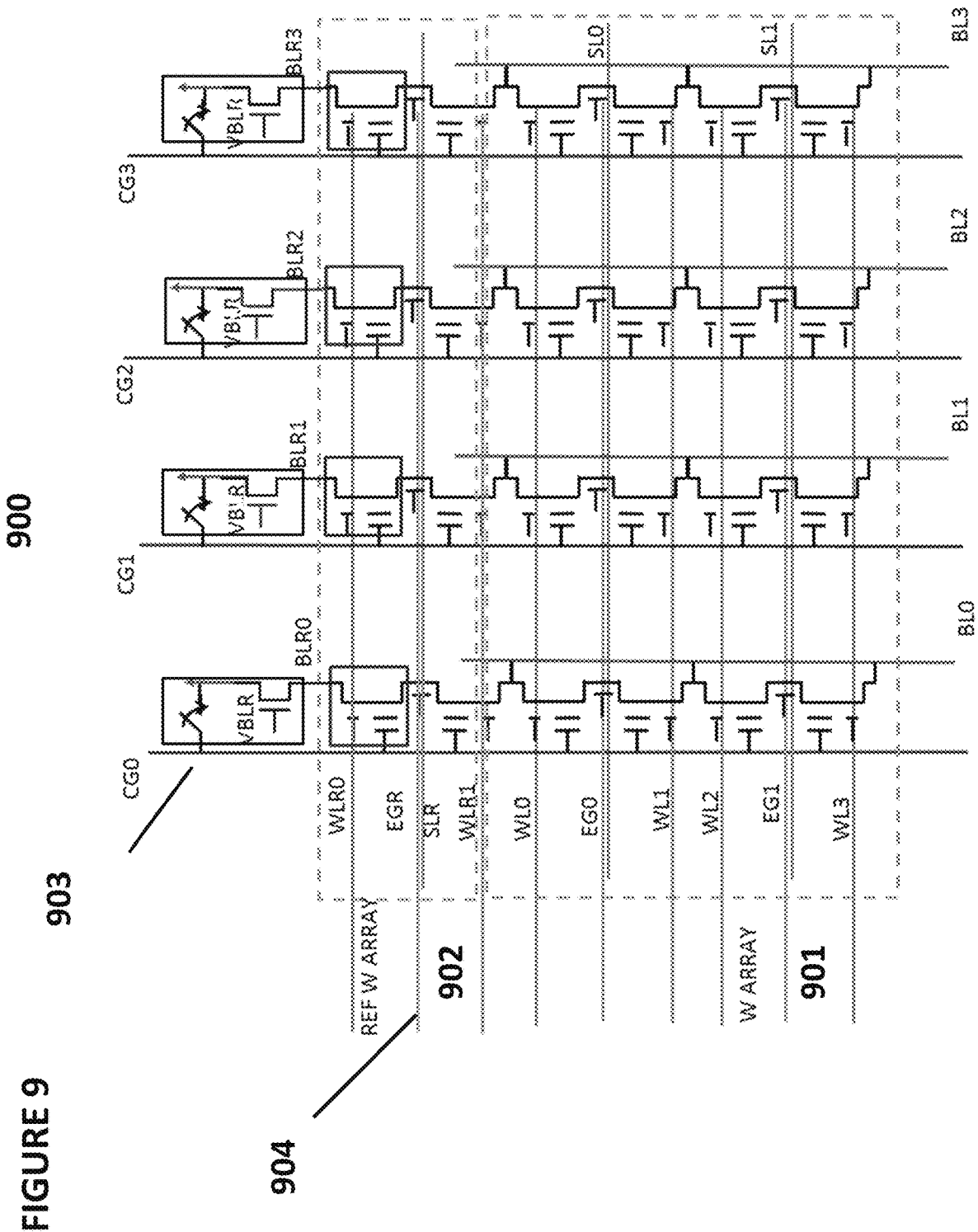

FIG. 9 depicts another example of a VMM system.

Figure 10:
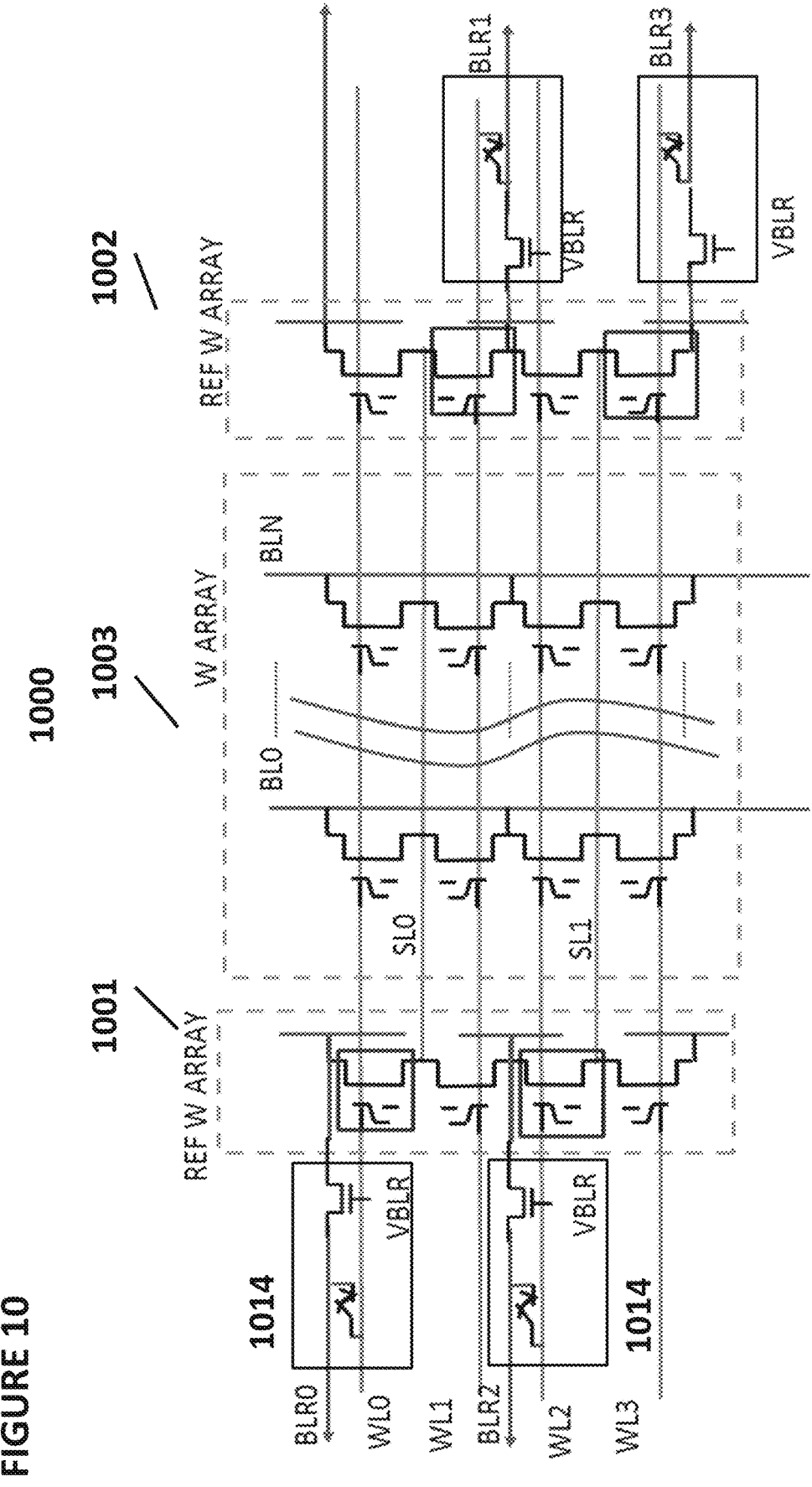

FIG. 10 depicts another example of a VMM system.

Figure 11:
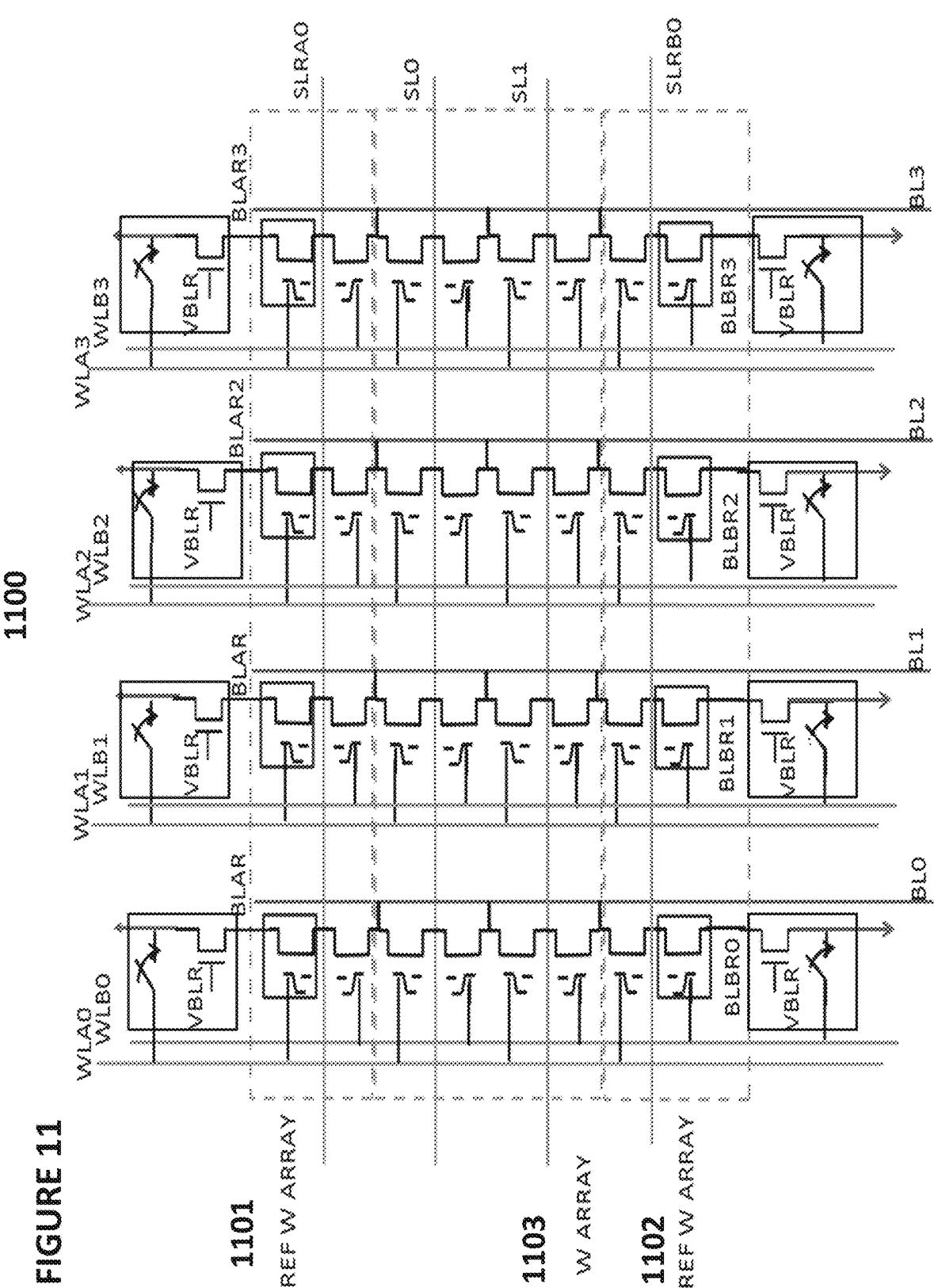

FIG. 11 depicts another example of a VMM system.

Figure 12:
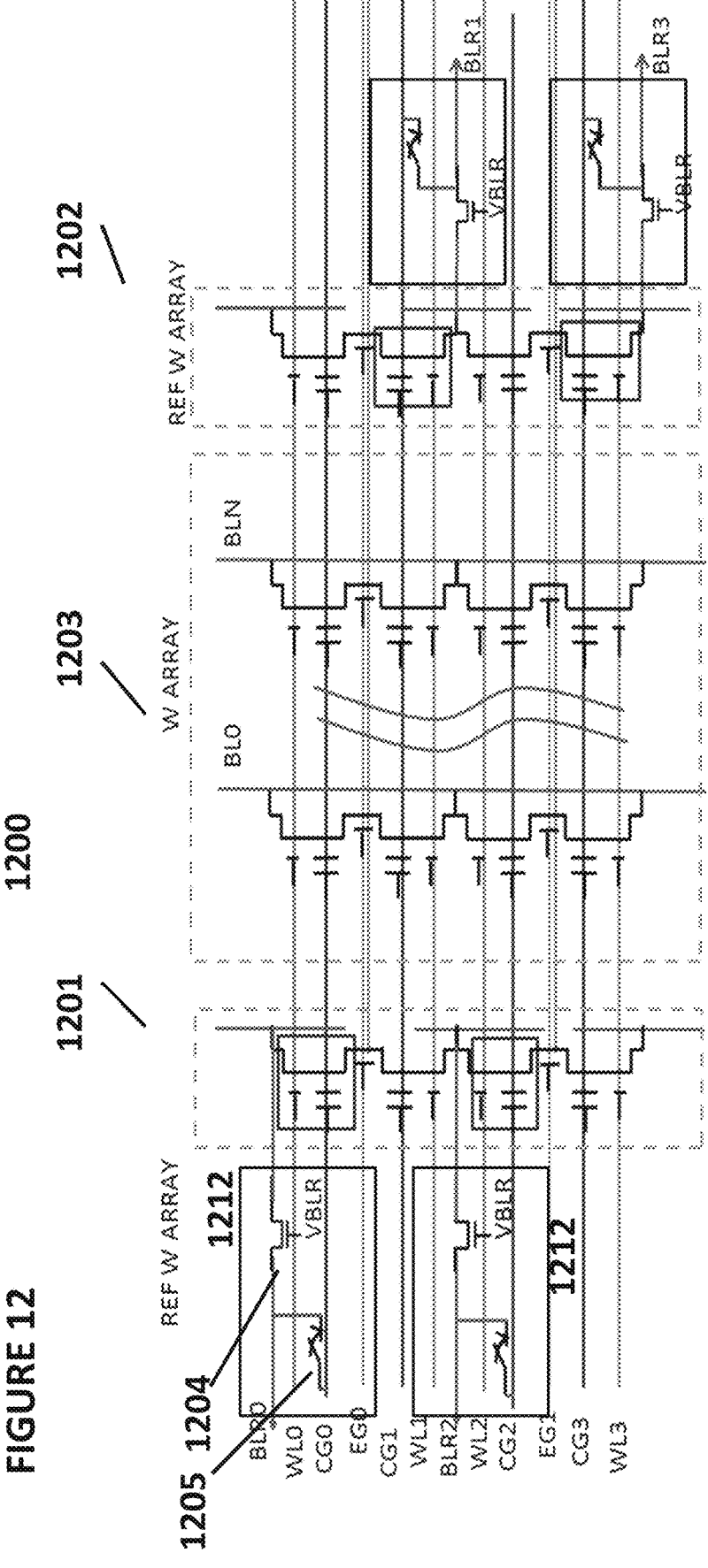

FIG. 12 depicts another example of a VMM system.

Figure 13:
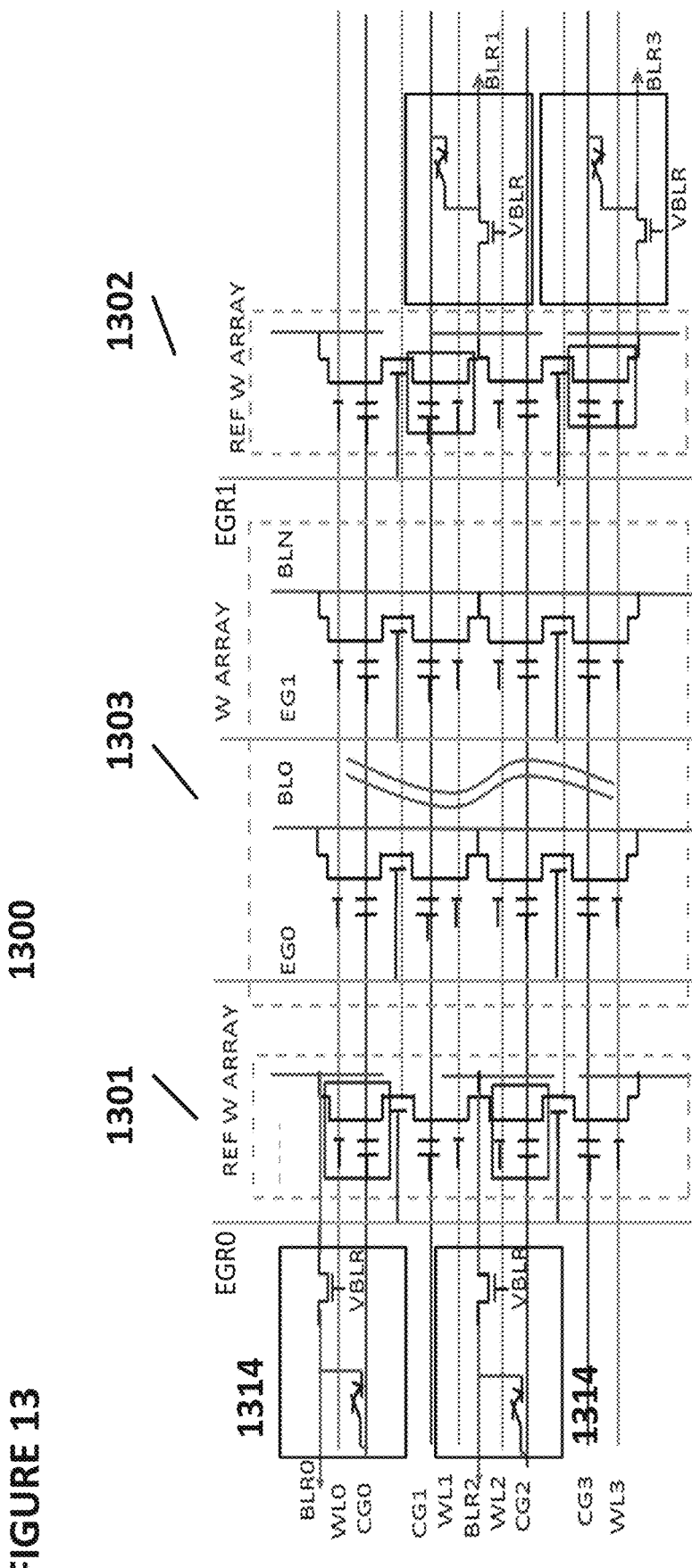

FIG. 13 depicts another example of a VMM system.

Figure 14:
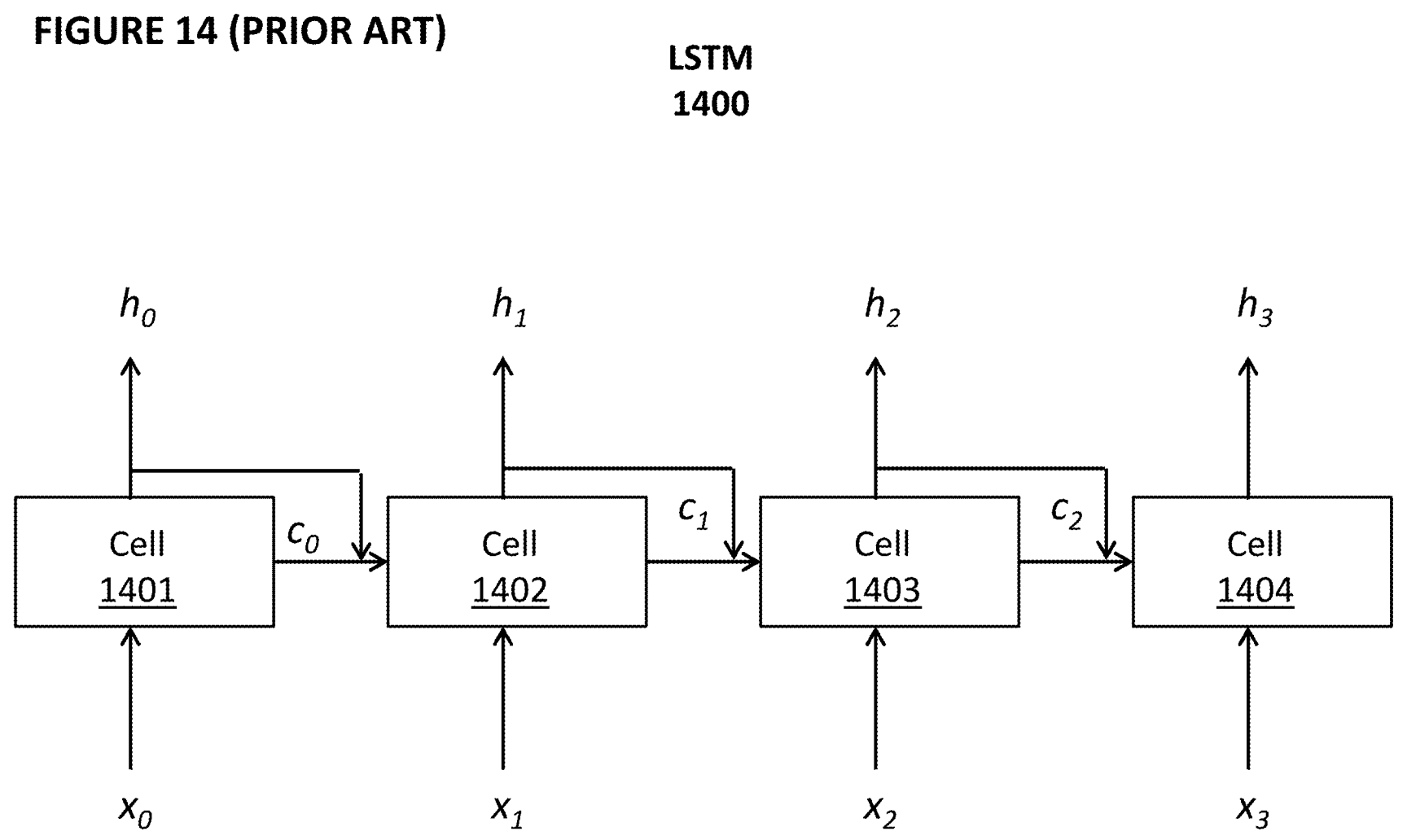

FIG. 14 depicts a prior art long short-term memory system.

Figure 15:
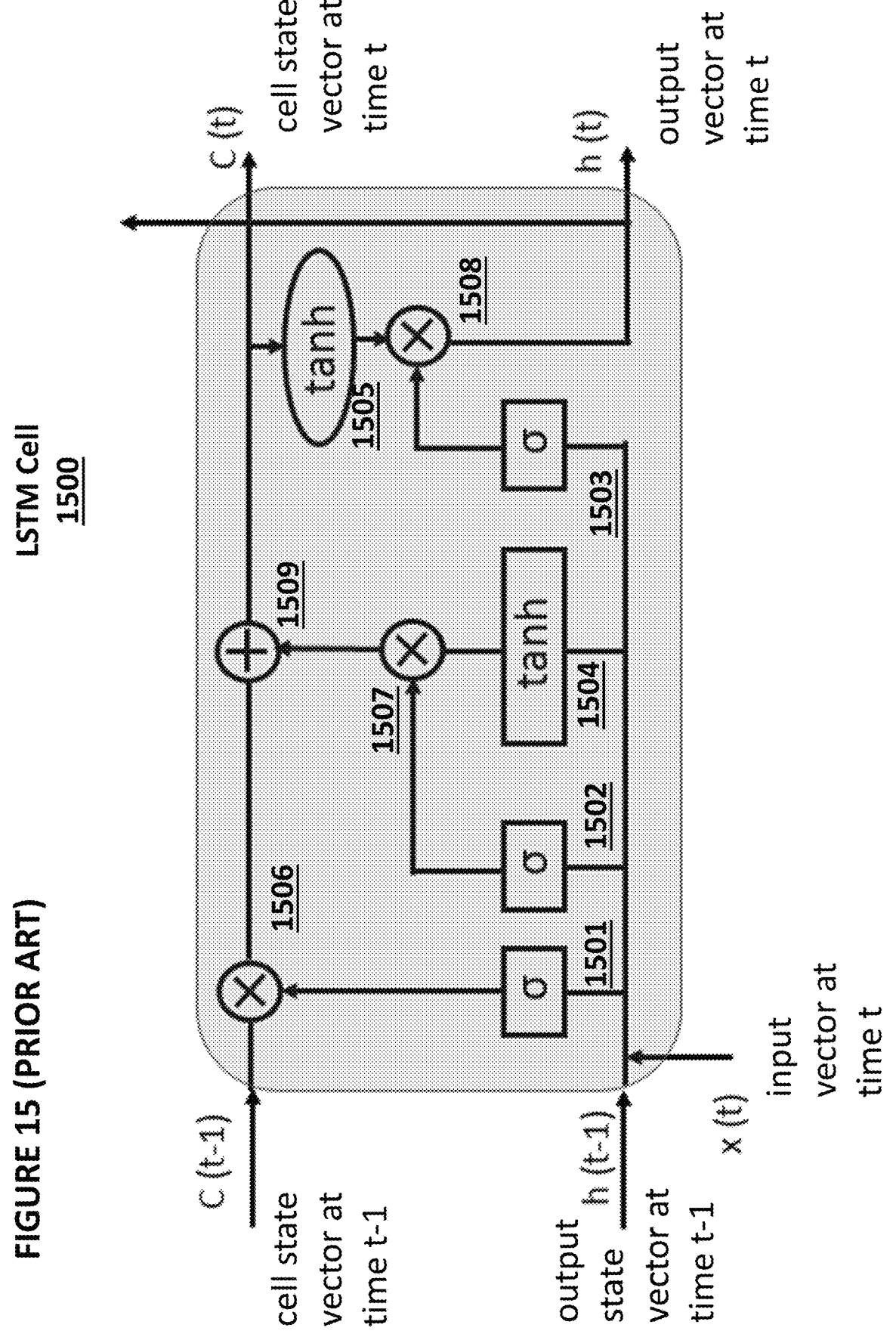

FIG. 15 depicts an example cell for use in a long short-term memory system.

Figure 16:
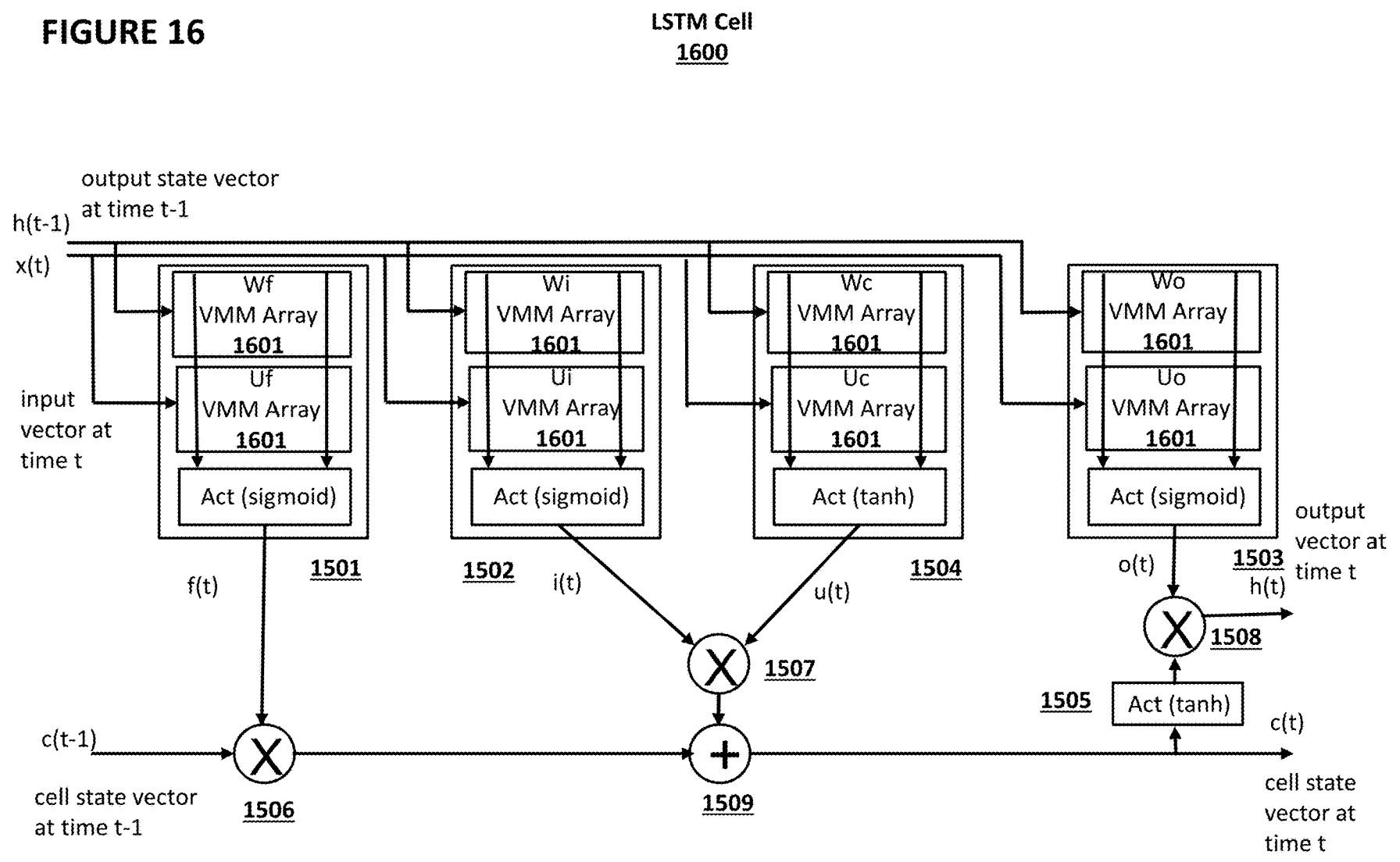

FIG. 16 depicts an example implementation of the cell of FIG. 15.

Figure 17:
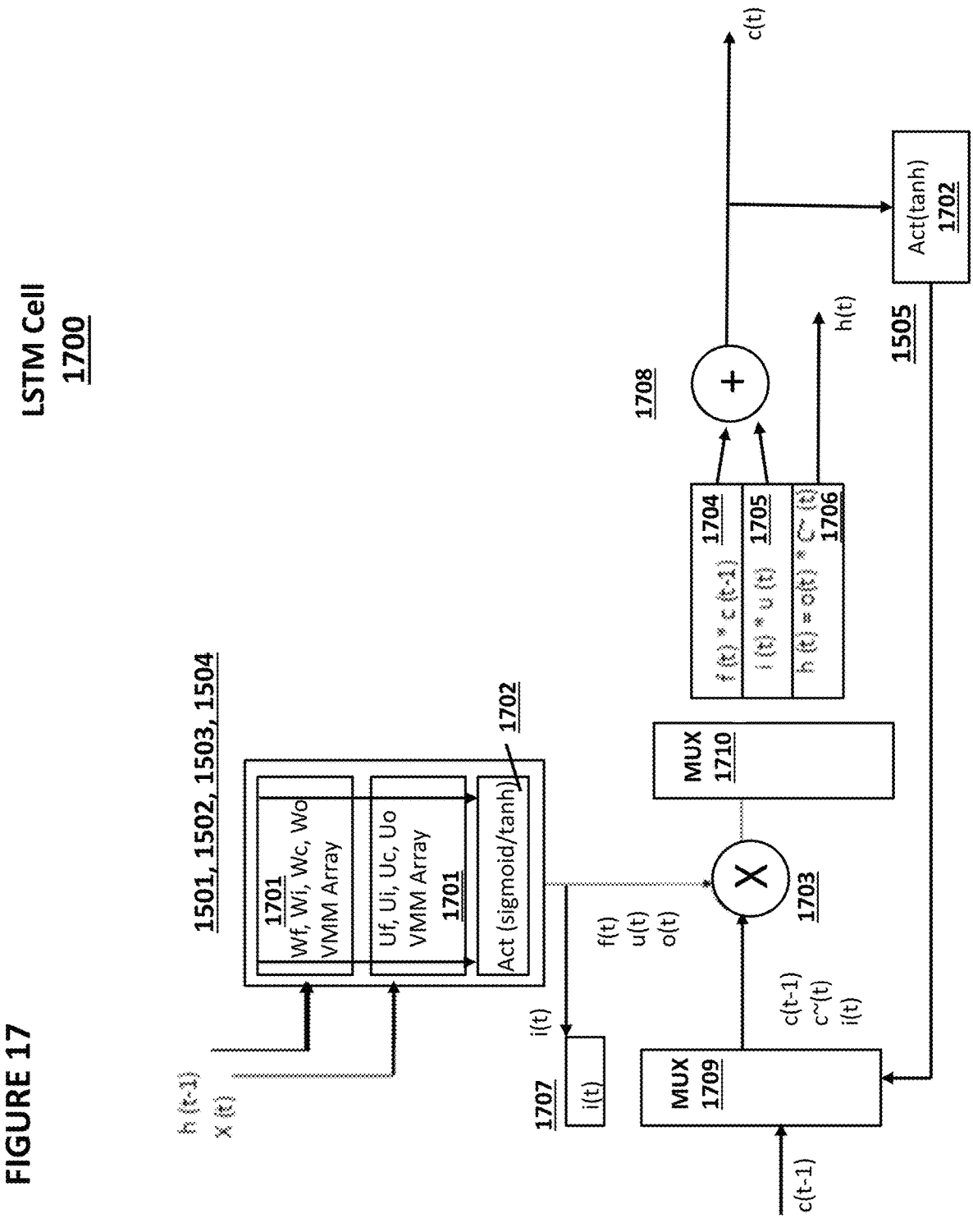

FIG. 17 depicts another example implementation of the cell of FIG. 15.

Figure 18:
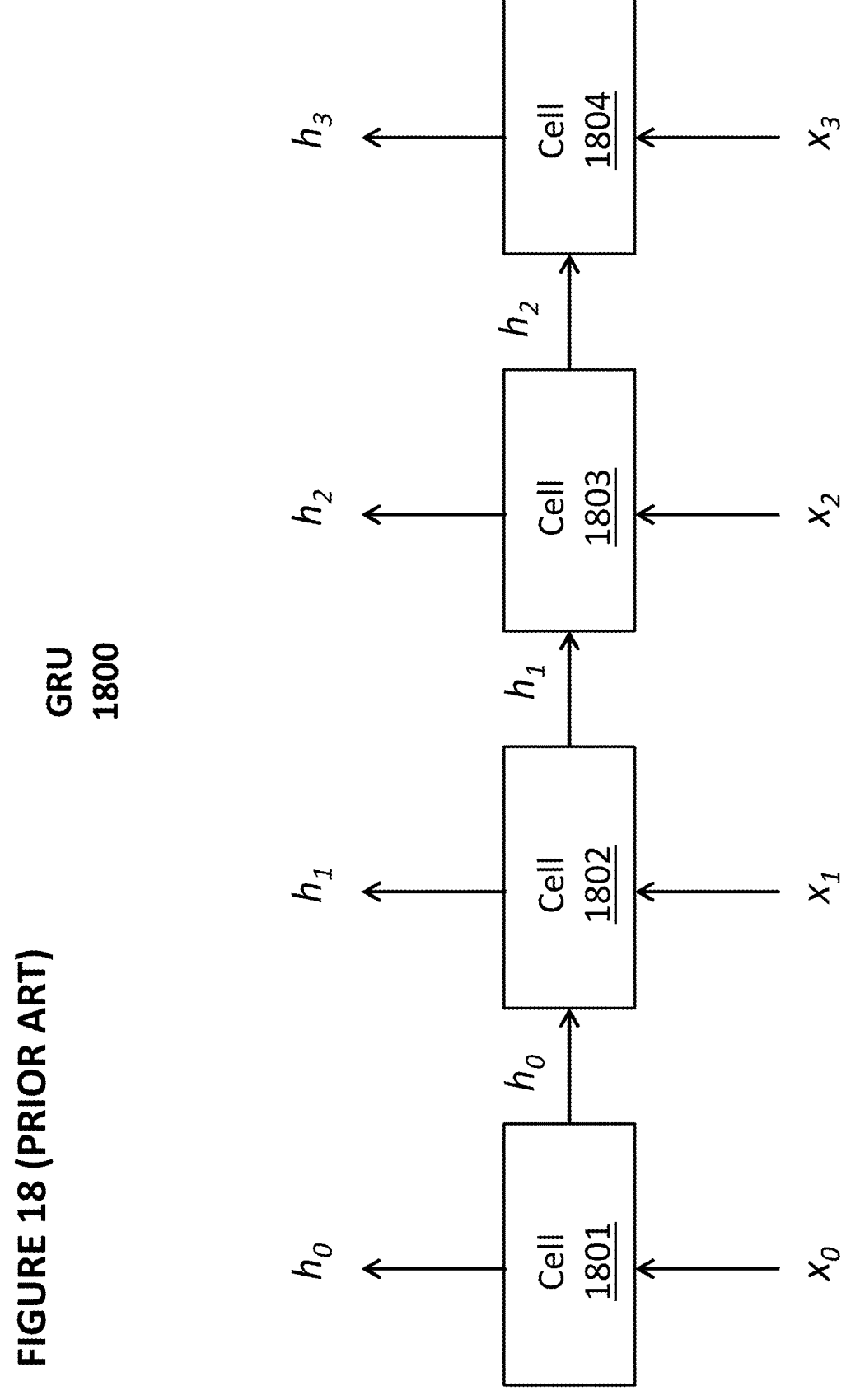

FIG. 18 depicts a prior art gated recurrent unit system.

Figure 19:
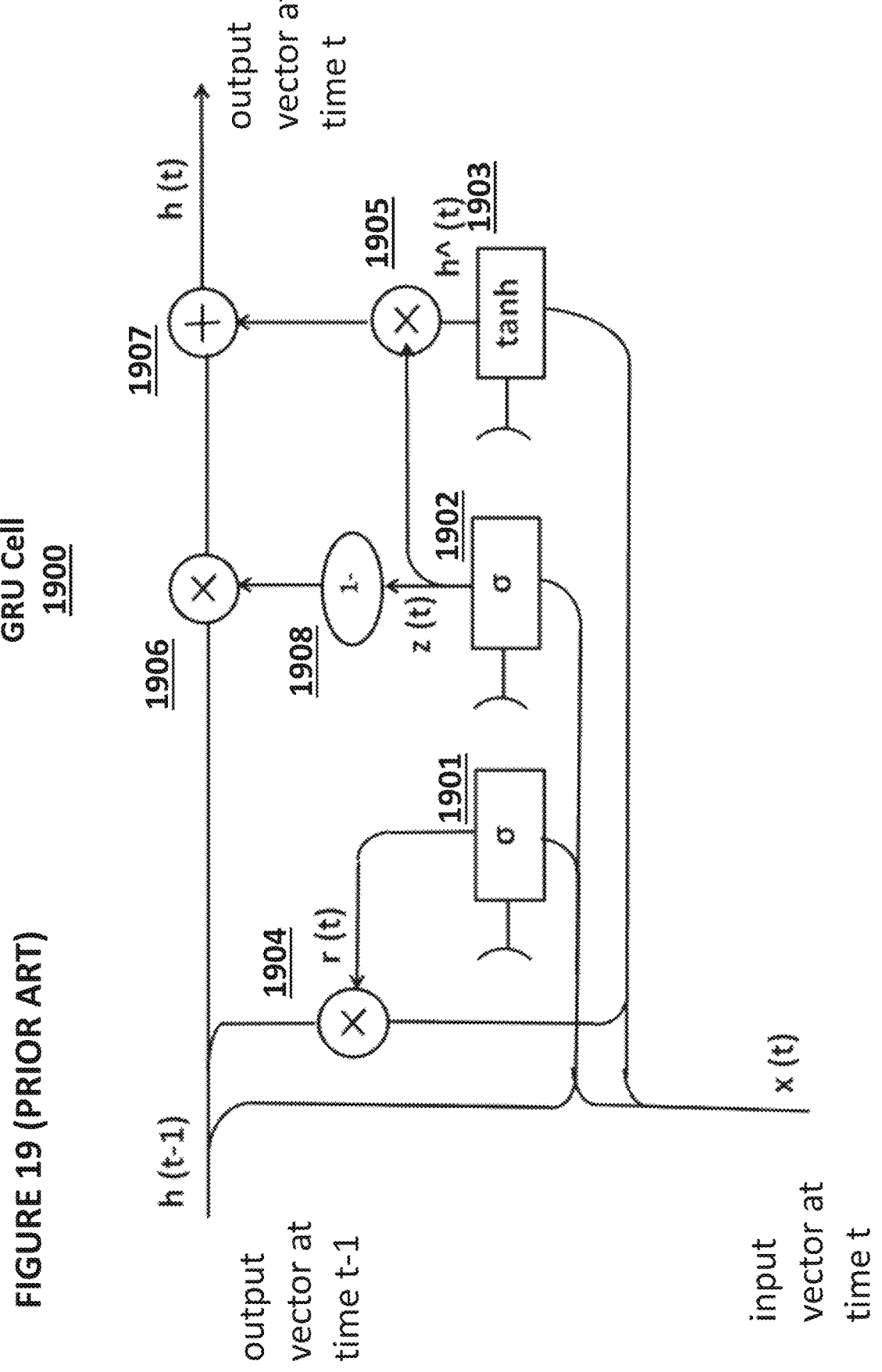

FIG. 19 depicts an example cell for use in a gated recurrent unit system.

Figure 20:
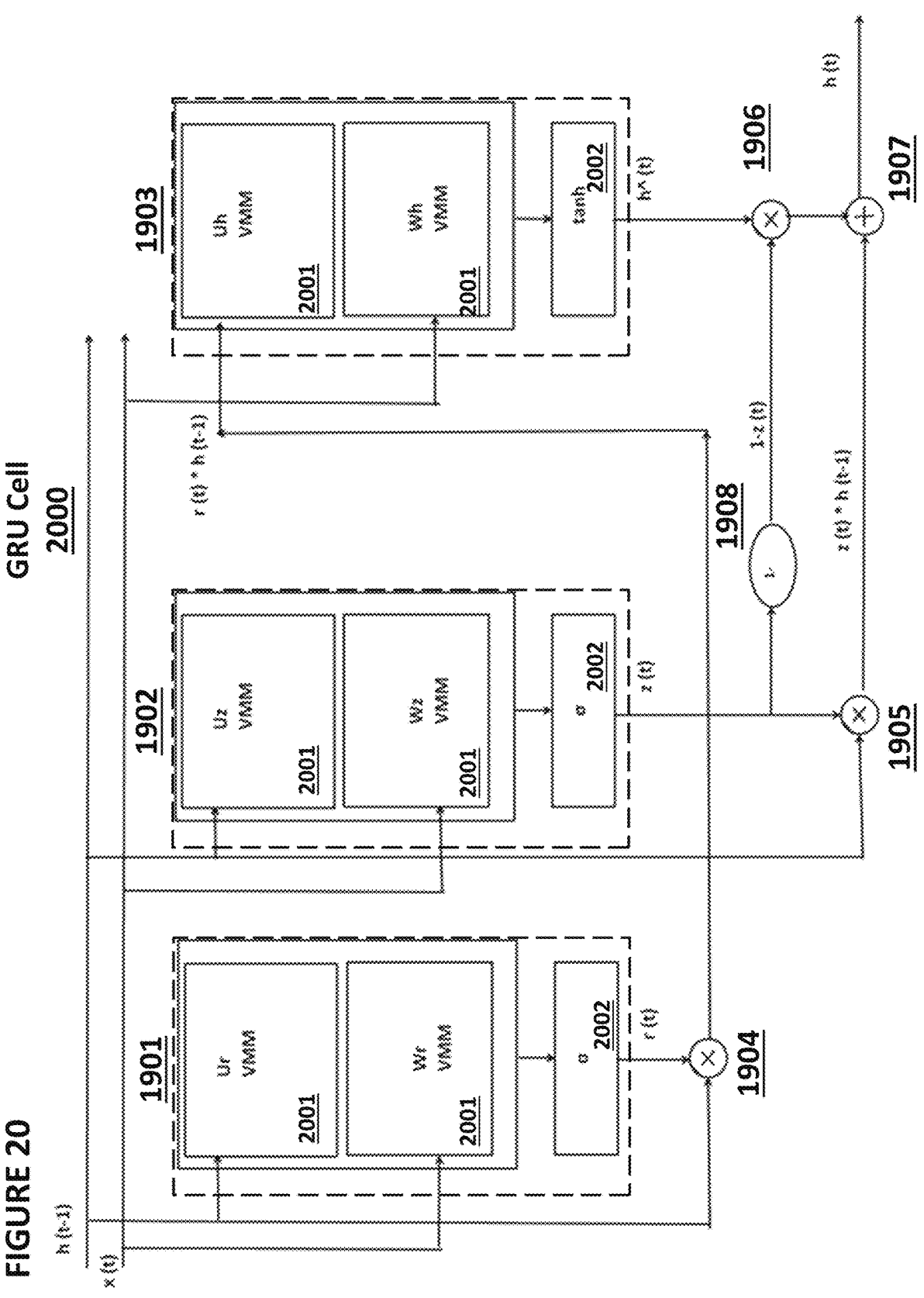

FIG. 20 depicts an example implementation t of the cell of FIG. 19.

Figure 21:
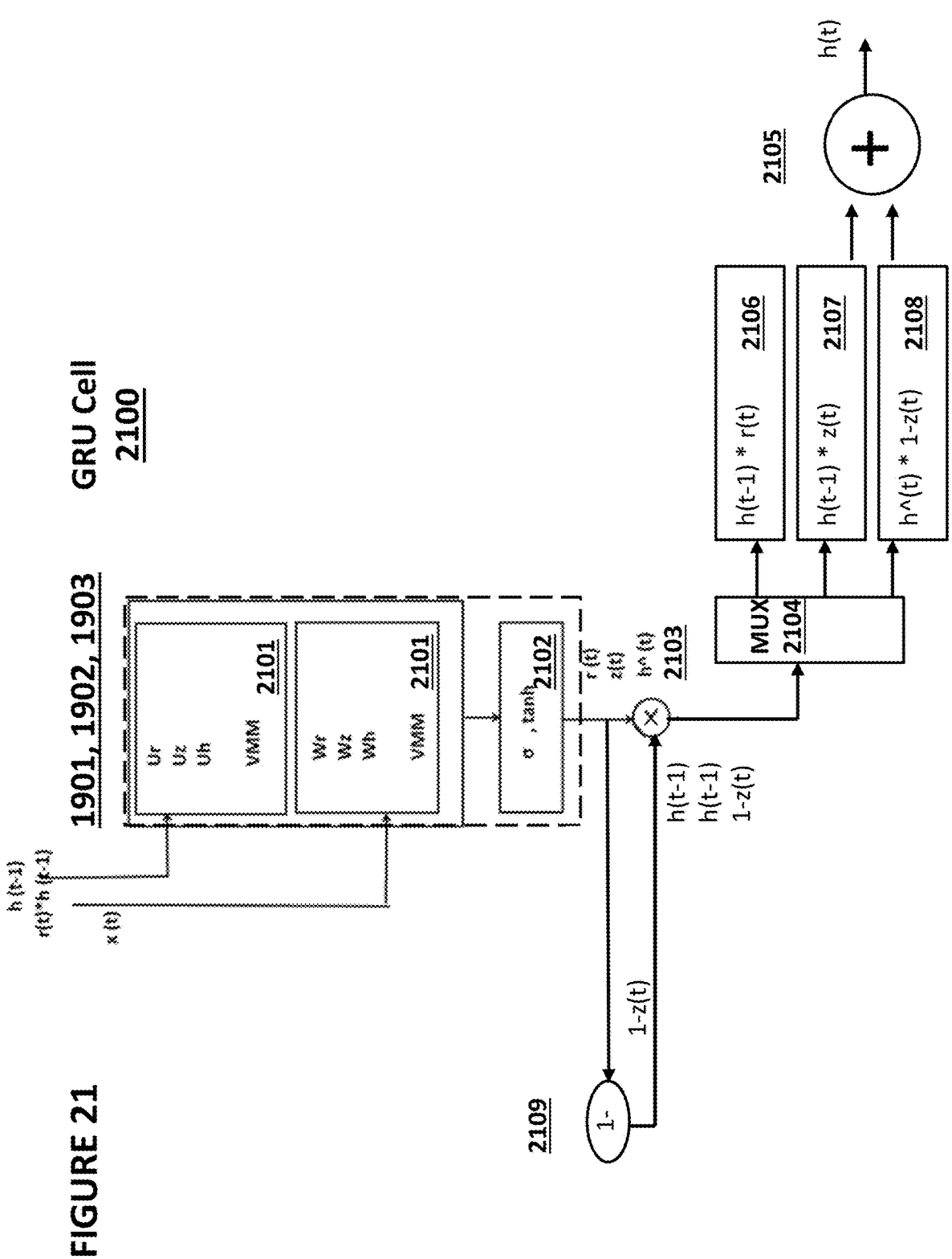

FIG. 21 depicts another example implementation of the cell of FIG. 19.

Figure 22:
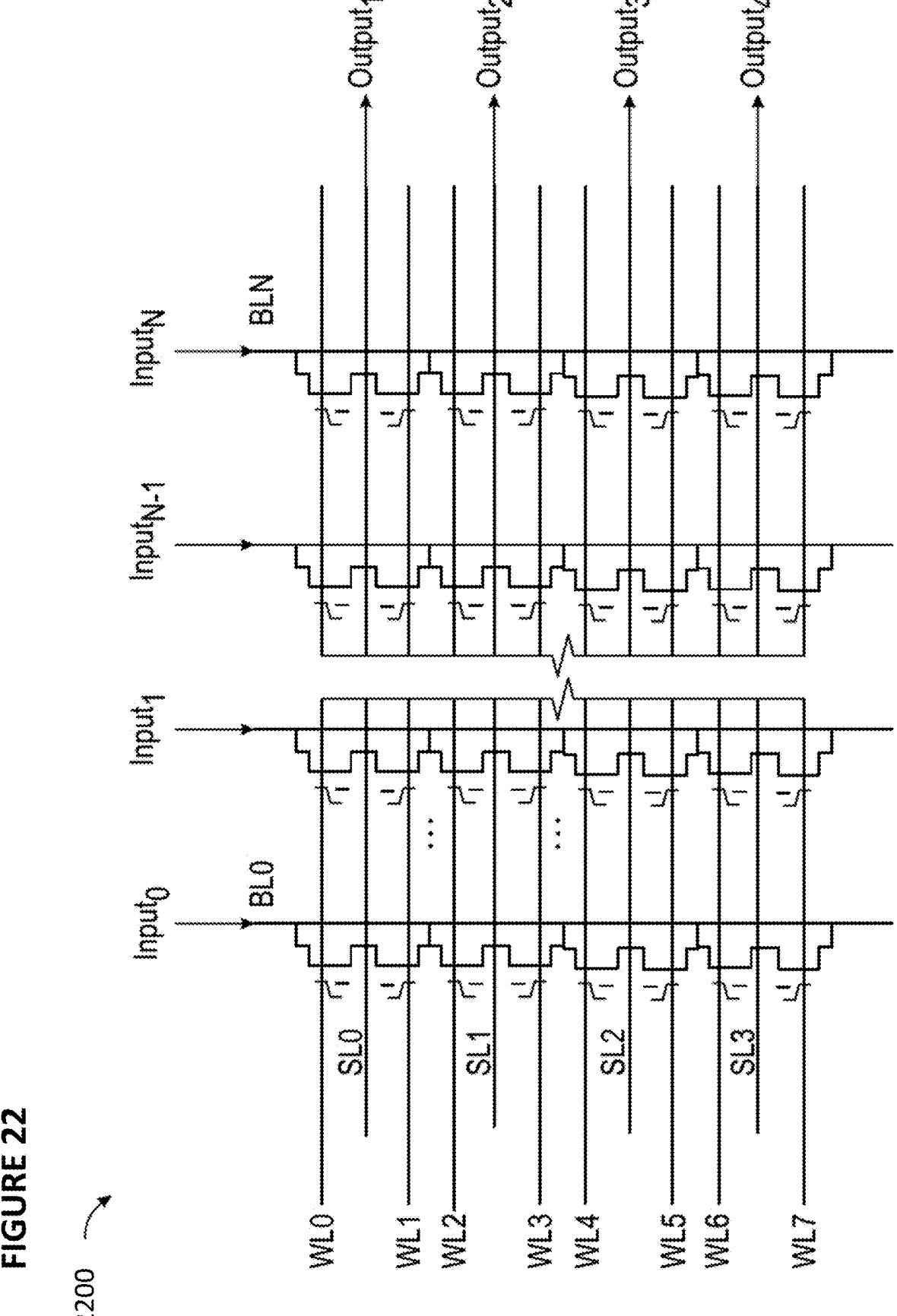

FIG. 22 depicts another example of a VMM system.

Figure 23:
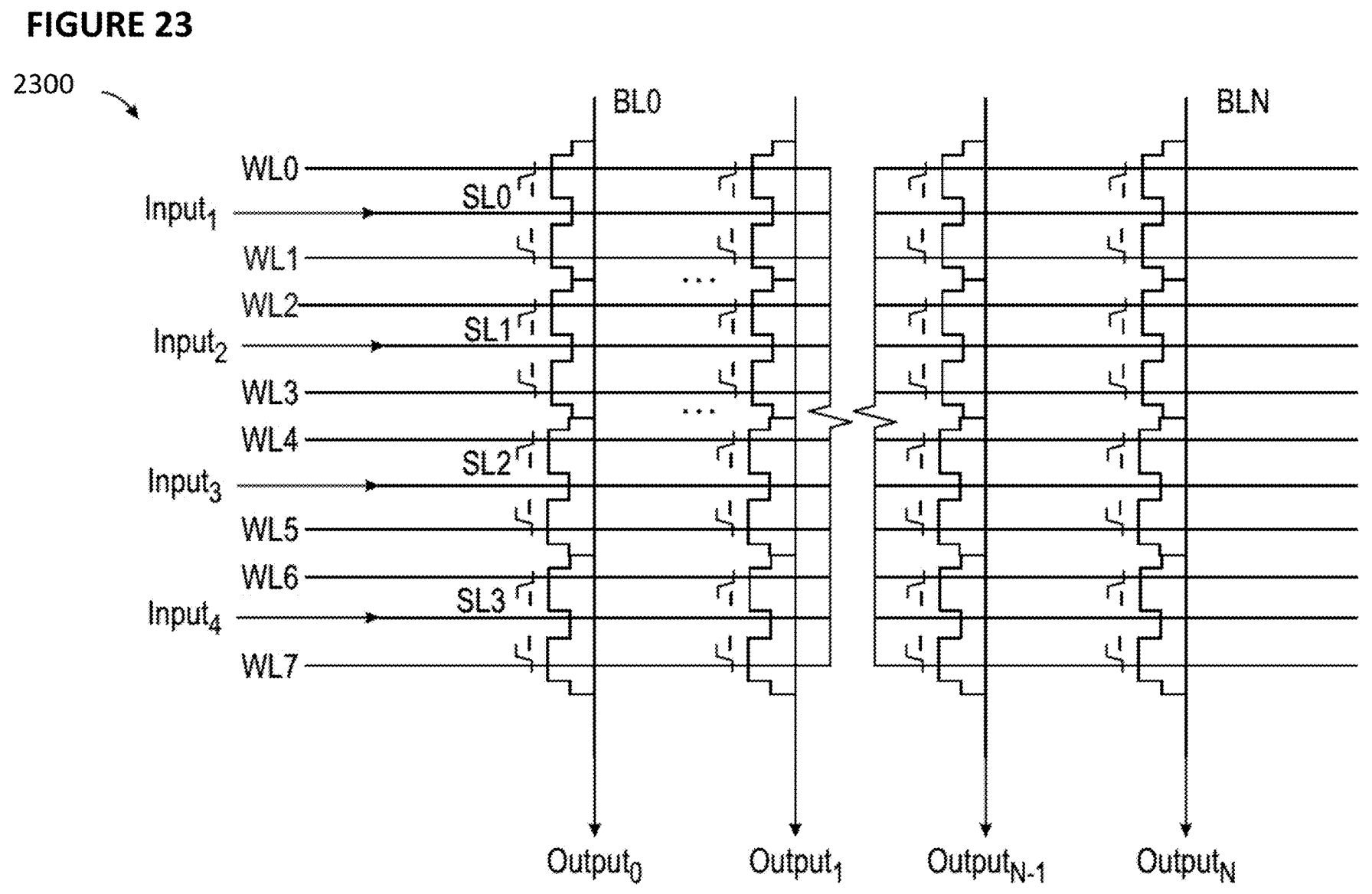

FIG. 23 depicts another example of a VMM system.

Figure 24:
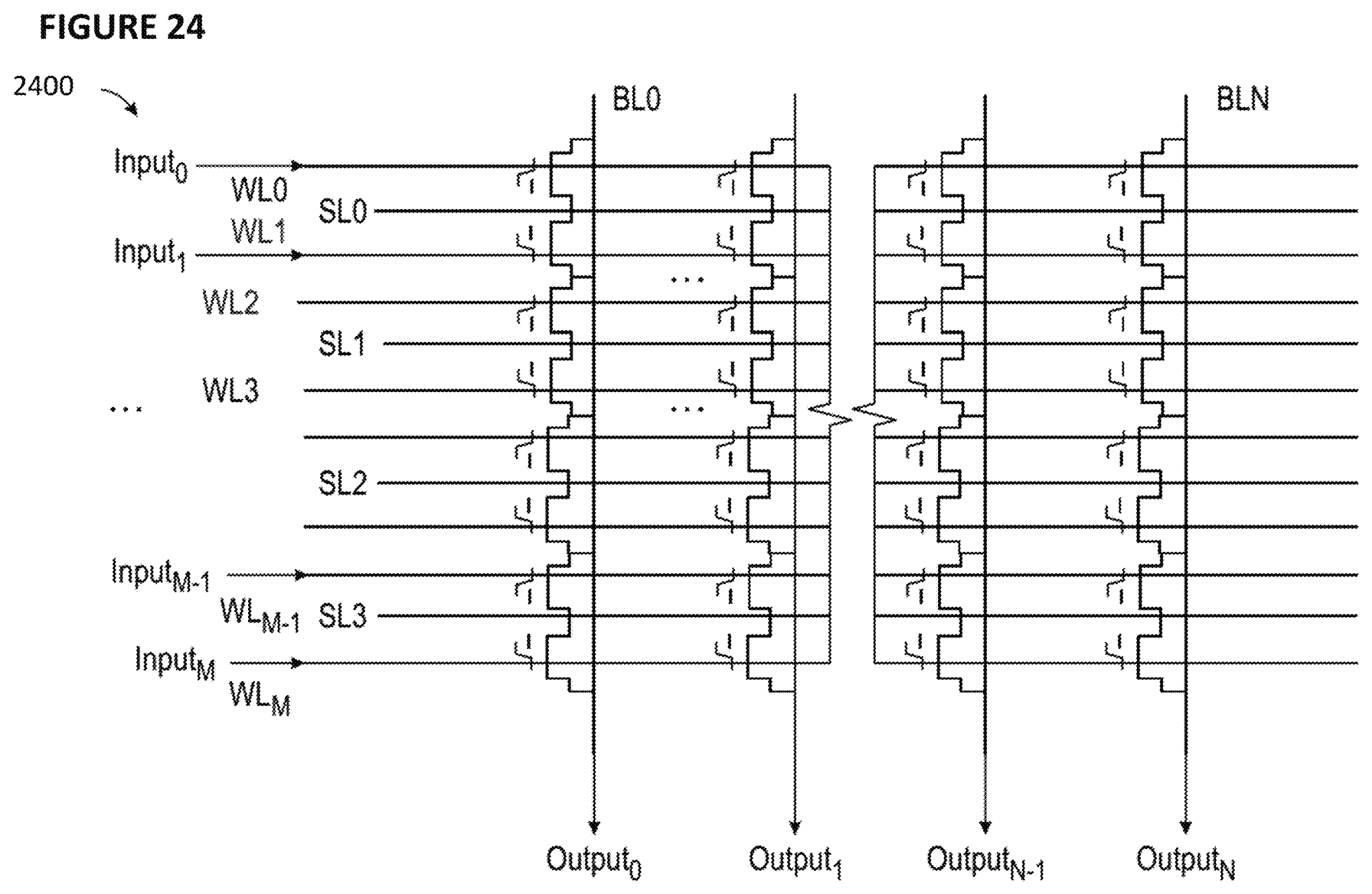

FIG. 24 depicts another example of a VMM system.

Figure 25:
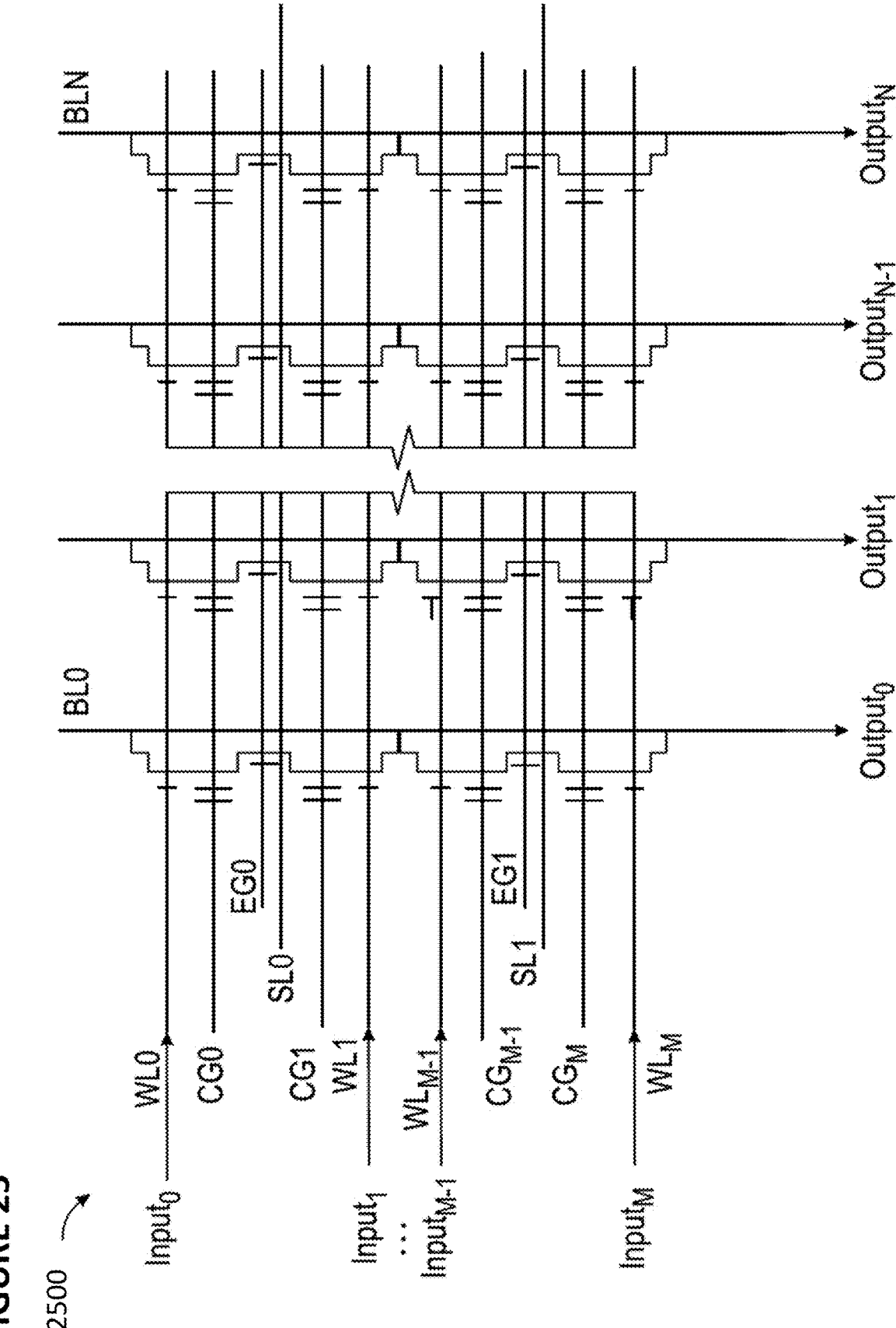

FIG. 25 depicts another example of a VMM system.

Figure 26:
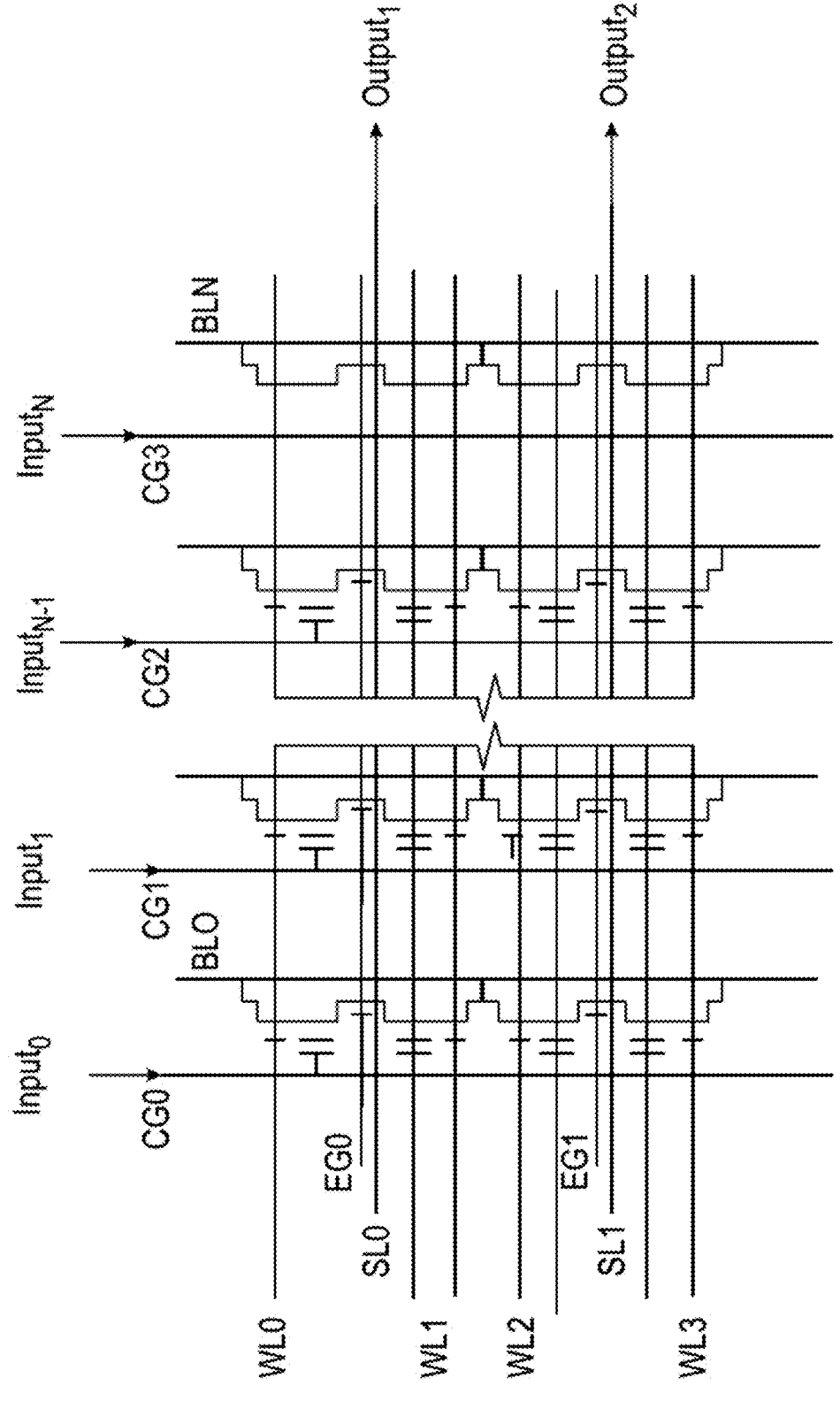

FIG. 26 depicts another example of a VMM system.

Figure 27:
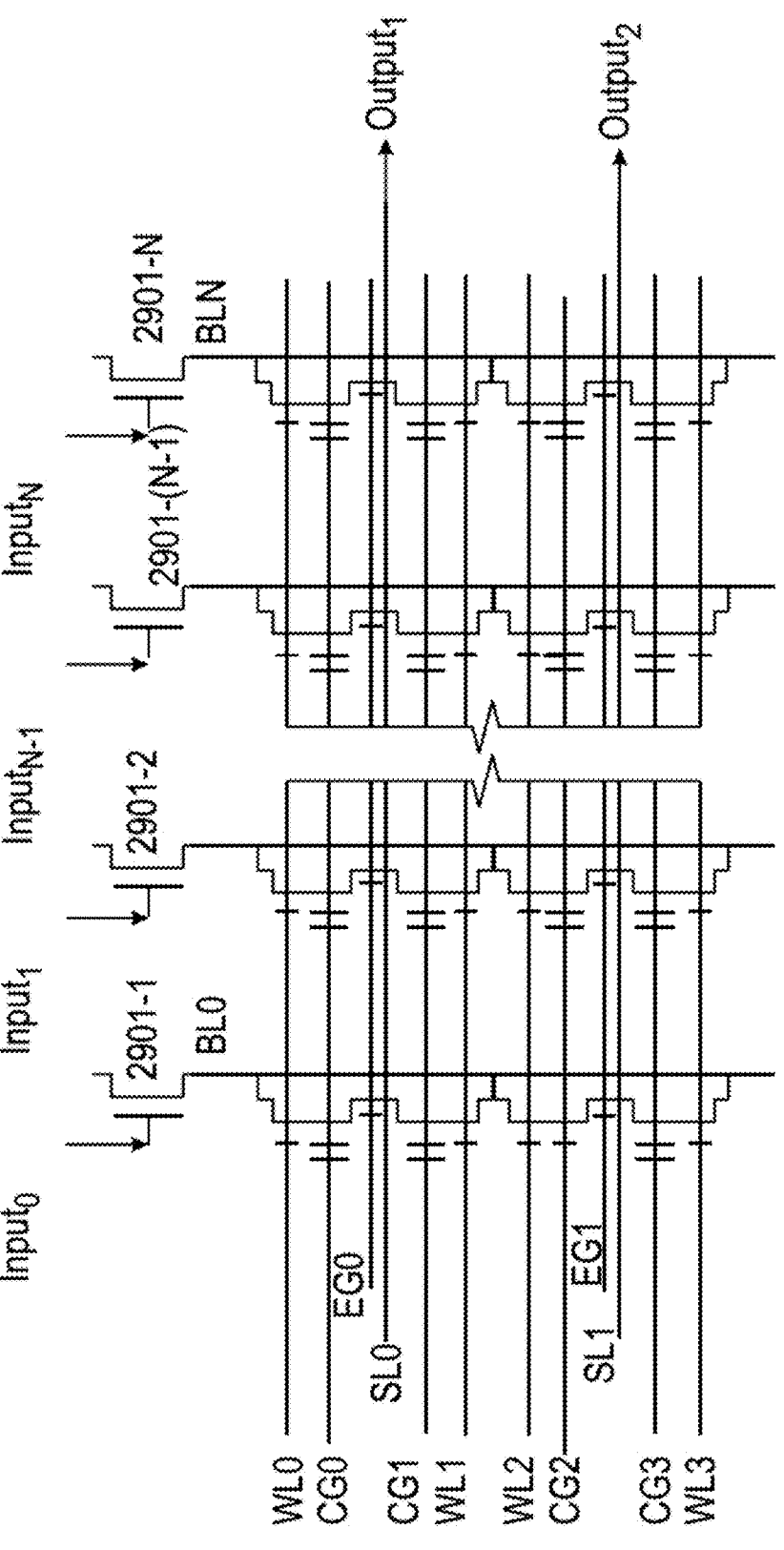

FIG. 27 depicts another example of a VMM system.

Figure 28:
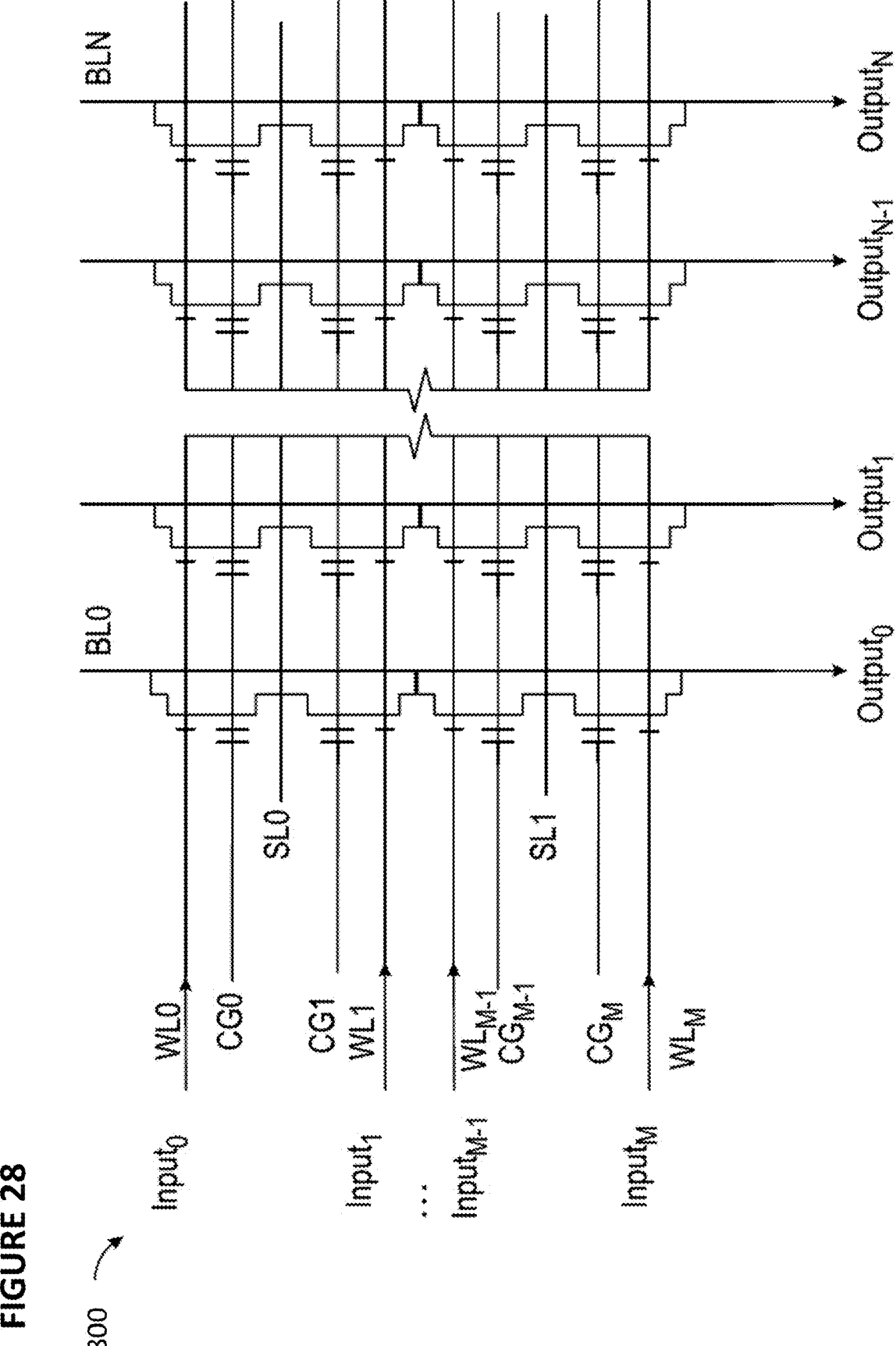

FIG. 28 depicts another example of a VMM system.

Figure 29:
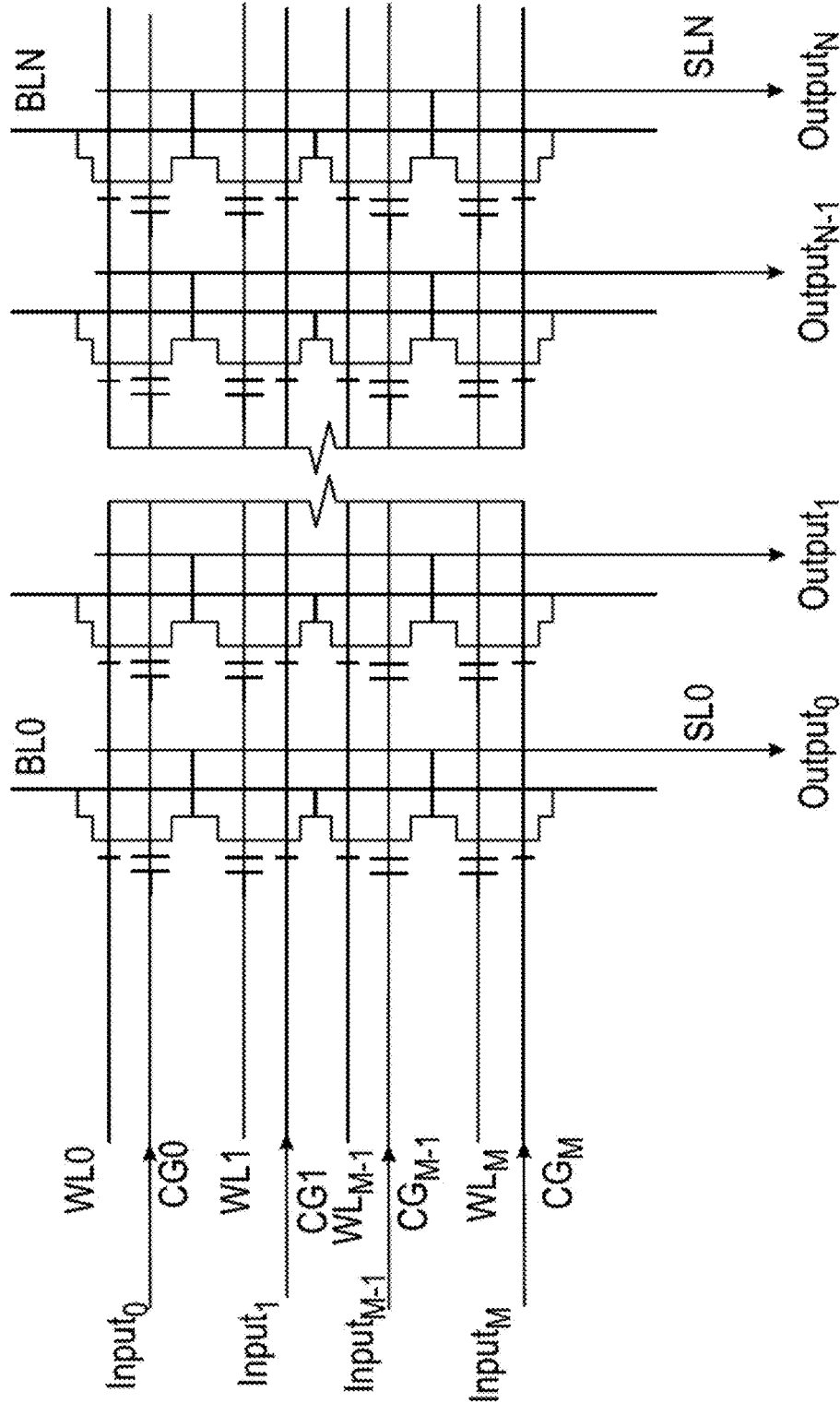

FIG. 29 depicts another example of a VMM system.

Figure 30:
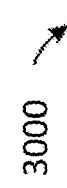

FIG. 30 depicts another example of a VMM system.

Figure 31:
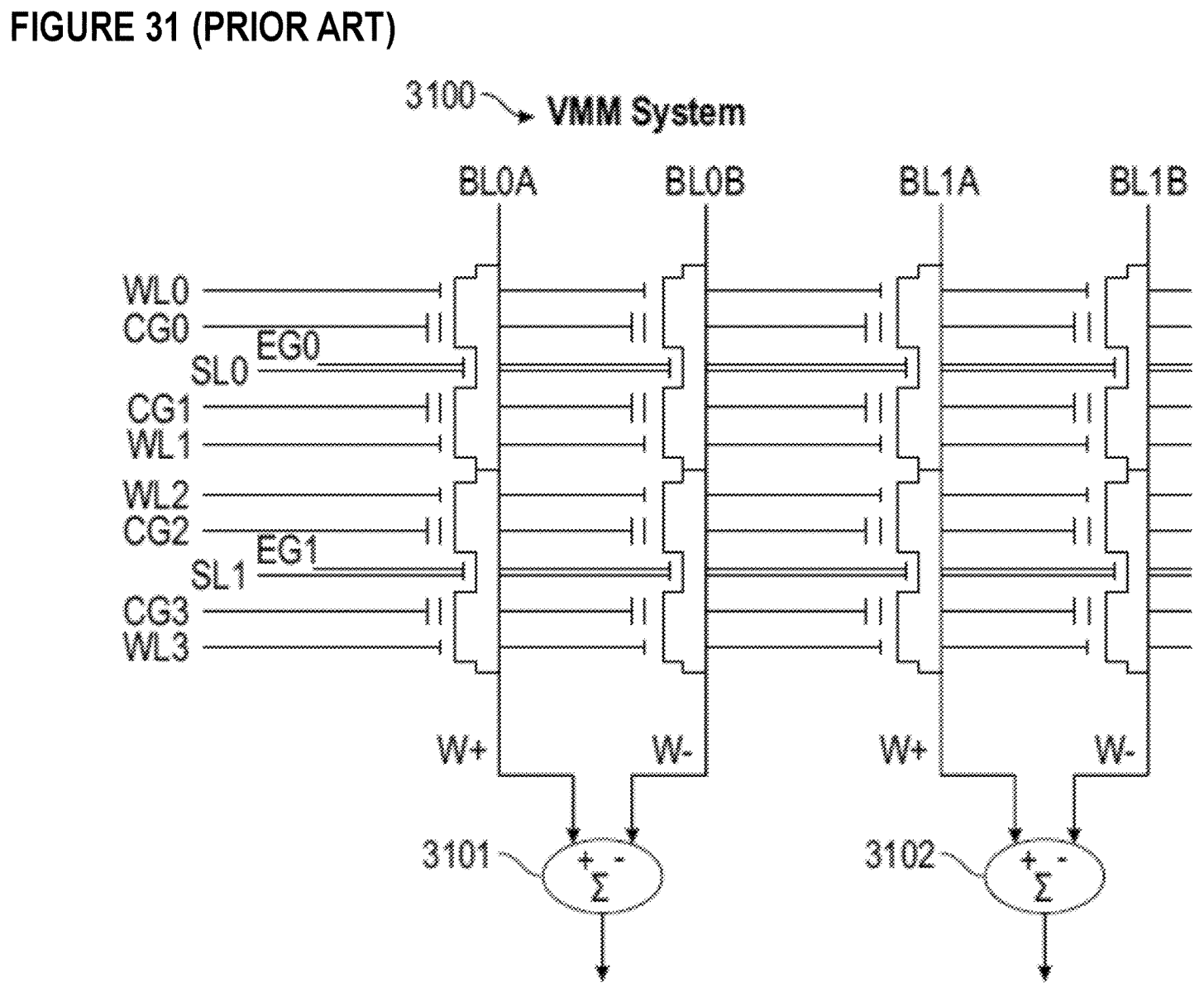

FIG. 31 depicts another example of a VMM system.

Figure 32:
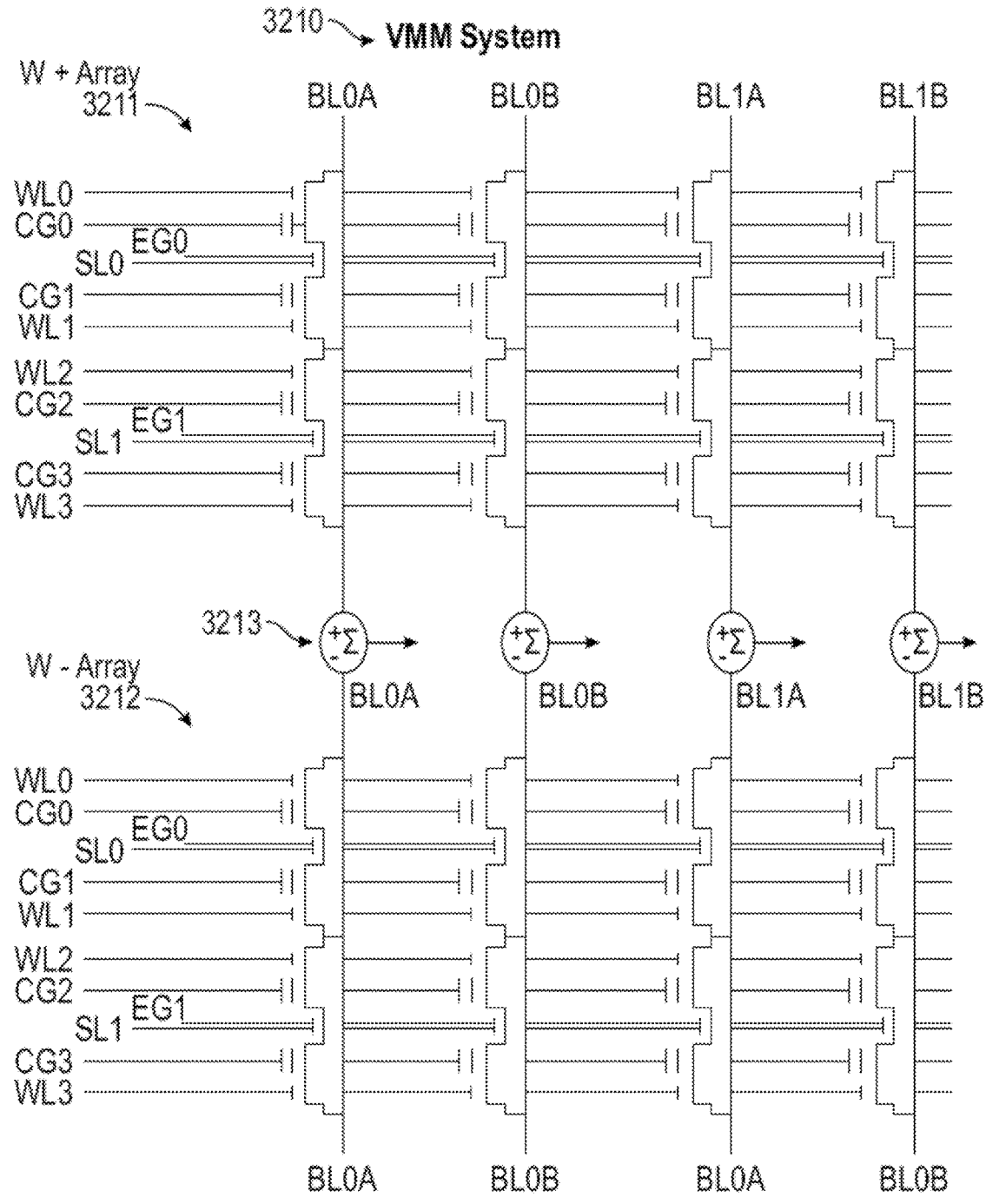

FIG. 32 depicts another example of a VMM system.

Figure 33:
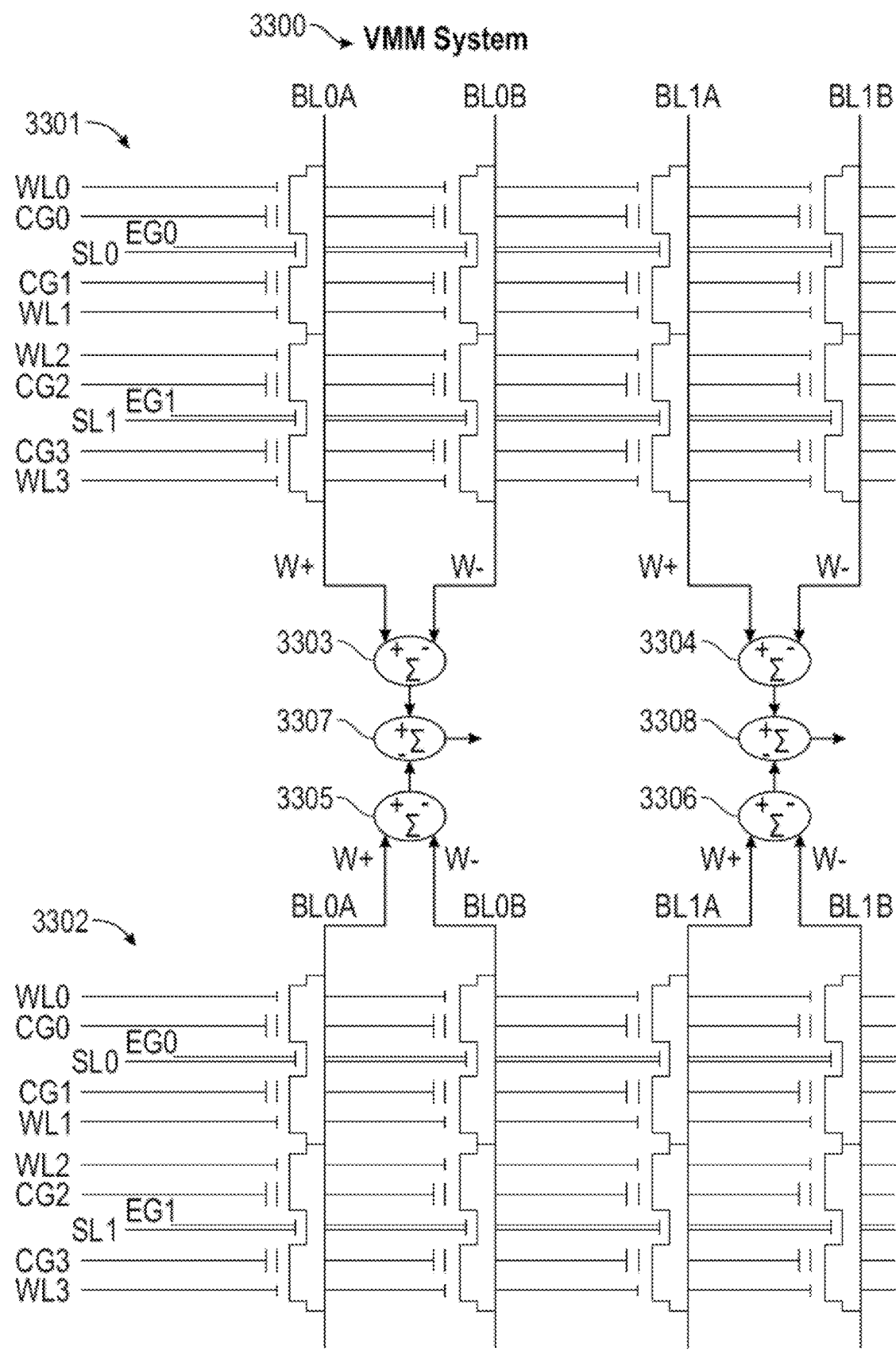

FIG. 33 depicts another example of a VMM system.

Figure 34:
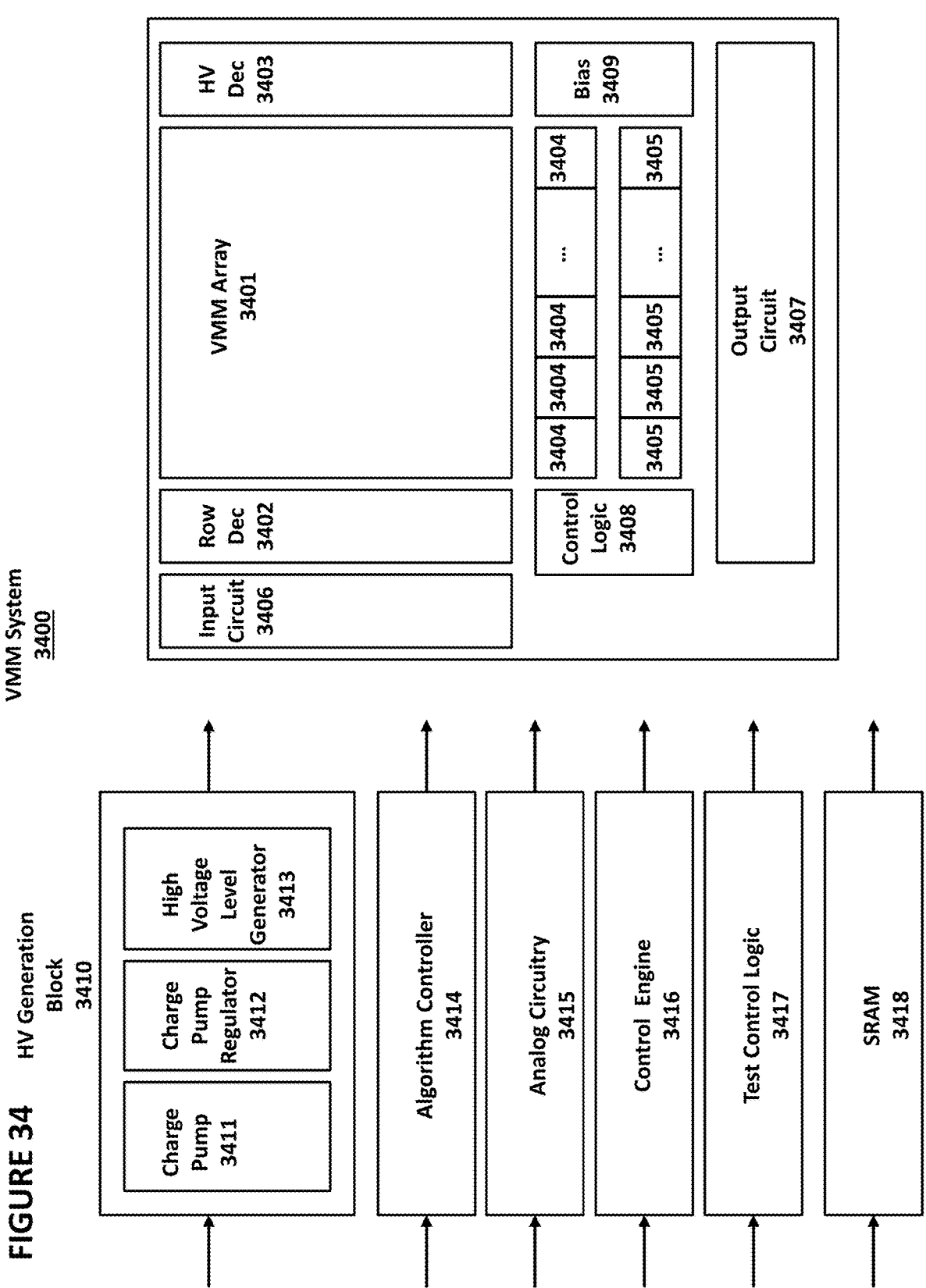

FIG. 34 depicts another example of a VMM system.

Figure 35A:
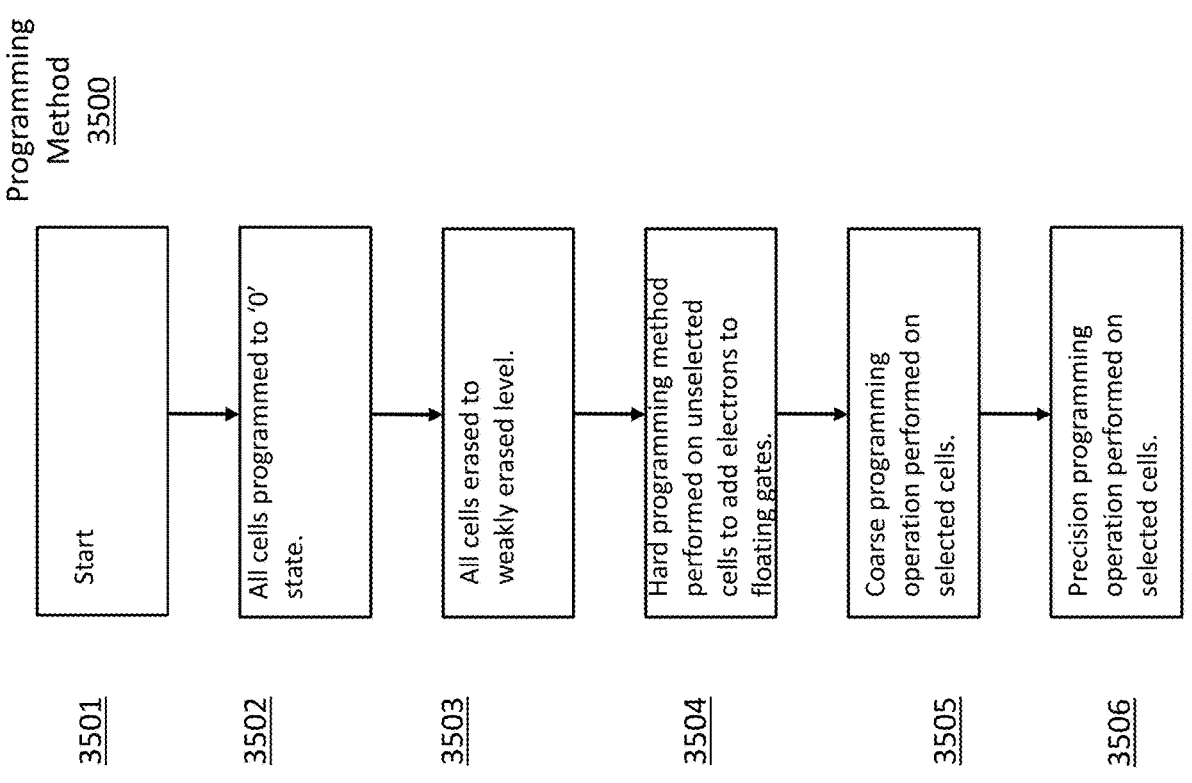
Figure 35B:
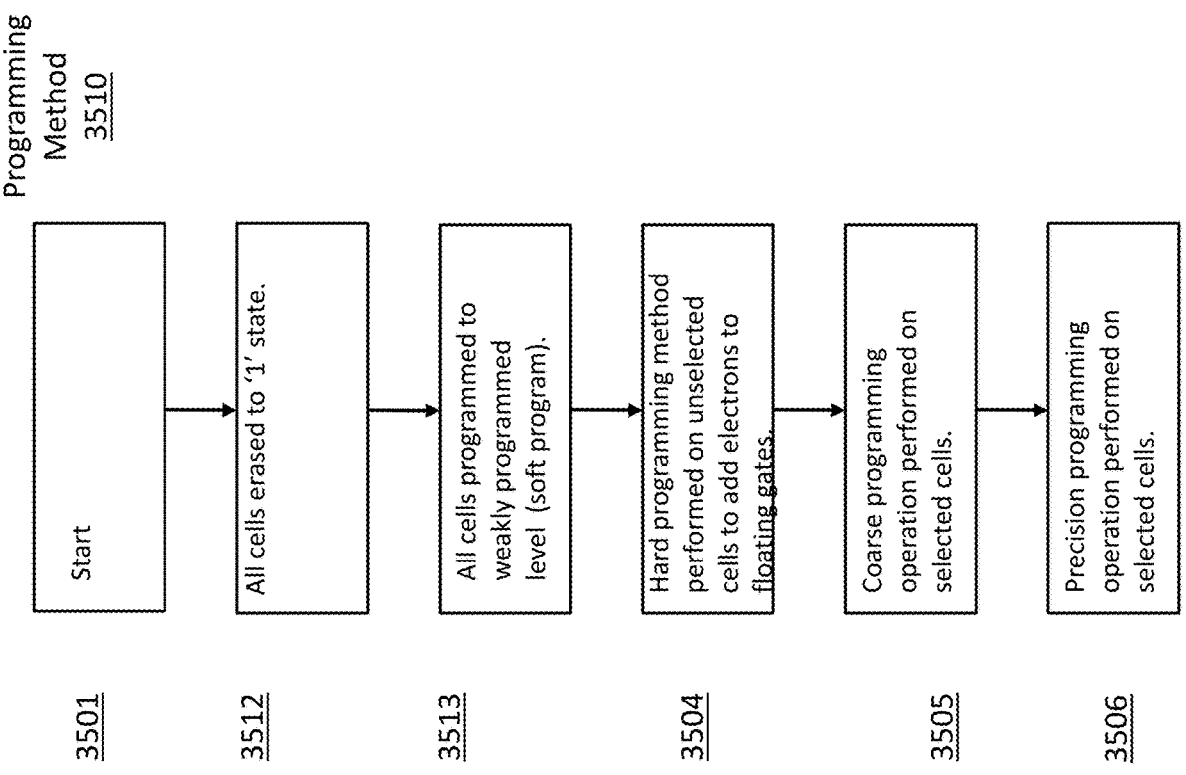

FIGS. 35A and 35B depict respective programming methods.

FIG. 36 depicts a search and execute method.

Figure 37:
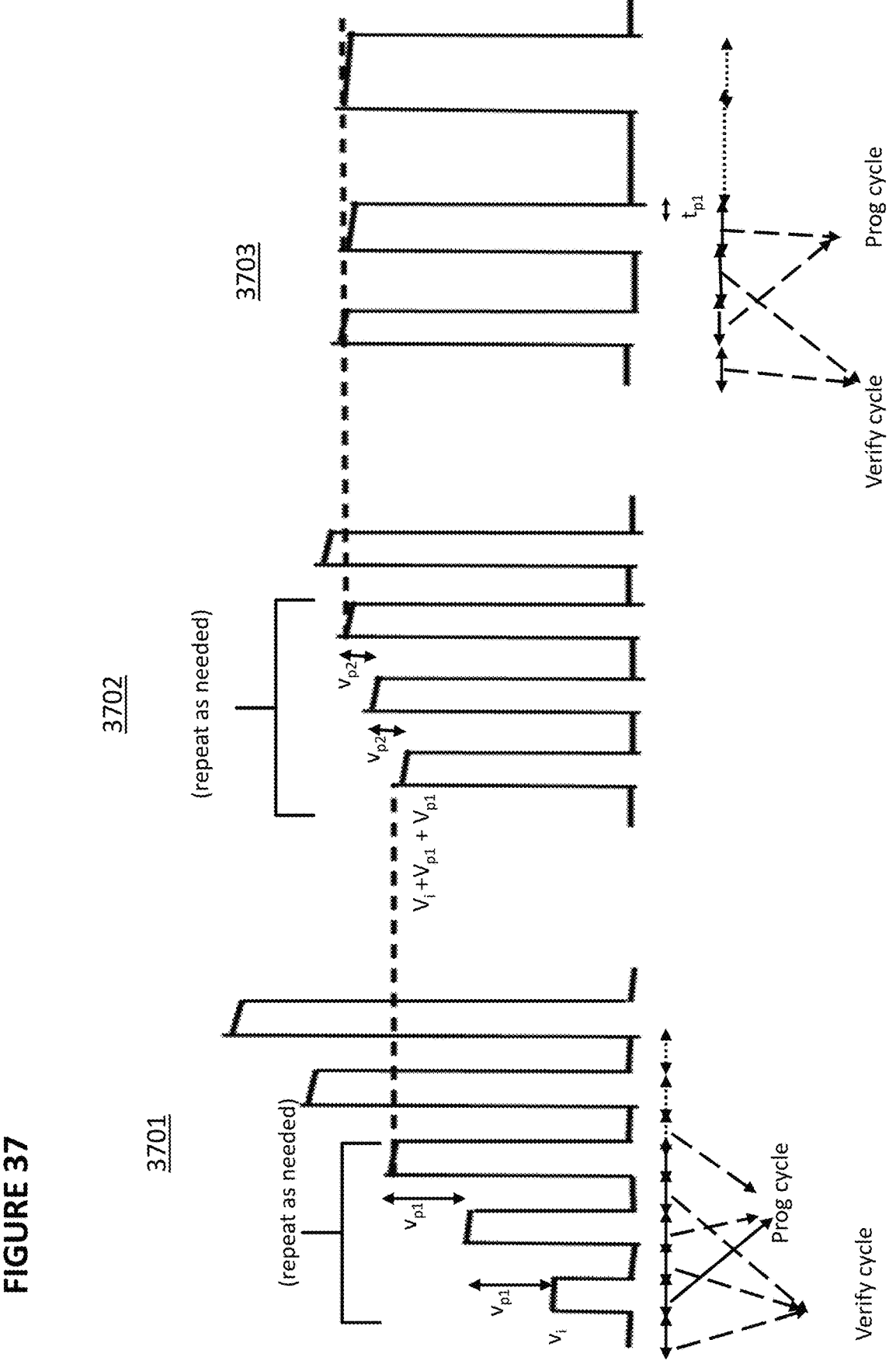

FIG. 37 depicts a precision programming method.

Figure 38:
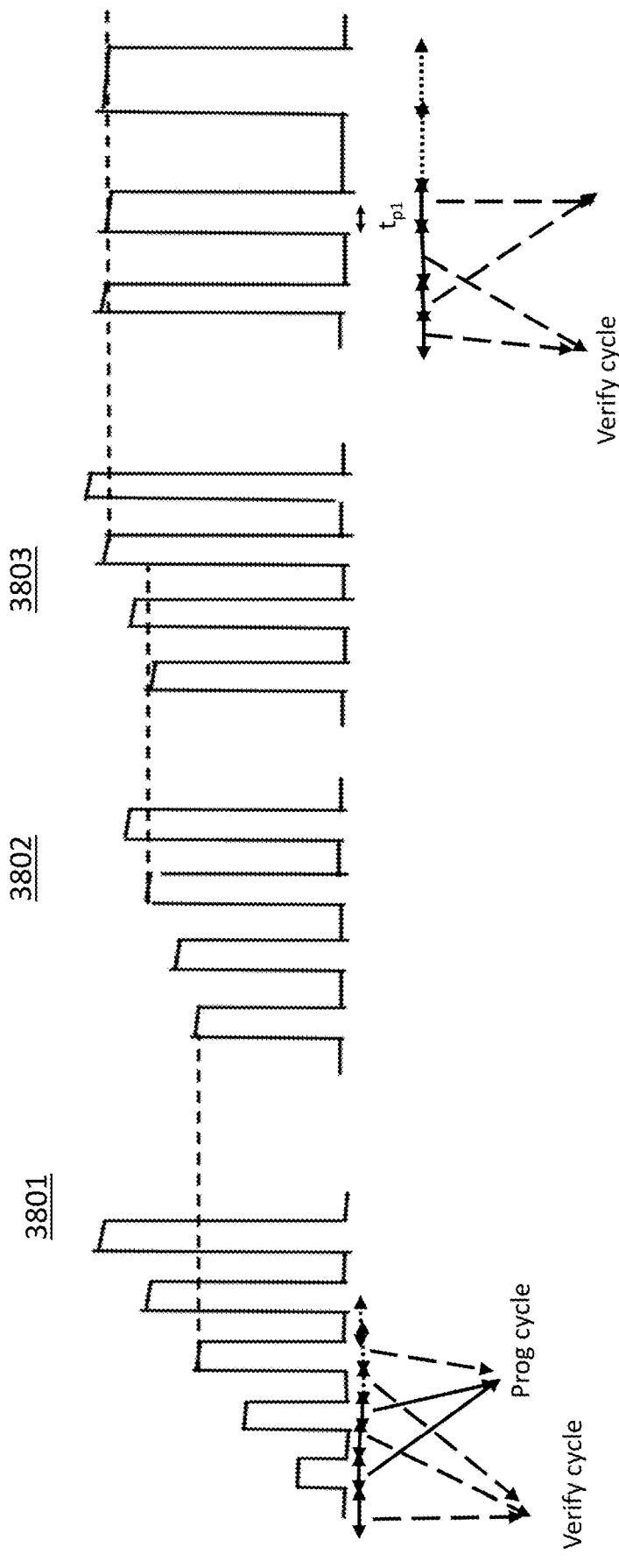

FIG. 38 depicts a precision programming method.

Figure 39:
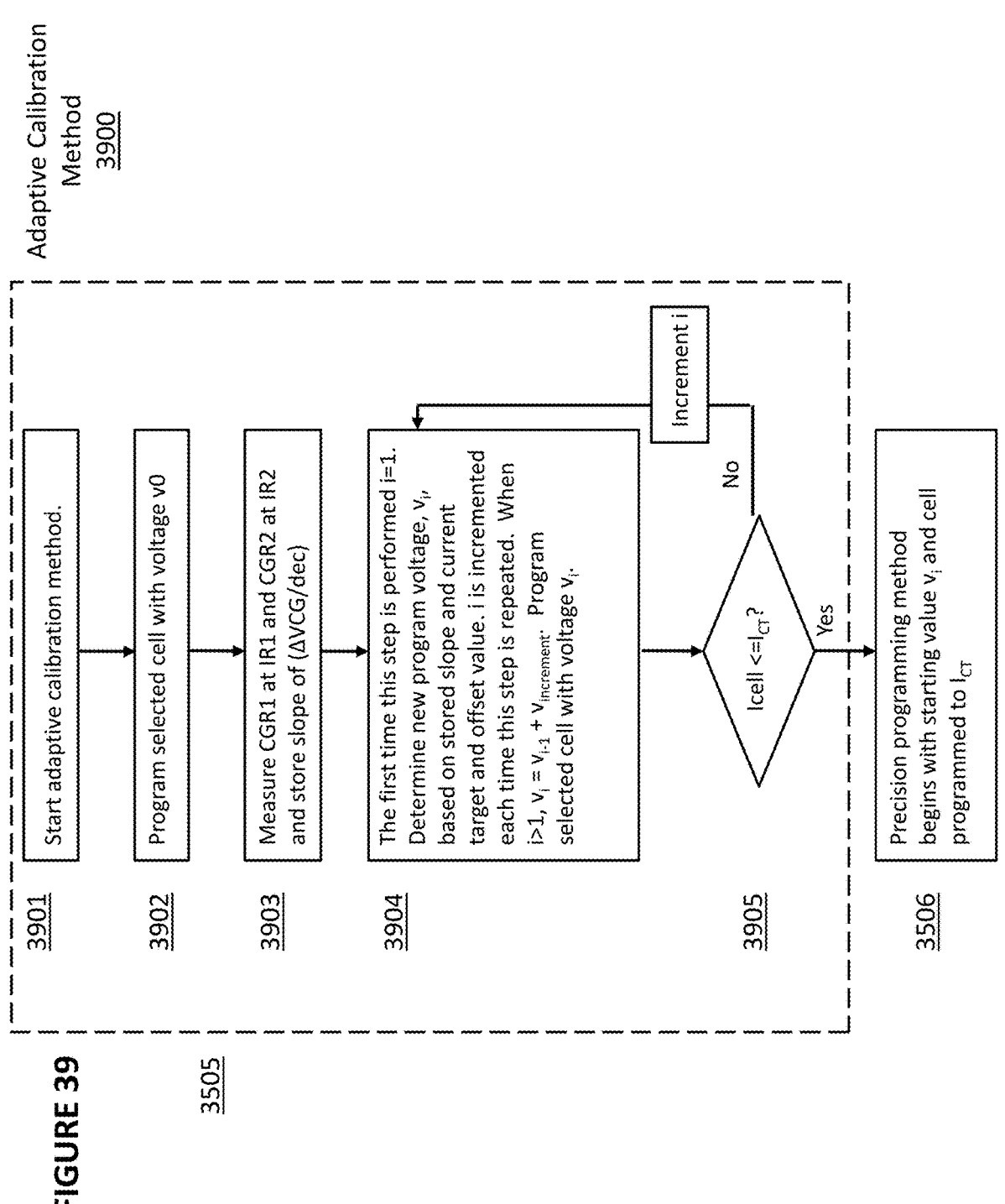

FIG. 39 depicts an adaptive calibration method.

Figure 40:
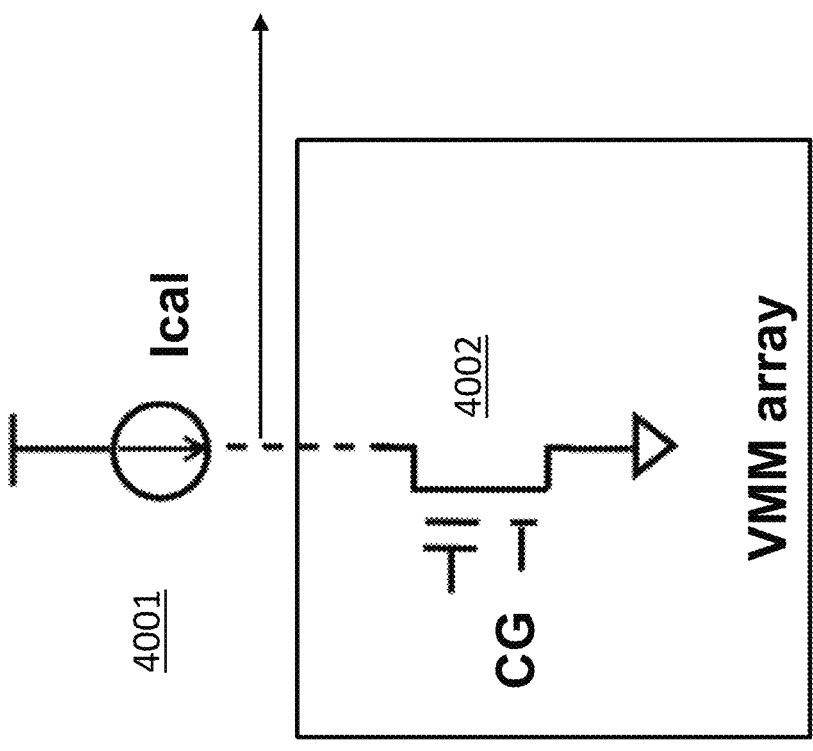

FIG. 40 depicts a calibration circuit.

FIG. 41 depicts an adaptive calibration method.

FIG. 42 depicts an absolute calibration method.

Figure 43:
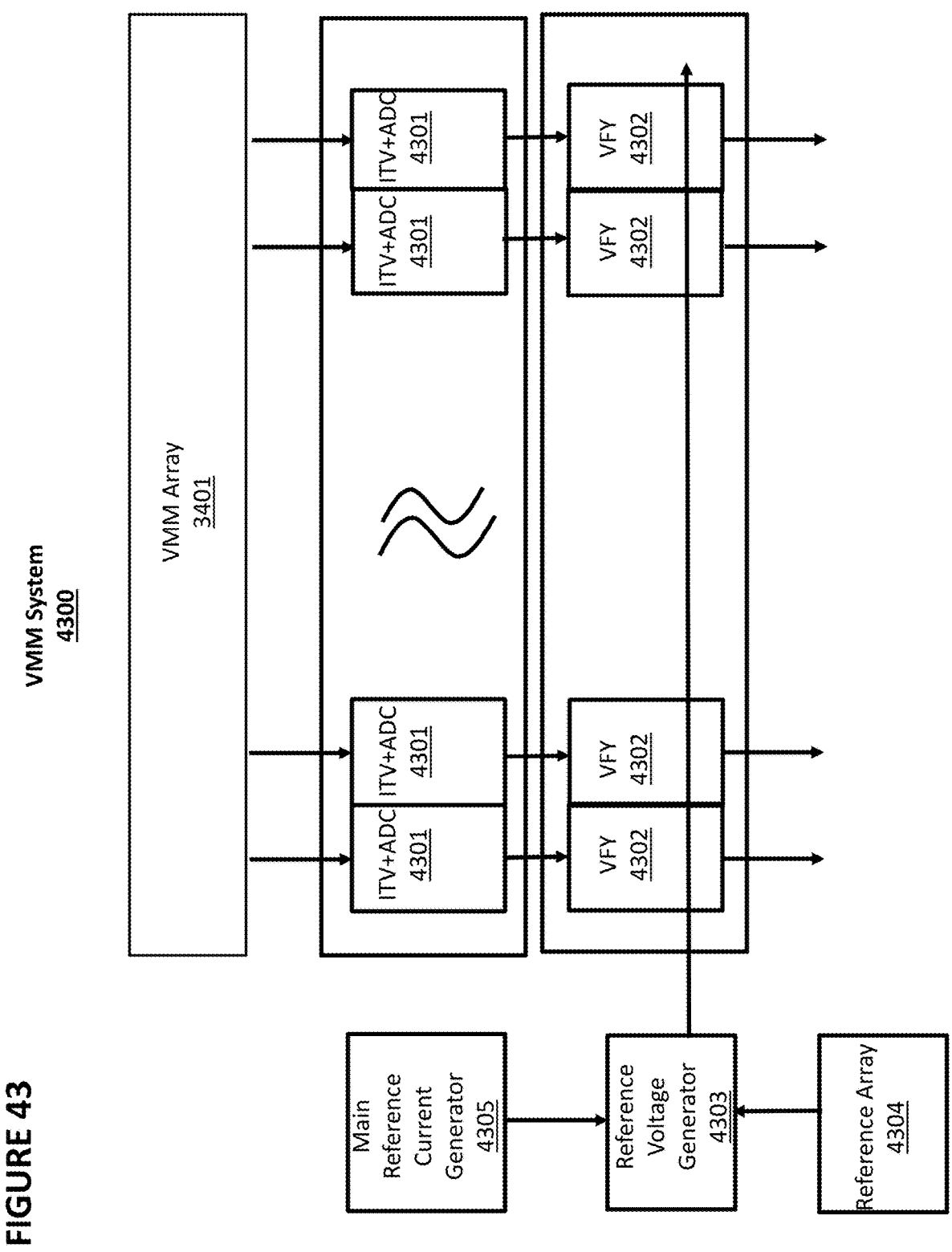

FIG. 43 depicts a VMM system including verification circuitry.

Figure 44A:
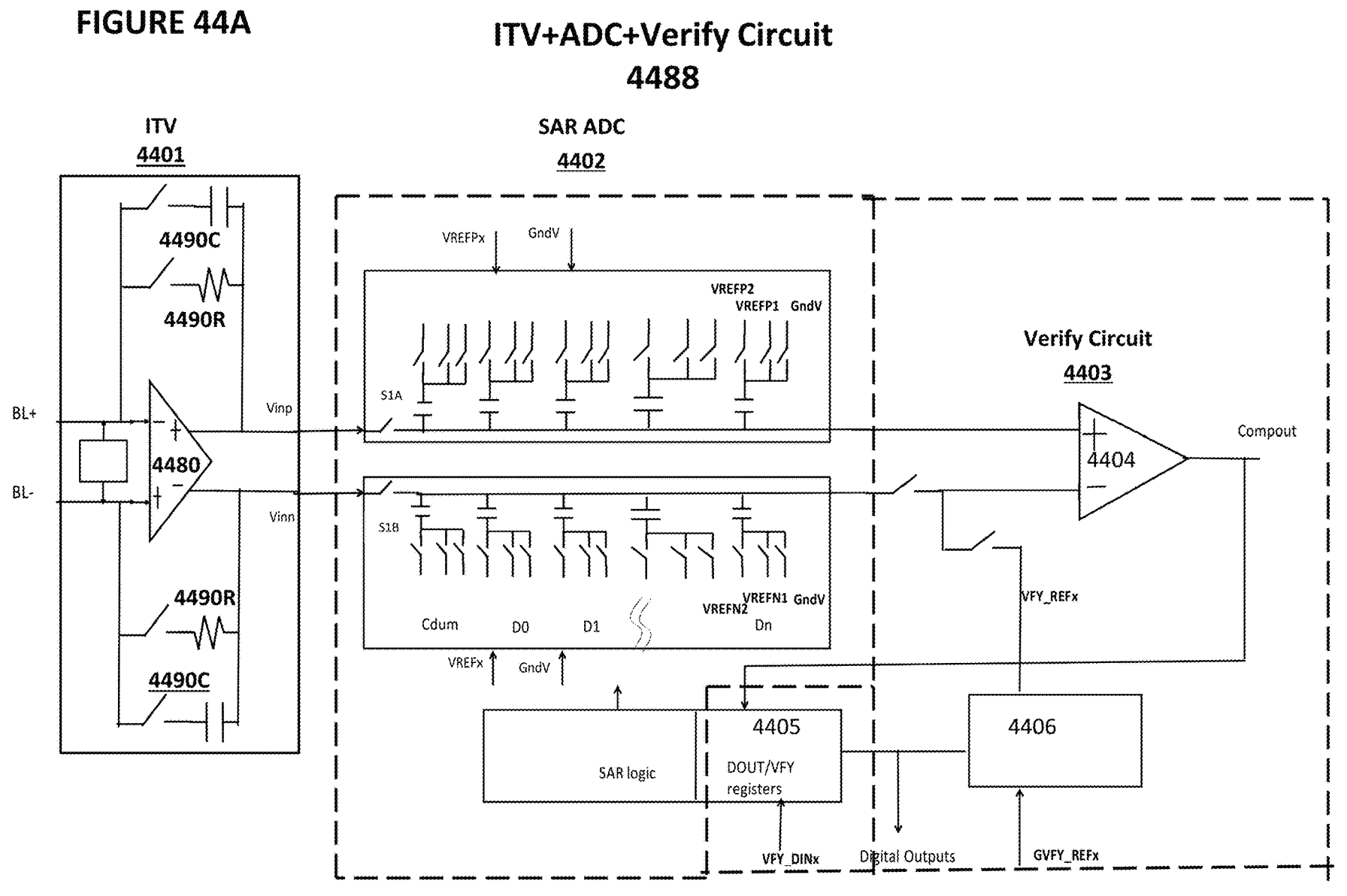

FIG. 44A depicts an example verification circuitry.

Figure 44B:
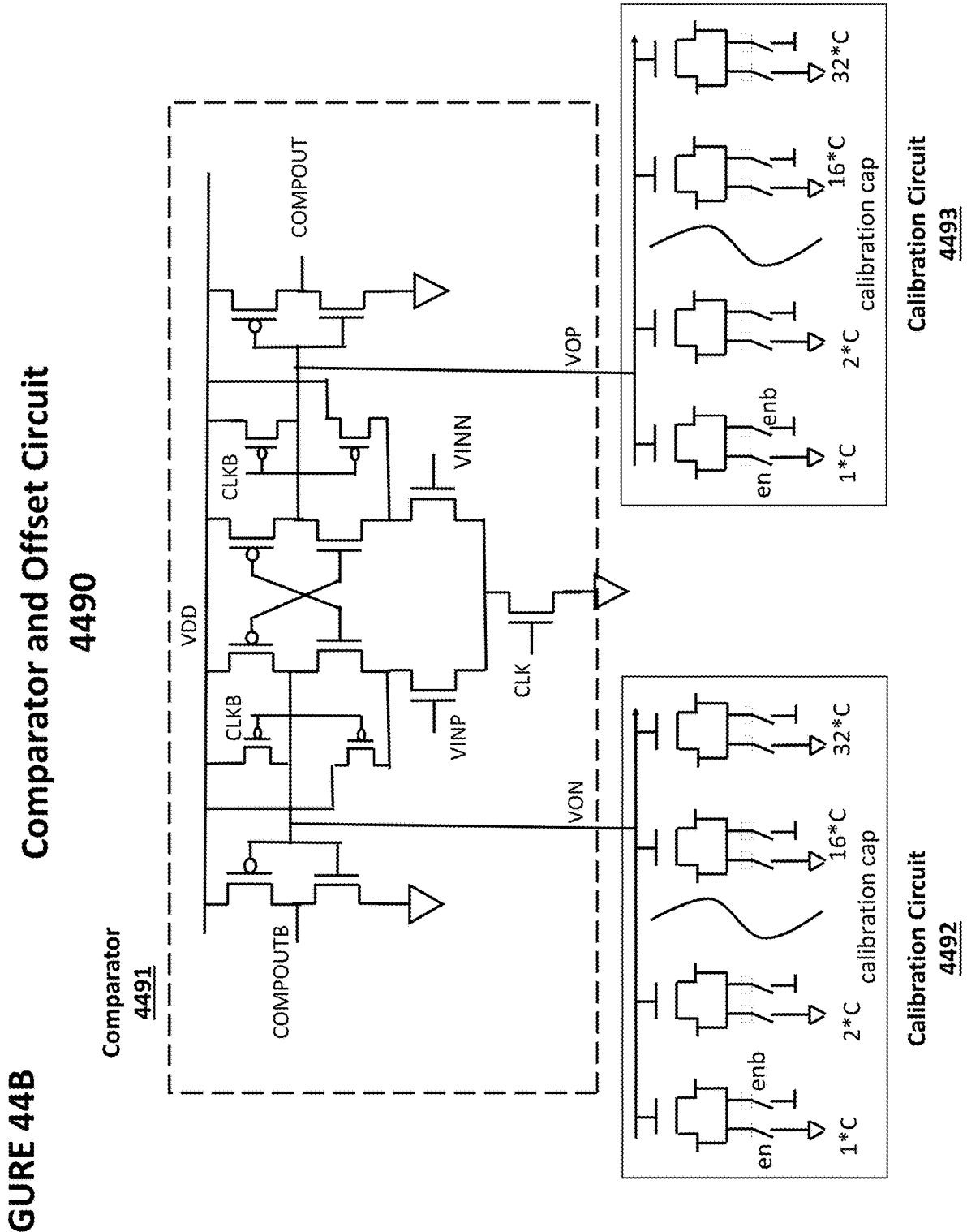

FIG. 44B depicts an example comparator circuit with offset compensation.

Figure 45:
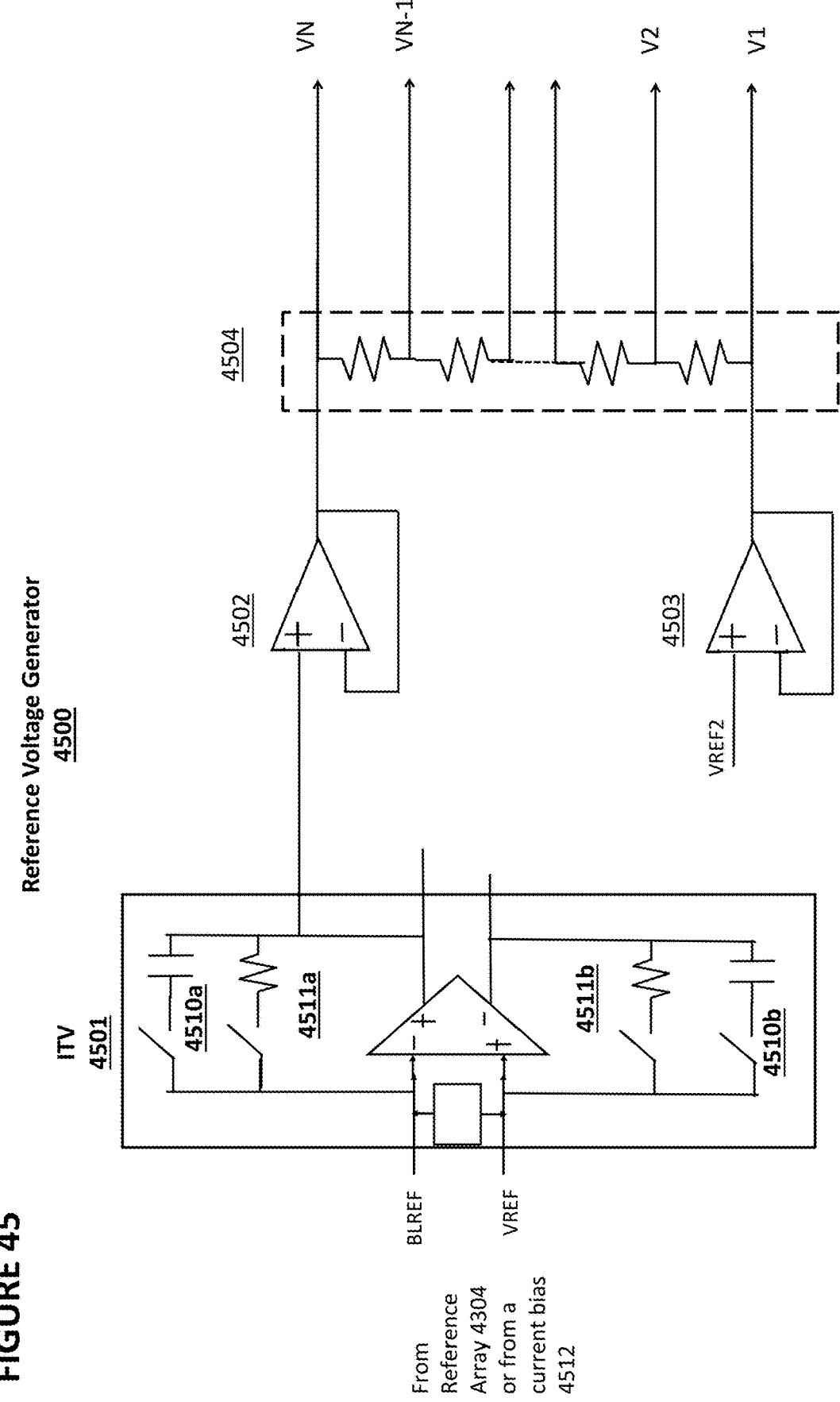

FIG. 45 depicts a reference voltage generator.

Figures 46, 47:
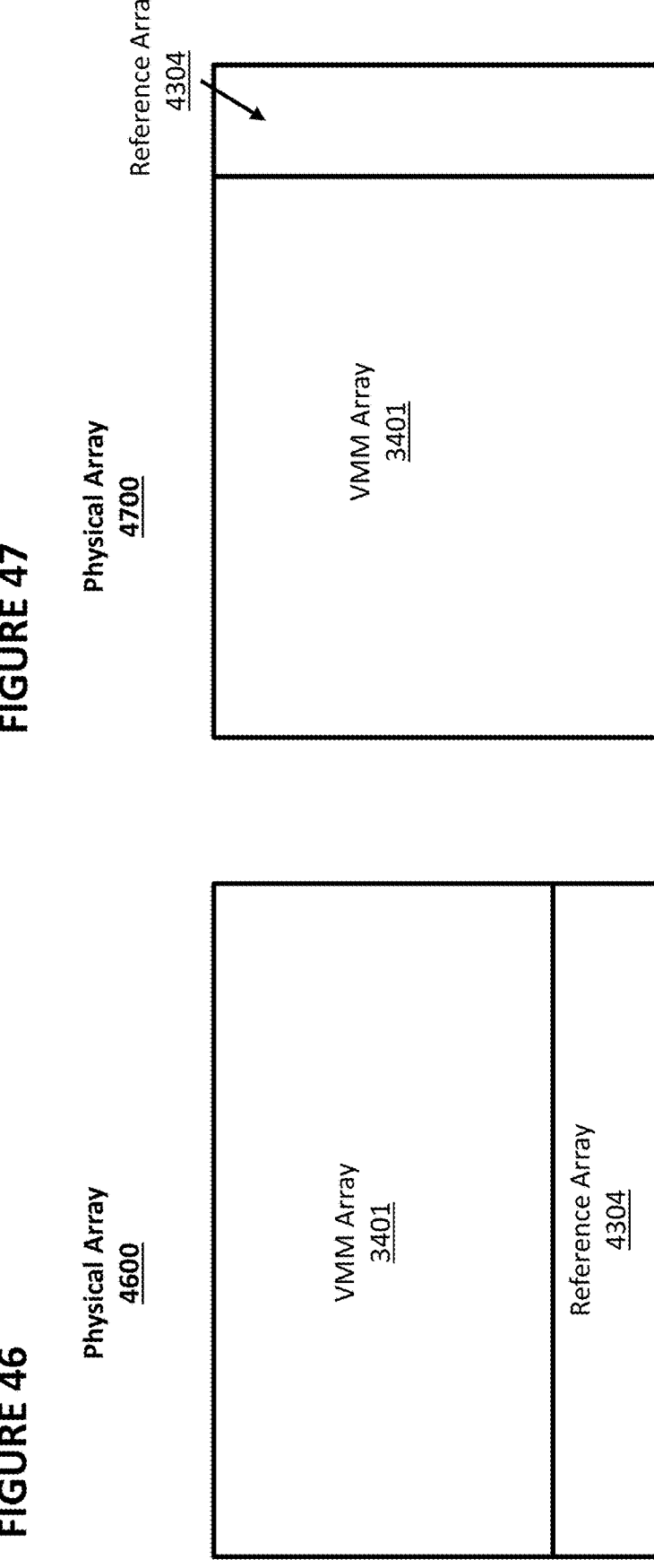

FIG. 46 depicts a physical array comprising reference arrays.

FIG. 47 depicts a physical array comprising reference arrays.

Figure 48:
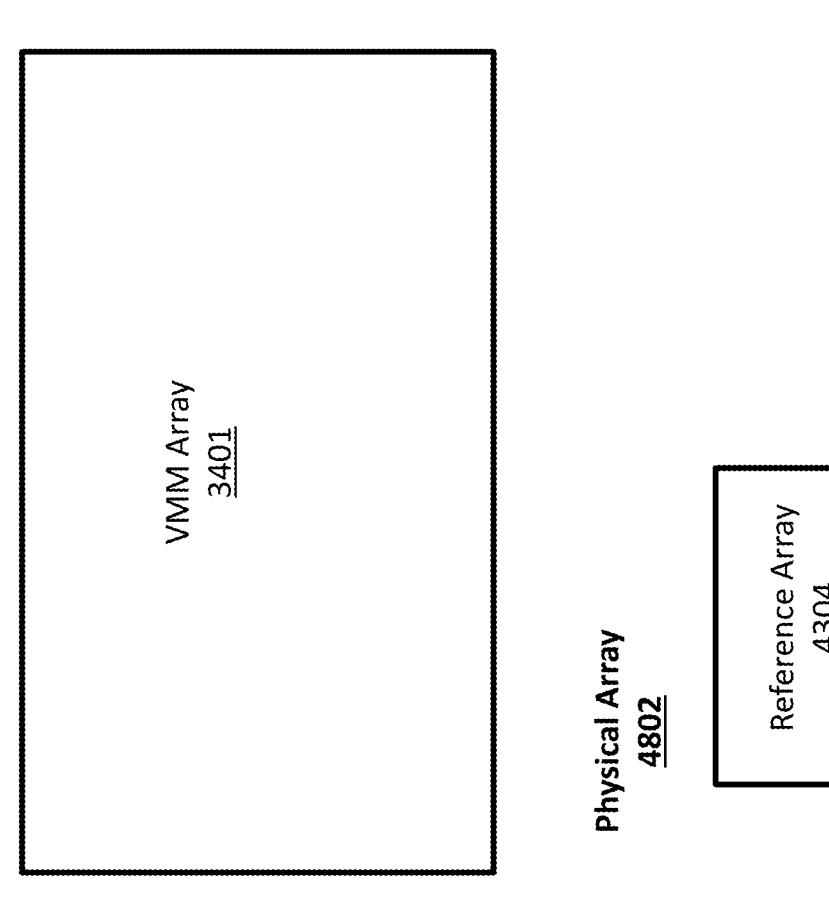

FIG. 48 depicts a physical array comprising a VMM array and another physical array comprising a reference array.

FIG. 49 depicts a reference array comprising a plurality of reference sub-arrays.

FIG. 50 depicts a reference array comprising a plurality of reference sub-arrays.

DETAILED DESCRIPTION OF THE INVENTION

VMM System Architecture

FIG. 34 depicts a block diagram of VMM system 3400. VMM system 3400 comprises VMM array 3401, row decoder 3402, high voltage decoder 3403, column decoders 3404, bit line drivers 3405, input circuit 3406, output circuit 3407, control logic 3408, and bias generator 3409. VMM system 3400 further comprises high voltage generation block 3410, which comprises charge pump 3411, charge pump regulator 3412, and high voltage level generator 3413. VMM system 3400 further comprises (program/erase, or weight tuning) algorithm controller 3414, analog circuitry 3415, control engine 3416 (that may include special functions such as arithmetic functions, activation functions, embedded microcontroller logic, without limitation), test control logic 3417, and static random access memory (SRAM) block 3418 to store intermediate data such as for input circuits (e.g., activation data) or output circuits (neuron output data) or data in for programming (such as data in for whole row or multiple rows).

The input circuit 3406 may include circuits such as a DAC (digital to analog converter), DPC (digital to pulses converter, digital to time modulated pulse converter), AAC (analog to analog converter, such as a current to voltage converter, logarithmic converter), PAC (pulse to analog level converter), or any other type of converters. The input circuit 3406 may implement one or more of normalization, linear or non-linear up/down scaling functions, or arithmetic functions. The input circuit 3406 may implement a temperature compensation function for input levels. The input circuit 3406 may implement an activation function such as ReLU or sigmoid. Input circuit 3406 may store digital activation data to be applied as, or combined with, an input signal during a program or read operation. The digital activation data can be stored in registers. Input circuit 3406 may comprise circuits to drive the array terminals, such as CG, WL, EG, and SL lines, which may include sample-and-hold circuits and buffers. A DAC can be used to convert digital activation data into an analog input voltage to be applied to the array.

The output circuit 3407 may include circuits such as an ITV (current-to-voltage circuit), ADC (analog to digital converter, to convert neuron analog output to digital bits), AAC (analog to analog converter, such as a current to voltage converter, logarithmic converter), APC (analog to pulse(s) converter, analog to time modulated pulse converter), or any other type of converter. The output circuit 3407 may convert array outputs into activation data. The output circuit 3407 may implement an activation function such as rectified linear activation function (ReLU) or sigmoid. The output circuit 3407 may implement one or more of statistic normalization, regularization, up/down scaling/gain functions, statistical rounding, or arithmetic functions (e.g., add, subtract, divide, multiply, shift, log) for neuron outputs. The output circuit 3407 may implement a temperature compensation function for neuron outputs or array outputs (such as bitline output) so as to keep power consumption of the array approximately constant over temperature or to improve precision of the array (neuron) outputs such as by keeping the IV slope approximately the same over temperature. The output circuit 3407 may comprise registers for storing output data.

FIG. 35A depicts programming method 3500. First, the method starts (step 3501), which typically occurs in response to a program command being received. Next, a mass program operation programs all cells to a '0' state (step 3502). Then a soft erase operation erases all cells to a weakly erased level such that each cell would draw current of, for example, approximately 1-5 µA during a read operation (step 3503). This is in contrast to a deeply erased level where each cell would draw current of, for example, approximately 20-30 µA during a read operation. Then, a hard program operation is performed on all unselected cells to a very deep programmed state to add electrons to the floating gates of the cells (step 3504) to ensure that those cells are really "off," meaning that those cells will draw a negligible amount of current during a read operation.

A coarse programming operation is then performed to program the selected cell to a level much closer to the target, for example 2×-100× the target. The coarse programming operation is performed on the selected cells (step 3505), followed by a precision programming operation on the selected cells (step 3506) to program the precise value desired for each selected cell.

A coarse programming operation (3505) may consist of multiple coarse verify/program cycles. In each coarse verify/program cycle, a verify operation is performed to verify whether a cell output meets a coarse target; if not, then a programming operation is again performed on that cell. The verify/program cycles are repeated until the cell output of all target cells meet the coarse target.

A precision programming operation (3506) may consist of multiple precision verify/program verify/program cycles. In each precision verify/program cycle, a verify operation is performed to verify whether a cell output meets a precision target; if not, then a programming operation is again performed on that cell. The verify/program cycles are repeated until the cell output of all target cells meet the precision target.

FIG. 35B depicts another programming method 3510, which is similar to programming method 3500. However, instead of a program operation to program all cells to a '0' state as in step 3502 of FIG. 35A, after the method start (step 3501), an erase operation is used to erase all cells to a '1' state (step 3512). Then a soft program operation (step 3513) is used to program all cells to a weakly programmed state (level) such that each cell would draw current of, for example, approximately 3-5 µA during a read operation. Afterward, a hard program operation is performed on all unselected cells to a very deep programmed state (step 3504), followed by coarse and precision programming (3505-3506) as in FIG. 35A. A variation of the example of FIG. 35B would remove the soft programing method (step 3513).

FIG. 36 depicts a first example of coarse programming operation 3505, which is search and execute method 3600. First, a lookup table search is performed to determine a coarse target current value ($I_{CT}$) for the selected cell based on the value that is intended to be stored in that selected cell (step 3601). This table is, for example, created by silicon characterization or from calibration from wafer testing. It is assumed that the selected cell can be programmed to store one of N possible values (e.g., 128, 64, 32, without limitation). Each of the N values would correspond to a different desired current value ($I_D$) that is drawn by the selected cell during a read operation. In one example, a look-up table might contain M possible current values to use as the coarse target current value $I_{CT}$ for the selected cell during search and execute method 3600, where M is an integer less than N. For example, if N is 8, then M might be 4, meaning that there are 8 possible values that the selected cell can store, and one of 4 coarse target current values will be selected as the coarse target for search and execute method 3600. That is, search and execute method 3600 (which, as indicated above, is an example of coarse programming method 3505) is intended to quickly program the selected cell to a value ($I_{CT}$) that is somewhat close to the desired value ($I_D$), and then the precision programming method 3506 is intended to more precisely program the selected cell to the desired value ($I_D$).

Examples of cell values, desired current values, and coarse target current values are depicted in Tables 9 and 10 for the simple example of N=8 and M=4:

TABLE NO 9

| Example of N Desired Current Values for N = 8 | |
| --- | --- |
| Value Stored in Selected Cell | Desired Current Value ($I_D$) |
| 000 | 100 pA |
| 001 | 200 pA |
| 010 | 300 pA |
| 011 | 400 pA |
| 100 | 500 pA |
| 101 | 600 pA |
| 110 | 700 pA |
| 111 | 800 pA |

TABLE NO 10

| Example of M Target Current Values for M = 4 | |
| --- | --- |
| Coarse Target Current Value ($I_{CT}$) | Associated Cell Values |
| 800 pA + $I_{CTOFFSET1}$ | 000, 001 |
| 1600 pA + $I_{CTOFFSET2}$ | 010, 011 |
| 2400 pA + $I_{CTOFFSET3}$ | 100, 101 |
| 3200 pA + $I_{CTOFFSET4}$ | 110, 111 |

The offset values $I_{CTOFFSETx}$ are used to prevent overshooting the desired current value during coarse tuning.

Once the coarse target current value $I_{CT}$ is selected, the selected cell is programmed by applying the voltage $v_0$ to the appropriate terminal of selected cell based on the cell architecture type of the selected cell (e.g., memory cells 210, 310, 410, or 510) (step 3602). If the selected cell is of type memory cell 310 in FIG. 3, then the voltage $v_0$ will be applied to control gate terminal 28, and $v_0$ might be 5-7V depending on coarse target current value $I_{CT}$. The value of $v_0$ optionally can be determined from a voltage look up table that stores values for $v_0$ vs. coarse target current value $I_{CT}$.

Next, the selected cell is programmed by applying the voltage $v_i = v_{i-1} + v_{increment}$, where i starts at 1 and increments each time this step is repeated, and where $v_{increment}$ is a small, fine voltage that will cause a degree of programming that is appropriate for the granularity of change desired (step 3603). Thus, the first time step 3603 is performed, i=1, and $v_i$ will be $v_0 + v_{increment}$. Then a verify operation occurs (step 3604), wherein a read operation is performed on the selected cell and the current drawn through the selected cell ($I_{cell}$) is compared with a coarse target threshold value, $I_{CT}$. If $I_{cell}$ is less than or equal to $I_{CT}$ (which here is a first threshold value), then search and execute method 3600 is complete and precision programming method 3506 can begin. If Lai is not less than or equal to $I_{CT}$, then i is incremented and step 3603 is repeated.

Thus, at the point when coarse programming method 3505 ends and precision programming method 3506 begins, the voltage $v_i$ will be the last voltage used to program the selected cell, and the selected cell will be storing a value associated with the coarse target current value $I_{CT}$, where $I_{cell}$ is $>=I_{CT}$. Precision programming method 3506 programs the selected cell to the point where during a read operation it draws a current $I_D$ (plus or minus an acceptable amount of deviation, such as +/−30% or less, e.g., +/−50 pA), which is the desired current value that is associated with the value that is intended to be stored in the selected cell.

FIG. 37 depicts examples of different voltage progressions that can be applied to the control gate of a selected memory cell during coarse programming operation 3505 and/or precision programming operation 3506. It consists of multiple verify/program cycles.

Under a first approach, increasing voltages are applied in progression to the control gate to program the selected memory cell. The starting point is $v_i$, which during a precision programming operation 3506 will be the last voltage applied during coarse programming method 3505. An increment of $v_{p1}$ is added to $v_1$ and the voltage $v_1+v_{p1}$ is then used to program the selected cell (indicated by the second pulse from the left in progression 3701). $v_{p1}$ is an increment that is smaller than $v_{increment}$ (the voltage increment used during coarse programming method 3505). After each programming voltage is applied, a verify operation (similar to step 3404) is performed, where a determination is made if Icell is less than or equal to $I_{PT1}$ (which is the first precision target current value and here is a second threshold value), where $I_{PT1}=I_D+I_{PT1OFFSET}$, where $I_{PT1OFFSET}$ is an offset valued added to prevent program overshoot. If it is not, then another increment $v_{p1}$ is added to the previously-applied programming voltage, and the process is repeated. At the point where $I_{cell}$ is less than or equal to $I_{PT1}$, then this portion of the programming sequence stops. Optionally, if $I_{PT1}$ is equal to $I_D$, or almost equal to $I_D$ with sufficient precision, i.e. plus or minus an acceptable amount of deviation, then the selected memory cell has been successfully programmed.

If $I_{PT1}$ is not close enough to $I_D$, i.e. not almost equal to $I_D$ with sufficient precision, then further programming of a smaller granularity occurs. Here, progression 3702 is now used. The starting point for progression 3702 is the last voltage used for programming under progression 3701. An increment of $V_{p2}$ (which is smaller than $v_{p1}$) is added to that voltage, and the combined voltage is applied to program the selected memory cell. After each programming voltage is applied, a verify operation (similar to step 3404) is performed, where a determination is made if $I_{cell}$ is less than or equal to $I_{PT2}$ (which is the second precision target current value and here is a third threshold value), where $I_{PT2}=ID+I_{PT2OFFSET}$, where $I_{PT2OFFSET}$ is an offset value added to prevent program overshoot. If it is not, then another increment $V_{p2}$ is added to the previously-applied programming voltage, and the process is repeated. At the point where $I_{cell}$ is less than or equal to $I_{PT2}$, plus or minus an acceptable amount of deviation, then this portion of the programming sequence stops. Here, it is assumed that $I_{PT2}$ is equal to $I_D$ or close enough to $I_D$ that the programming can stop, since the target value has been achieved with sufficient precision. One of ordinary skill in the art can appreciate that additional progressions can be applied with smaller and smaller programming increments used. For example, in FIG. 38, three progressions (3801, 3802, and 3803) are applied instead of just two.

A second approach is shown in progression 3703 in FIG. 37 and progression 3803 in FIG. 38. Instead of increasing the voltage applied during the programming of the selected memory cell, the same voltage is applied for durations of increasing period. That is, an additional increment of time to is added to the programming pulse such that each applied pulse is longer than the previously-applied pulse by to. After each programming pulse is applied, the same verify operation is performed as described previously for progression 3701. Optionally, additional progressions can be applied where the additional increment of time added to the programming pulse is of a smaller duration than the previous progression used. Although only one temporal progression is shown, one of ordinary skill in the art will appreciate that any number of different temporal progressions can be applied.

Additional detail will now be provided for three examples of coarse programming method 3505.

FIG. 39 depicts another example of coarse programming method 3505, which is adaptive calibration method 3900. The adaptive calibration method starts (step 3901). The cell is programmed at a default start value $v_0$ (step 3902). Unlike in search and execute method 3600, here $v_0$ is not derived from a lookup table, and instead can be a relatively small initial value. The control gate voltage of the cell is measured at a first current value IR1 (e.g., 100 na) and a second current value IR2 (e.g., 10 na), and a sub-threshold slope is determined based on those measurements (e.g., 360 mV/dec) and stored (step 3903).

A new program voltage, $v_i$, is determined. The first time this step is performed, i=1, and $v_1$ is determined based on the stored sub-threshold slope value and a current target and offset value using a sub-threshold equation, such as the following:

$$Vi=V_{i-1}+V_{increment},$$

where $V_{increment}$ is proportional to slope of $Vg$ $$Vg=n*Vt*\log[Ids/wa*Io]$$

Here, wa is w of a memory cell, and Ids is the current target plus an offset value.

If the stored slope value is relatively steep, then a relatively small current offset value can be used. If the stored slope value is relatively flat, then a relatively high current offset value can be used. Thus, determining the slope information allows for a current offset value to be selected that is customized for the particular cell in question. This ultimately will make the programming process shorter. When this step is repeated, i is incremented, and $v_i=V_{i-1}+V_{increment}$. The cell is then programmed using $v_i$. $v_{increment}$ can be determined from a lookup table storing values of $v_{increment}$ vs. target current value.

Next, a verify operation occurs, wherein a read operation is performed on the selected cell and the current drawn through the selected cell ($I_{cell}$) is compared with a coarse target threshold value, $I_{CT}$ (step 3905). If $I_{cell}$ is less than or equal to $I_{CT}$, where $I_{CT}$ is set=$I_D+I_{CTOFFSET}$, where $I_{CTOFFSET}$ is an offset value added to prevent program overshoot, then adaptive calibration method 3900 is complete and precision programming operation 3506 can begin. If Icell is not less than or equal to $I_{CT}$, then steps 3904-3905 are repeated, and i is incremented. Precision programming method 3506 then begins, with the voltage $v_i$ being the last voltage used to program the selected cell.

FIG. 40 depicts aspects of adaptive calibration operation 3900. During step 3903, current source 4001 applies the current values IR1 and IR2 to the selected cell (here, memory cell 4002), and the voltage (CGR1 for IR1 and CGR2 for IR2) at the control gate of memory cell 4002 is then measured. The slope is determined as (CGR2–CGR1)/dec of current, which is the slope of VCG vs. LOG (I).

FIG. 41 depicts another example of coarse programming operation 3505, which is adaptive calibration method 4100. The adaptive calibration method starts (step 4101). The cell is programmed at a default start value $v_0$ (step 4102). $V_0$ is derived from a lookup table such as created from silicon characterization, the table value is offset such as not to overshoot the target program value.

In next step 4103 a I-V slope parameter is created which is used in predicting the next programming voltage, a first control gate read voltage, $V_{CGR1}$, is applied to the selected cell, and the resulting cell current, $IR_1$, is measured. Then a second control gate read voltage, $V_{CGR2}$, is applied to the selected cell, and the resulting cell current, $IR_2$, is measured. A slope is determined based on those measurements and stored, for example as according to the equation in sub threshold region (cell operating in sub threshold):

$$slope=(V_{CGR1}-V_{CGR2})/(LOG(IR_1)-LOG(IR_2))$$

(step 4103). Examples of values for $V_{CGR1}$ and $V_{CGR2}$ are, for example, 1.5V and 1.3V, respectively.

Determining the slope information allows for a $V_{increment}$ value to be selected that is customized for the particular cell in question. This ultimately will make the programming process shorter.

When step 4104 is repeated, i is incremented, a new desired programming voltage, $V_i$, is determined based on the stored slope value and a current target and offset value using an equation such as the following:

$$V_i=V_{i-1}+V_{increment},$$

$$\text{where for } i-1, V_{increment}=\text{alpha*slope*}(LOG(IR_1)-LOG(I_{CT})),$$

where $I_{CT}$ is the target current and alpha is a pre-determined constant<1 (programming offset value) to prevent over-shoot, e.g., 0.9. For example, $V_i$ is VSLP or VCGP, source line or control gate programming voltage.

The cell is then programmed using Vi (step 4104).

Next, a verify operation occurs, wherein a read operation is performed on the selected cell and the current drawn through the selected cell ($I_{cell}$) is compared with $I_{CT}$ (step 4106). If $I_{cell}$ is less than or equal to $I_{CT}$ (which here is a coarse target threshold value), where $I_{CT}$ is set=$I_D$+$I_{CTOFF-SET}$, where $I_{CTOFFSET}$ is an offset value added to prevent program overshoot, then the process proceeds to the step 4107. If not, then the process returns to step 4104 and i is incremented.

In step 4107, $I_{cell}$ is compared against a threshold value, $_{CT2}$, that is smaller than $I_{CT}$. The purpose of this is to see if an overshoot has occurred. That is, although the goal is for Lai to be below $I_{CT}$, if it falls too far below $I_{CT}$, then an overshoot has occurred and the stored value may actually correspond to the wrong value. If Lai is not less than or equal to $I_{CT2}$, then no overshoot has occurred, and adaptive calibration method 4100 has completed, as which point the process progresses to precision programming operation 3506. If $I_{cell}$ is less than or equal to $I_{CT2}$, then an overshoot has occurred. The selected cell is then erased (step 4108), and the programming process starts over at step 4102, with i reset to 0. Optionally, if step 4108 is performed more than a predetermined number of times, the selected cell can be deemed a bad cell that should not be used.

The precision program operation 3506 consists of multiple verify and program (V/P) cycles, in which the program voltage is incremented by a constant fine voltage with a fixed pulse width or in which the program voltage is fixed and the program pulse width is varied.

Optionally, the step of determining if the current through the selected non-volatile memory cell during a read or verify operation is less than or equal to the coarse target threshold value can be performed by applying a fixed bias to a terminal of the non-volatile memory cell, measuring and digitizing the current drawn by the selected non-volatile memory cell to generate digital output bits, and comparing the digital output bits to digital bits representing the first threshold current.

Optionally, the step of determining if the current through the selected non-volatile memory cell during a read or verify operation is less than or equal to the coarse target threshold value can be performed by applying a fixed bias to a terminal of the non-volatile memory cell, measuring and digitizing the current drawn by the selected non-volatile memory cell to generate digital output bits, and comparing the digital output bits to digital bits representing the first threshold current.

Optionally, the step of determining if the current through the selected non-volatile memory cell during a read or verify operation is less than or equal to the coarse target threshold value can be performed by applying an input to a terminal of the non-volatile memory cell, modulating the current drawn by the selected non-volatile memory cell with an output pulse to generate a modulated output, digitizing the modulated output to generate digital output bits, and comparing the digital output bits to digital bits representing the first threshold current.

FIG. 42 depicts a third example of coarse programming operation 3505, which is absolute calibration method 4200. The absolute calibration method starts (step 4201). The cell is programmed at a default starting value $v_0$ (step 4202). The control gate voltage of the cell (VCGRx) is measured at a current value $I_{target}$ and stored (step 4203). A new desired voltage, $v_1$, is determined based on the stored control gate voltage and a current target and offset value, $I_{offset}$+$I_{target}$ (step 4204). For example, the new desired voltage, $v_1$, can be calculated as follows: $v_1=v_0+(VCGBIAS-stored VCGR)$, where VCGBIAS is the default read control gate voltage at a maximum target current, e.g. =~1.5V, and stored VCGR is the measured read control gate voltage of step 4203.

The cell is then programmed using $v_i$. When i=1, the voltage $v_1$ from step 4204 is used. When i>1, the voltage $v_i=v_{i-1}+v_{increment}$ is used. $v_{increment}$ can be determined from a lookup table storing values of $v_{increment}$, vs. target current value. Next, a verify operation is performed, wherein a read operation is performed on the selected cell and the current drawn through the selected cell ($I_{cell}$) is compared with $I_{CT}$ (step 4206). If $I_{cell}$ is less than or equal to $I_{CT}$ (which here is a threshold value), then absolute calibration method 4200 is complete and precision programming method 3506 can begin. If $I_{cell}$ is not less than or equal to $I_{CT}$, then steps 4205-4206 are repeated, and i is incremented.

A single weight verify method can be used to verify whether a cell has achieved a weight target as a result of a programming operation. A memory cell is selected for a verify operation and the output of the memory cell is then verified by a verify mechanism to be described below with reference to FIG. 43-49.

A differential weight verify method can be used to determine whether a differential cell (formed of 2 cells, where the stored value is the difference in values stored in the 2 cells) has achieved a weight target as a result of a programming operation. Two cells associated with the differential weight are selected for a verify operation. The difference in output between the cells is then verified by a verify mechanism to be described below with reference to FIGS. 43-49. For example, if cell₁ stores a w+ value and cell₂ stores a w− value, w=w+−w− is a differential weight. Cell₁ and cell₂ are the two cells to be selected for a verify operation to determine if the weight w has achieved a target. Alternatively, the w− value of cell₂ is verified first, and then the differential weight w is verified. Alternatively, the w+ value of cell₁ is verified first, and then the differential weight w is verified. Alternatively, the w+ and w− values of cell₁ and cell₂ are verified in a first operation, and then the differential weight w is verified in a second operation.

FIG. 43 depicts VMM system 4300. Current-to-voltage converter and analog-to-digital converter blocks 4301 receive current from VMM array 3401, typically from bit lines or source lines in VMM array 3401, and provide outputs to verify circuits 4302. Current-to-voltage converter and analog-to-digital converter blocks 4301 and verify circuits 4302 together are output blocks coupled to VMM array 3401 to generate voltages during a verify operation of VMM array 3401 and to generate digital outputs during a read operation of VMM array 3401. Each current-to-voltage converter in block 4301 converts current to voltage. The analog-to-digital converter in block 4301 is re-configured (such as in the fashion described below with reference to FIG. 44A) to be used during a verify operation (also known as a read-verify operation). During a verify operation, reference array 4304 is used to generate all N possible current targets (e.g., 32 values ranging between 3-96 nA in 3 nA increments). Each of the N possible current targets corresponds to one of N weight targets stored in respective reference memory cells in reference array 4304. Alternatively, main reference current generator 4305 is used to generate all N current targets. The reference current(s) from either reference array 4304 or main reference current generator 4305 is provided to reference voltage generator 4303, which comprises a voltage DAC, and which utilizes the voltage DAC to convert the reference currents into reference voltages, where there are N possible voltages corresponding to the N possible values. For example, for a 5-bit cell, there are 32 reference voltages corresponding to 32 current targets. The appropriate one of the N voltage values is selected for comparison by the verify circuit 4302 against the voltage provided by the corresponding current-to-voltage converter 4301. That comparison is a verify operation performed by verify circuit 4302. Thus, weights can be verified after they are programmed into VMM array 3401. In this approach the verify is done by comparing an output voltage from a memory cell against a reference voltage from the voltage reference generator 4303.

Alternatively, a reference current digital-to-analog converter (IDAC) is used to verify the cell current directly without using the current-to-voltage converter, meaning a cell current is compared against a reference current. Under this approach, the latency and variation would be typically larger, due to the settling time of the low current (e.g., few nA) circuits.

FIG. 44A depicts a neuron output ITV+ADC+VERIFY circuit 4488 which includes current-to-voltage converter (ITV) 4401, successive approximation register (SAR) analog-to-digital converter (ADC) 4402, and verify circuit 4403. Verify circuit 4403 includes a comparator 4404 (which is also used to generate digital outputs during a read or read neuron operation), reference voltage selection circuit 4406, and verify registers 4405. The verify registers 4405 are the data out registers of the SAR ADC 4402, which here are used to perform a verify function but also can be used during a read or read neuron operation to generate digital outputs. Current-to-voltage converter 4401 and SAR analog-to-digital converter 4402 are an example of an implementation of current-to-voltage converter and analog-to-digital converter 4301 in FIG. 43, and verify circuit 4403 is an example of an implementation of verify circuit 4302 in FIG. 43.

Current-to-voltage converter 4401 and SAR analog-to-digital converter 4301 can be used during a read or neural read operation. However, current-to-voltage converter 4401 and SAR analog-to-digital converter 4301 can also be used during a verify operation where the weight (intended to be one of N possible weight values) that has been programmed into a non-volatile memory cell in the VMM array is verified.

Current-to-voltage converter 4401 receives a current from VMM array from a single selected cell and converts that current to a voltage. The current to voltage conversion can be done by a plurality of resistors ITV (RITV) 4490R or a plurality of capacitors ITV (CITV) 4490C. One of N possible reference voltages are provided to verify circuit 4403 through the verify registers 4405 and verify reference voltage selection circuit 4406. The verify registers, for example, can be 8-bit registers which are used to select one out of 256 voltage reference levels in the verify reference voltage selection circuit 4406. Verify reference voltages as input (though verify reference voltage lines) to the verify reference voltage selection circuit 4406 are provided by a global verify reference voltage generator such as in FIG. 45. Comparator 4404 then compares the voltage from current-to-voltage converter 4401 with the one of N possible reference voltages to indicate whether the cell is storing the correct value or not. The capacitors and SAR logic in SAR ADC 4402 are not used during the verify operation. In one example, a control circuit closes switches S1A in SAR ADC 4402 so as to provide the positive output of ITV 4401, Vinp, directly to the non-inverting input of comparator 4404, and open a switch (NOT NAMED) and close a switch (NOT NAMED) to provide the output of verify reference voltage selection circuit 4406 to the inverting input of comparator 4404.

The ITV+ADC+VERIFY circuit 4488 can be used for a single weight verify operation as well as a differential weight verify operation. For a single weight verify operation, only one input from one cell is needed. The output voltage of the ITV 4401 is proportional the value of the cell current and is verified against a reference voltage level provided by verify reference voltage selection circuit 4406. For a differential weight verify operation, two inputs from two cells are two inputs into the ITV+ADC+VERIFY circuit 4488 and the output voltage (such as Vinp) of the ITV 4401 is proportional to the difference of the two cell currents and is verified against a reference voltage level provided by verify reference voltage selection circuit 4406.

The overall offset compensation of the ITV+ADC+VERIFY circuit 4488 can be trimmed by using offset trimming of the comparator 4404. This offset can be further trimmed by trimming the resistor 4490R or capacitor 4490C of the 4401 ITV circuit.

In another example, the overall gain compensation of the ITV+ADC+VERIFY circuit 4488 can be trimmed by trimming the resistor 4490R or capacitor 4490C of the 4401 ITV circuit.

An alternative method of offset compensation can be done in the time domain by using ITV 4401 with capacitor 4490C. A variable-width pulse with a reference current input to enable the integration of the capacitor 4490C is used to produce an output voltage by the ITV 4401. The output voltage from ITV 4401 is compared by comparator 4404 against a reference voltage. The parameters of the variable-width pulse are stored, such as by a counter (not shown) in the digital domain or by a table (not shown) storing an analog voltage in the analog domain for each ITV (the analog voltage is converted from the variable pulse input). This information is used by a controller (not shown) to enable the ITV using enable signals (not shown) for a verify operation.

FIG. 44B depicts comparator and offset circuit 4490, which can be used in place of comparator 4404 in FIG. 44A to add an additional functionality of offset compensation. Comparator and offset circuit 4490 comprises comparator 4491, which compares inputs VINP and VINN (which can be the same signals shown in FIG. 44A) to generate output COMPOUT and its complement, COMPOUTB. Calibration circuit 4492 can be adjusted to provide an offset voltage, VON, to comparator 4491, and calibration circuit 4493 can be adjusted to provide an offset voltage, VOP, to comparator 4492.

FIG. 45 depicts reference voltage generator 4500. Reference voltage generator 4500 is an example implementation of reference voltage generator 4303. In one example, reference array 4304 (not shown) provides a maximum current from a reference cell, where the current represents the highest possible weight (of N possible weights) that can be stored in a non-volatile memory cell. The provided maximum current from the reference cell is converted into a high verify reference voltage by current-to-voltage converter 4501, which can be done either using resistor current-to-voltage converter (RITV) 4511 or capacitor current-to-voltage converter (CITV) 4510.

This voltage is then used to generate, for example, 32 verify reference voltages for a 5-bit cell such as by resistor string 4504, which here comprises N−1 resistors in series. In another example, the reference array provides a reference current which is converted to reference voltages, for example the reference current can be a mid-range value, which is appropriately converted into all N reference voltage (e.g., by a current ratioed mirror, by a trimmed resistor value or by a trimmed capacitor value through an ITV circuit). The ITV 4501 as shown is using a differential operational amplifier. This ITV is a replica of the sub circuit ITV 4301 in VMM system 4300, also shown as ITV 4401 in ITV+ADC+Verify Circuit 4488. The differential operational amplifier (op amp) is a replica of the local differential op amp 4480 in FIG. 44 so the N global references can track the local voltage from the ITV 4301 over PVT (process, power supply, or temperature) variations. Alternatively, the ITV 4501 can be based on a single ended operational amplifier. The resistors 4511x and capacitors 4510x are trimmable to adjust the range and to compensate for mismatch or offset variation. Resistor string 4504 is trimmable to adjust the range of VN to V1, to shift up/down the range VN to V1, or to adjust the local value VN to V1.

In another example, a constant current bias (such as from an IDAC) is used instead of a reference current from a reference array.

The current bias or the reference current from the reference array is adjustable to get to a target value. They are also compensated for PVT (process, power supply, or temperature) variations.

The overall global offset and mismatch compensation of the ITV+ADC+VERIFY circuit 4488 can be trimmed by using offset and mismatch trimming of the reference generator 4500. This can be done by adjusting current bias 4512 or trimming resistors 4511a and 4511b, capacitors 4510a and 4510b, or resistor string 4504.

Buffer 4502 is used to buffer the high verify reference voltage, for example, representing $32^{nd}$ level (L31) out of 32 reference voltage levels (L0-31) for a 5-bit cell, to drive the resistor string 4504 at one end of resistor string 4504. In another example, a buffer 4503 is provided to buffer a low verify reference voltage, VREF2, corresponding to $1^{st}$ level (L0) out of 32 levels (L0-31) for a 5-bit cell and providing that voltage to one end of resistor string 4504. For example, the high verify reference voltage might be 900 mV, and the low verify reference voltage might be 300 mV. Voltage ladder (resistor string) 4504 generates N voltages, ranging from V0 to VN, which represent the N possible values that can be stored in the VMM array. Those reference voltages are then used by verify circuit 4403 in FIG. 44. In another example, the input voltages and/or output voltages of buffer 4502 and 4503 are trimmed to adjust the range and to calibrate for any offset, such as a buffer offset. Alternatively, ITV 4501 can drive the resistor string 4504 directly to provide 32 reference levels (L0-L31).

In one example, K verify reference voltage lines can be used to provide N different voltages. For example, for a 5-bit cell, 32 verify reference voltage lines are needed to feed to the verify reference voltage selection circuit 4406, while 64 verify reference voltages lines are needed for a 6-bit cell. 32 reference voltage lines can each be used twice to provide 64 verify reference voltages by time-multiplexing their use such that the 32 lines provide a first set of 32 voltages during a first verify period and a second set of 32 voltages during a second verify period. This approach can be extended by using four verify periods to provide 128 voltages for 7-bit cells or eight verify periods to provide 256 voltages for 8-bit cells, or more without limitation.

What is claimed is:

1. A system comprising:
   a vector-by-matrix multiplication array comprising a plurality of non-volatile memory cells arranged in rows and columns, the non-volatile memory cells respectively capable of storing one of N possible levels corresponding to one of N possible currents;
   a plurality of output blocks to receive current from respective columns of the vector-by-matrix multiplication array and generate voltages during a verify operation of the vector-by-matrix multiplication and generate digital outputs during a read operation of the vector-by-matrix multiplication array; and
   a reference voltage generator to generate one of N voltages during the verify operation, wherein the reference voltage generator comprises:
      a current-to-voltage converter for converting a maximum current within the N possible currents into a maximum voltage; and
      a resistor string for generating N voltages ranging from the maximum voltage to a minimum voltage, wherein the resistor string comprises (N−1) resistors in series.

2. The system of claim 1, wherein the plurality of output blocks converts current from columns of the array into voltages using a plurality of resistors or a plurality of capacitors.

3. The system of claim 1 comprising:

a verify circuit to compare a voltage from the reference voltage generator with a voltage from one of the plurality of output blocks.

4. The system of claim 3, wherein the verify circuit generates a digital output indicating a result of the comparing.

5. The system of claim 1, wherein the reference voltage generator generates the one of N voltages in response to a current received from a reference array.

6. The system of claim 1, wherein the reference voltage generator generates the one of N voltages in response to a current received from a main reference current generator.

7. The system of claim 1, comprising a first buffer for providing the maximum voltage to a first end of the resistor string.

8. The system of claim 7, comprising a second buffer for providing the minimum voltage to a second end of the resistor string.

9. A system comprising:

a current-to-voltage converter to convert a current from a vector-by-matrix array into a voltage;

a successive approximation register analog-to-digital converter to receive the voltage from the current-to-voltage converter and generate a digital output during a read operation; and a verify circuit to receive the voltage from the current-to-voltage converter and compare it to a reference voltage during a verify operation;

wherein the reference voltage is provided by a reference voltage generator comprising:

a current-to-voltage converter for converting a maximum current within N possible currents into a maximum voltage; and a resistor string for generating N voltages ranging from the maximum voltage to a minimum voltage, wherein the resistor string comprises (N-1) resistors in series.

10. The system of claim 9, comprising a first buffer for providing the maximum voltage to a first end of the resistor string.

11. The system of claim 10, comprising a second buffer for providing the minimum voltage to a second end of the resistor string.

12. A system comprising:

a vector-by-matrix multiplication array comprising a plurality of non-volatile memory cells arranged in rows and columns, the non-volatile memory cells respectively capable of storing one of N possible levels corresponding to one of N possible currents; and a plurality of reference voltage generators generating K reference voltages on K reference voltage lines, wherein K<N and wherein the K reference voltage lines verify for N possible currents in a time-multiplexed fashion.

13. The system of claim 12, comprising:

a plurality of current-to-voltage converters to receive currents from columns of the array of the vector-by-matrix multiplication array and generate voltages during a verify operation of the vector-by-matrix multiplication array.

14. The system of claim 13, wherein the current-to-voltage converter converts current from columns of the array of the vector-by-matrix multiplication array into voltages using a plurality of resistors or a plurality of capacitors.

15. The system of claim 12, comprising:

a verify circuit to produce a comparison output.

16. The system of claim 12, comprising:

analog-to-digital converters to produce a comparison output.

* * * * *